United States Patent
De Rore

(10) Patent No.: US 8,634,496 B2
(45) Date of Patent: Jan. 21, 2014

(54) METHOD FOR DETERMINING AND COMPENSATING TRANSCEIVER NON-IDEALITIES

(75) Inventor: Stefaan De Rore, Leefdal (BE)

(73) Assignee: IMEC, Leuven (BE)

( * ) Notice: Subject to any disclaimer, the term of this patent is extended or adjusted under 35 U.S.C. 154(b) by 857 days.

(21) Appl. No.: 12/263,376

(22) Filed: Oct. 31, 2008

(65) Prior Publication Data

US 2009/0163143 A1 Jun. 25, 2009

Related U.S. Application Data

(60) Provisional application No. 60/984,283, filed on Oct. 31, 2007, provisional application No. 61/081,651, filed on Jul. 17, 2008.

(51) Int. Cl.
*H03K 9/00* (2006.01)

(52) U.S. Cl.
USPC ........... 375/316; 375/260; 375/267; 375/296; 375/298; 375/299; 375/324; 375/346; 375/347; 375/349

(58) Field of Classification Search
USPC ......... 375/316, 260, 267, 296, 298, 299, 324, 375/346, 347, 349
See application file for complete search history.

(56) References Cited

U.S. PATENT DOCUMENTS

| | | | |
|---|---|---|---|
| 6,009,317 A | 12/1999 | Wynn | |
| 6,670,900 B1 | 12/2003 | Zhang | |
| 7,274,757 B1 * | 9/2007 | Zhou et al. | 375/340 |
| 7,408,976 B1 * | 8/2008 | Narasimhan et al. | 375/148 |
| 7,555,051 B2 | 6/2009 | Zhang | |
| 7,606,316 B1 | 10/2009 | Narasimhan | |
| 2003/0144969 A1 | 7/2003 | Coyne | |
| 2004/0165678 A1 | 8/2004 | Nadiri | |
| 2005/0069050 A1 | 3/2005 | Ding et al. | |
| 2005/0276354 A1 | 12/2005 | Su et al. | |
| 2006/0034356 A1 | 2/2006 | Fechtel | |
| 2007/0009011 A1 | 1/2007 | Coulson | |
| 2007/0070691 A1 * | 3/2007 | Walvis et al. | 365/185.03 |
| 2009/0175362 A1 * | 7/2009 | Priotti | 375/260 |

FOREIGN PATENT DOCUMENTS

| | | |
|---|---|---|
| DE | 10 2004 005 130 B3 | 4/2005 |
| EP | 0 378 719 A1 | 7/1990 |
| WO | WO 03/101064 A1 | 12/2003 |

OTHER PUBLICATIONS

Suh et al., Preamble design for Channel Estimation in MIMO-OFDM Systems, IEEE, 2003, pp. 317-321, vol. 1, Suwon, South Korea.*

(Continued)

*Primary Examiner* — Kabir A Timory
(74) *Attorney, Agent, or Firm* — Knobbe Martens Olson & Bear LLP

(57) ABSTRACT

A method for estimating transceiver non-idealities is disclosed. In one aspect, the method comprises generating a preamble comprising multiple sets of known training sequences with a synchronization part preceding an estimation part. The training sequences in the estimation part comprises at least two sequences which are (i) complementary Golay sequence pairs and (ii) selected to satisfy a predetermined correlation relationship chosen for estimation of a first non-ideality characteristic. A first estimate of a non-ideality characteristic is determined on the basis of the known training sequences of the synchronization part of the received preamble. The estimation part of the received preamble is compensated by this estimate. Another non-ideality characteristic is determined by the compensated estimation part, exploiting the predetermined correlation relationship.

19 Claims, 14 Drawing Sheets

(56) References Cited

OTHER PUBLICATIONS

De Rore S. et al., "Joint estimation of carrier frequency offset and IQ imbalance for 4G mobile wireless systems", *Communications, 2006 IEEE International Conference on*, vol. 5, pp. 2066-2071, Jun. 2006.
Feng Yan et al., "Carrier Frequency Offset Estimation for OFDM Systems with I/Q Imbalance", *Proc. the 47th IEEE Int. Midwest Symposium on Circuits and Systems, MWSCAS '04*, vol. 2, pp. 633-636, Jul. 2004.
Feng Yan et al., "Carrier Frequency Offset Estimation and I/Q Imbalance Compensation for OFDM Systems" *EURASIP J. Advances in Signal Processing*, vol. 2007, No. 45364, Jan. 11, 2007.
S. Fouladifard and H. Shafiee, "Frequency offset estimation in OFDM systems in the presence of IQ imbalance," Proc. International Conference Communications, vol. 3, pp. 4280-4285, May 2003.
Funada et al., "A design of single carrier based PHY for IEEE 802.15.3c standard" *Proceedings of the IEEE International Symposium on Personal, Indoor and Mobile Radio Communications (PIMRC)* Sep. 3, 2007, Athens, Greece.
Guanbin Xing, Manyuan Shen, and Hui Liu, "Frequency offset and I/Q imbalance compensation for direct-conversion receivers," IEEE Transactions on Wireless Communications, vol. 4, pp. 673-680, Mar. 2005.
J. Tubbax, B. Come, L. Van Der Perre, S. Donnay, M. Engels, M. Moonen, and H. De Man, "Joint compensation of IQ imbalance and frequency offset in OFDM systems," Proc. of the IEEE Radio and Wireless Conference, pp. 39-42, Augustus 2003.
M.J.E. Golay, "Complementary series," *IEEE Transactions on Information Theory*, vol. 7, pp. 82-87, Apr. 1961.
T.M. Schmidl and P.Cox, "Robust frequency and timing synchronization for OFDM", *IEEE Transactions on Communications*, vol. 45, pp. 1613-1621, Dec. 1997.
TG3c Channel Modeling Sub-committee Final Report, *Doc. IEEE 15/07/0584-01-003c*, Mar. 13, 2007.
International Search Report and Written Opinion dated Jun. 12, 2009, issued in International Application No. PCT/EP2008/064802.
IEEE Standard 802.15.3c, Wireless Medium AccessControl (MAC) and Physical Layer (PHY) Specifications for High Rate Wireless Personal Area Networks (WPANs), IEEE Computer Society, 2009, available from http://ieeexplore.ieee.org/xpl/freeabs_all.jsp?reload=true&tp=&isnumber=5284443&arnumber=5284444&punumber=5284442&tag=1.
Brötje et al., "Estimation and Correction of transmitter-caused I/Q Imbalance in OFDM Systems," *International OFDM Workshop*, Sep. 10, 2002.
International Search Report dated Jun. 2, 2008 for PCT/EP2008/053366.
International Preliminary Report on Patentability and Written Opinion dated Sep. 29, 2009 for PCT/EP2008/053366.

\* cited by examiner

METHOD FOR DETERMINING AND COMPENSATING TRANSCEIVER NON-IDEALITIES

CROSS REFERENCE TO RELATED APPLICATIONS

This application claims priority under 35 U.S.C. §119(e) to U.S. provisional patent application 60/984,283 filed on Oct. 31, 2007 and to U.S. provisional patent application 61/081,651 filed on Jul. 17, 2008. Each of the above applications is incorporated herein by reference in its entirety.

BACKGROUND OF THE INVENTION

1. Field of the Invention

The present invention relates to a method for estimating and compensating transceiver non-idealities. The non-idealities may be transmitter and receiver IQ imbalance and/or carrier frequency offset.

2. Description of the Related Technology

The effect of IQ imbalance in a transmitter or receiver is that it produces an unwanted distorted signal that is superimposed on the original desired signal. In order to reduce or even eliminate this unwanted distorted signal one needs to estimate the ratio between the original signal and the distorted signal.

The preamble preceding the data in a communications burst, usually contains known training sequences; Golay sequences can for example be used. When there is IQ imbalance in the communication system, the preamble training sequences are modified by the addition of the unwanted distorted version of the signal produced by the IQ imbalance. This impacts the ability of the receiver to make the correct estimates of carrier frequency offset (CFO) and channel response and finally recover the transmitted data.

In the prior art, several methods are proposed for performing joint CFO and IQ estimations. If the first part of the preamble contains more than three repetitions of the same sequence, following methods can be used for the example with Golay sequences: "Feng Yan et al., Carrier Frequency Offset Estimation for OFDM Systems with I/Q Imbalance, *Proc. the 47th IEEE Int. Midwest Symposium On Circuits and Systems, MWSCAS* '04, Vol. 2, pp. 633-636, July 2004" and "De Rore S. et al., Joint estimation of carrier frequency offset and IQ imbalance for 4G mobile wireless systems, *Communications, 2006 IEEE International Conference on*, vol. 5, pp. 2066-2071, June 2006". The result of these two methods is an estimate of cos φ where φ is the angle rotation caused by the CFO over a known time interval. This angle rotation is directly proportional with the CFO. Using the acquired CFO estimate, it is then also possible to make an estimate of the IQ imbalance ratio. The methods fail when the CFO is small. For small CFOs, the cos φ estimate is too imprecise for an accurate CFO estimation and also subsequent estimation of the IQ imbalance becomes inaccurate and useless.

In "De Rore S. et al., Joint estimation of carrier frequency offset and IQ imbalance for 4G mobile wireless systems, *Communications, 2006 IEEE International Conference on*, vol. 5, pp. 2066-2071, June 2006", a method is proposed that works for small CFOs but needs a specially designed preamble sequence that is not available in the 802.15.3c case. For OFDM systems several methods have been proposed that jointly compensate CFO and IQ imbalance; some are applicable to OFDM systems in general like "J. Tubbax, B. Come, L. Van der Perre, S. Donnay, M. Engels, M. Moonen, and H. De Man, "Joint compensation of IQ imbalance and frequency offset in OFDM systems," Proc. of the IEEE Radio and Wireless Conference, pp. 39-42, Augustus 2003" and "S. Fouladifard and H. Shafiee, "Frequency offset estimation in OFDM systems in the presence of IQ imbalance," Proc. International Conference Communications, vol. 3, pp. 4280-4285, May 2003", others use special pilot training sequences "Guanbin Xing, Manyuan Shen, and Hui Liu, "Frequency offset and I/Q imbalance compensation for direct-conversion receivers," IEEE Transactions on Wireless Communications, vol. 4, pp. 673-680, March 2005." In the 802.15.3c case, the special training sequences are not available and besides OFDM, the standard also defines single carrier systems, intended for use with- and without frequency domain equalization.

SUMMARY OF CERTAIN INVENTIVE ASPECTS

Certain inventive aspects relate to a method for determining transceiver non-idealities introduced on an RF modulated signal transmitted from a transmitter via a transmission channel to a receiver. The method comprises generating a preamble comprising multiple sets of known training sequences with a synchronization part for synchronization purposes and an estimation part for purposes of estimating non-ideality characteristics. Two of the sequences in the estimation part are (i) complementary Golay sequence pairs and (ii) selected to satisfy a predetermined correlation relationship chosen for estimation of a first non-ideality characteristic. The preamble is transmitted from the transmitter via the transmission channel to the receiver. A first estimate of a second non-ideality characteristic is determined on the basis of the known training sequences of the synchronization part of the received preamble. The estimation part of the received preamble is compensated by means of this second non-ideality characteristic. An estimate of the first non-ideality characteristic, different from the second non-linearity characteristic, is determined. This is done by means of the compensated estimation part, exploiting the predetermined correlation relationship. The receiver generates the in-phase and quadrature signals in the analog domain, such as in analog direct conversion receivers, Low-IF receivers or superheterodyne receivers with analog quadrature generation. When there is IQ imbalance in the communication system, the preamble training sequences are modified by the addition of the unwanted distorted version of the signal produced by the IQ imbalance. Preferably, the first non-ideality characteristic are transmitter and receiver IQ imbalance ratio's. These ratio's may be determined after having a first, rough estimation of a second non-ideality characteristic, preferably a carrier frequency offset. By exploiting the chosen correlation relationship, the transmitter and receiver IQ imbalance ratio's can be determined. Unlike the methods of the prior art the proposed IQ imbalance estimation and compensation method also work for small or zero CFOs. The proposed method can also be implemented in a computationally efficient way by means of correlations with binary sequences.

In an embodiment, the predetermined correlation relationship comprises additional correlations properties, being:

i) a second sequence equals minus the complex conjugate of a first sequence;

ii) a first selection of periodic correlations of the complex conjugate of a sequence with the sequence equals zero, iii) a zero shift correlation of the complex conjugate of a sequence with the sequence equals N, the length of the sequence, and iv) a second selection of periodic correlations of a sequence with the sequence equals zero.

This selection of sets of Golay complementary sequences is determined having, beside already generally known correlation properties, the additional properties which will be exploited for determining transceiver non-idealities. These properties are specific to the Golay complementary pairs selected for the standard.

The method further comprises making time domain correlations between the first and second sequences and the compensated second part of the preamble. These time domain correlations will be exploited for determining transceiver non-idealities.

The method further comprises determining an estimator based on the time domain correlations. More specific, the estimator is built from these time domain correlations. The estimator is further based on (predefined) transmitter and receiver IQ imbalance relationships. These equations are derived from the additional correlations. Next, the transmitter and receiver IQ imbalance ratio's are estimated. In a preferred embodiment, the estimator is a least squares estimator but can be any estimator known by the person skilled in the art.

The method further comprises determining fine carrier frequency offset characteristics and/or channel response by combining the time domain correlations with the estimated receiver IQ imbalance. After determining the fine carrier frequency offset, the method can further comprise estimating the noise variance on the received signal.

In another embodiment, the predetermined relationship is defined by: the sum of the correlation of a first sequence with the first sequence and the correlation of a second sequence with the second sequence equals zero and this for all possible shifts of the sequences. The determining of transceiver non-ideality characteristics comprises exploiting deviations of this predetermined correlation relationship. In an embodiment, the correlation is a periodic correlation. In another embodiment, the correlation is an a-periodic correlation. IQ imbalance in a transmitter or receiver produces an unwanted distorted signal that is superimposed on the original desired signal. To estimate this non-linearity, the difference is observed between the known transmitted training sequence and what is received. The result of the predetermined correlation is zero. When these sequences are used as a training sequence, the effects of IQ imbalance can be eliminated.

In one aspect, a method of determining non-ideality characteristics introduced on an radio frequency (RF) modulated signal transmitted from a transmitter via a transmission channel to a receiver is disclosed. The method comprises generating a preamble comprising multiple sets of known training sequences with a synchronization part for synchronization preceding an estimation part for estimating non-ideality characteristics, the training sequences in the estimation part comprising at least two sequences which are (i) complementary Golay sequence pairs and (ii) selected to satisfy a predetermined correlation relationship chosen for estimation of a first non-ideality characteristic. The method further comprises transmitting the preamble from the transmitter via the transmission channel to the receiver. The method further comprises determining a first estimate of a second non-ideality characteristic based at least in part on the known training sequences of the synchronization part of the received preamble. The method further comprises compensating the estimation part of the received preamble using the first estimate of the first non-ideality characteristic. The method further comprises determining an estimate of the first non-ideality characteristic different from the second non-ideality characteristic based at least in part on the compensated estimation part by exploiting the predetermined correlation relationship.

In another aspect, a method for determining non-ideality characteristics introduced on an radio frequency (RF) modulated signal received from a transmitter via a transmission channel is disclosed. The method comprises receiving a preamble transmitted via a transmission channel, the preamble comprising multiple sets of known training sequences with a synchronization part for synchronization preceding an estimation part for estimating non-ideality characteristics, the training sequences in the estimation part comprising at least two sequences which are (i) complementary Golay sequence pairs and (ii) selected to satisfy a predetermined correlation relationship chosen for estimation of a first non-ideality characteristic. The method further comprises determining a first estimate of a second non-ideality characteristic based at least in part on the known training sequences of the synchronization part of the received preamble. The method further comprises compensating the estimation part of the received preamble using the first estimate of the first non-ideality characteristic. The method further comprises determining an estimate of the first non-ideality characteristic different from the second non-ideality characteristic based at least in part on the compensated estimation part by exploiting the predetermined correlation relationship.

In another aspect, a device for determining non-ideality characteristics introduced on an radio frequency (RF) modulated signal received from a transmitter via a transmission channel is disclosed. The device comprises a receiving unit for receiving a preamble transmitted via a transmission channel, the preamble comprising multiple sets of known training sequences with a synchronization part for synchronization preceding an estimation part for estimating non-ideality characteristics, the training sequences in the estimation part comprising at least two sequences which are (i) complementary Golay sequence pairs and (ii) selected to satisfy a predetermined correlation relationship chosen for estimation of a first non-ideality characteristic. The device further comprises a first determining unit for determining a first estimate of a second non-ideality characteristic based at least in part on the known training sequences of the synchronization part of the received preamble. The device further comprises a compensating unit for compensating the estimation part of the received preamble using the first estimate of the first non-ideality characteristic. The device further comprises a second determining unit for determining an estimate of the first non-ideality characteristic different from the second non-ideality characteristic based at least in part on the compensated estimation part by exploiting the predetermined correlation relationship.

In another aspect, a device for determining non-ideality characteristics introduced on an radio frequency (RF) modulated signal received from a transmitter via a transmission channel is disclosed. The device comprises means for receiving unit for receiving a preamble transmitted via a transmission channel, the preamble comprising multiple sets of known training sequences with a synchronization part for synchronization preceding an estimation part for estimating non-ideality characteristics, the training sequences in the estimation part comprising at least two sequences which are (i) complementary Golay sequence pairs and (ii) selected to satisfy a predetermined correlation relationship chosen for estimation of a first non-ideality characteristic. The device further comprises means for determining a first estimate of a second non-ideality characteristic based at least in part on the known training sequences of the synchronization part of the received preamble. The device further comprises means for compensating the estimation part of the received preamble using the first estimate of the first non-ideality characteristic. The device further comprises means for determining an estimate of the first non-ideality characteristic different from the second non-ideality characteristic based at least in part on the compensated estimation part by exploiting the predetermined correlation relationship.

BRIEF DESCRIPTION OF THE DRAWINGS

The description is further elucidated by means of the following description and the appended figures.

DETAILED DESCRIPTION OF CERTAIN ILLUSTRATIVE EMBODIMENTS

Figure 1:
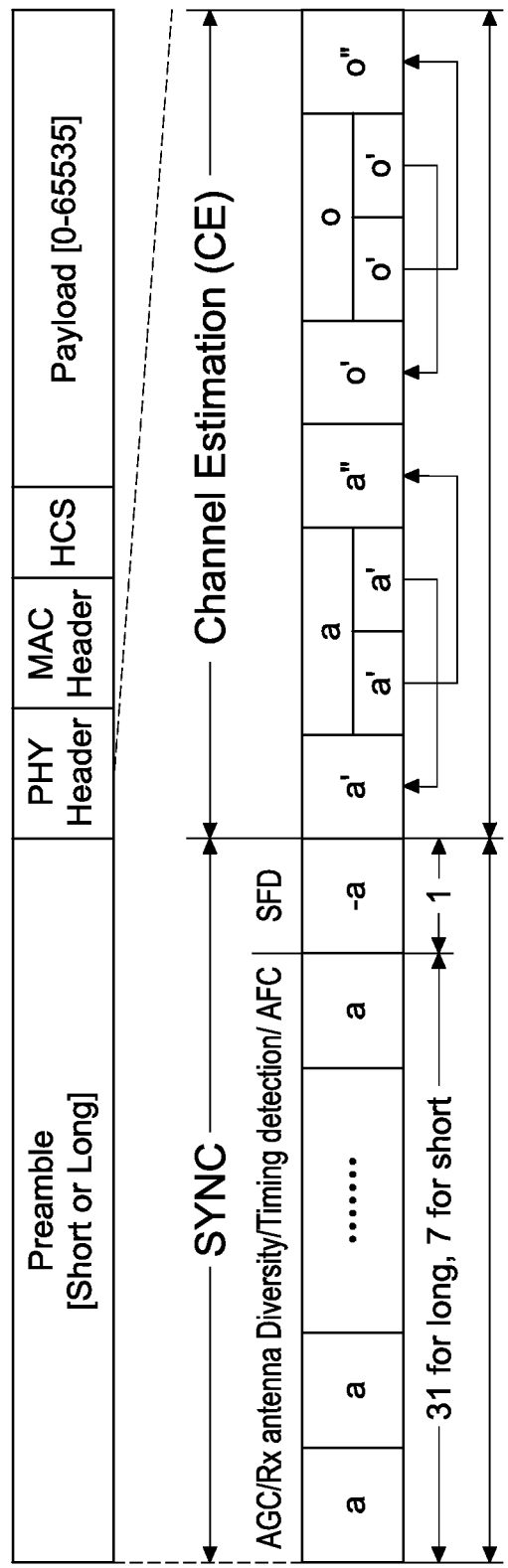
FIG. 1 shows schematically the preamble of one embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

First some notation conventions: In this document a letter with a single underscore denotes a vector, a letter with double underscore denotes a matrix. The superscript $^T$ denotes the matrix transpose, the superscript $^H$ denotes the Hermitian transpose of a matrix. The accent denotes the complex conjugate. A definition is denoted by the ≡ sign.

Certain embodiments relate to a method for performing wireless communication. One embodiment is presented for wireless communication according to the IEEE 802.15.3 standard.

The IEEE 802.15.3 Task Group 3c or TG3c is developing a millimeter-wave-based alternative physical layer (PHY) for the existing 802.15.3 Wireless Personal Area Network (WPAN) Standard 802.15.3-2003. This mmWave WPAN will operate in the new and clear band including 57-64 GHz unlicensed band defined by FCC 47 CFR 15.255. The millimeter-wave WPAN will allow high coexistence (close physical spacing) with all other microwave systems in the 802.15 family of WPANs. In addition, the millimeter-wave WPAN will allow very high data rate over 2 Gbps applications such as high speed internet access, streaming content download (video on demand, HDTV, home theater, etc.), real time streaming and wireless data bus for cable replacement. Optional data rates in excess of 3 Gbps will be provided.

Quadrature mixers are an attractive option for 60 GHz wireless systems, because they allow to simplify the design both at the transmitter and receiver. A set-back of quadrature mixers is the introduction of IQ mismatch.

The effect of IQ imbalance in a transmitter or receiver is that it produces an unwanted distorted signal that is superimposed on the original desired signal. This unwanted distorted signal is the complex conjugate of the original desired signal multiplied with an unknown complex factor. In order to eliminate this unwanted distorted signal (=compensating the IQ imbalance) one must be able to estimate the ratio between the original signal and the distorted signal. This ratio is also called the IQ imbalance ratio and is a complex number.

In order to have a satisfactory performance preferably both the transmitter and receiver IQ imbalance must be estimated and compensated. The mitigation of the IQ imbalance is complicated by the presence of Carrier Frequency Offset (CFO). In certain embodiments, transceiver non-idealities such as receiver IQ imbalance, CFO, noise, transmitter IQ imbalance and the effect of the channel are estimated and compensated.

The algorithms solely exploit properties of the channels estimation sequence which is part of the preamble. The compensation schemes in one embodiment can be used for Single Carrier (SC) systems as well as for OFDM systems. Departing from an initial rough CFO estimate on the first part of the preamble, the IQ imbalance ratios for transmitter and/or receiver are estimated on the channel estimation sequence (CES) embedded in the preamble. Successively, the residual uncompensated CFO, the channel and the energy of the noise on the signal are estimated. If desired, the estimate of the noise energy can be used together with the channel estimate in an equalizer (e.g. a MMSE equalizer).

The observed difference between the known transmitted training sequence and what is received, allows with some processing, to make the required, above mentioned estimations. If Golay complementary pairs are used, the synchronization and estimation processing includes the correlation of the received preamble with the complex conjugate of the known transmitted training sequence, in this case a Golay complementary pair.

The preamble (FIG. 1) is sub-divided in 3 parts: a packet synchronization sequence (SYNC), a frame delimiter sequence (SFD) and a channel estimation sequence (CES). The SYNC and SFD are used to detect the incoming burst, to make a time synchronization of the frame and to identify the piconet. Both SYNC and SFD are built by repeating a known sequence "s" a number of times, with possible sign inversions. The repeated sequence "s" is a Golay sequence, which has the benefit of a good peak to average power ratio and the correlation of "s" with the received preamble can be efficiently implemented in hardware.

Figure 2:
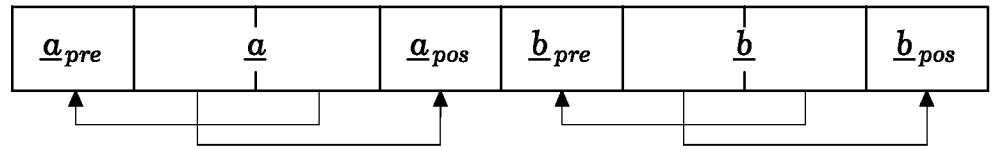
FIG. 2 shows a modulated CES sequence of one embodiment.

The CES is built from a binary Golay complementary pair (BGCP) [1] ($a^b, b^b$) of length N, called Pilot CES sequences in the standard. The superscript $b$ indicates this is a 'Binary' GCP containing only elements $a^b[k], b^b[k] \in \{1,-1\}$ $\forall k=1:N$. In the standard N=256. The standard defines for each length N, 3 possible BGCPs. The description of these BGCPs can be found in the standard [2]. To form the CES sequence both $a^b$ and $b^b$ are pre-pended and post-pended by respectively a cyclic prefix and cyclic postfix of length N/2 and concatenated (see FIG. 2). The length of the resulting CES becomes 4N.

We define $\underline{X}(\underline{x},\underline{y})$ as the cyclic correlation of $\underline{x}$ with $\underline{y}$. $\underline{X}(\underline{x},\underline{y})$ is a column vector with the same length (N) as $\underline{x}$ and $\underline{y}$. The elements of $\underline{X}(\underline{x},\underline{y})$ are:

$$X_k(\underline{x}, \underline{y}) \equiv \sum_{l=0}^{N-1} x_l y_{mod(l+k,N)} \forall k \in \{0:N-1\} \quad (1)$$

with mod the modulo operator. The PGCP $(\underline{a},\underline{b})$ has the following property:

$$\underline{X}(\underline{a},\underline{a}) + \underline{X}(\underline{b},\underline{b}) = [2N, 0, 0, \ldots, 0]^T \quad (2)$$

In an embodiment, a selection of sets of Golay complementary sequences is determined having, beside the already generally known interesting correlation properties, the additional properties:

$$\underline{b} = -\underline{\tilde{a}} \quad (3)$$

$$X_0(\underline{\tilde{a}}, \underline{a}) = N, X_k(\underline{\tilde{a}}, \underline{a}) = 0 \forall k \in \left\{1 : \frac{N}{4} - 1, \frac{3N}{4} : N-1\right\} \quad (4)$$

$$X_k(\underline{a}, \underline{a}) = 0 \forall k \in \left\{0 : \frac{N}{4} - 1, \frac{3N}{4} : N-1\right\} \quad (5)$$

These properties are specific to the Golay complementary pairs selected for the standard. In what follows, this set will be referred to as set 1.

In another embodiment, sets of Golay complementary sequences are selected having, beside the already generally known interesting correlation properties, the additional property that when (periodically) correlated with themselves, the result of this correlation is zero. When such a Golay complementary sequence, with the additional property, is used as a training sequence, the effects of IQ imbalance can be eliminated. A Golay complementary pair consists of 2 sequences "a" and "b", each consisting of a equal length series of complex numbers. Two sets of Golay complementary pairs have been identified and described that satisfy the following additional properties:

Set 2 has 2 properties:
  Property 1: The a-periodic correlation of "a" with "a" plus the a-periodic correlation of "b" with "b" is zero for all possible shifts of the sequences, including the zero shift.
  Property 2: The periodic correlation of "a" with "a" plus the periodic correlation of "b" with "b" is zero for all possible cyclic shifts of the sequences, including the zero shift.

Set 3 has 1 property:
  Property 1: The periodic correlation of "a" with "a" plus the periodic correlation of "b" with "b" is zero for all possible cyclic shifts of the sequences, including the zero shift.

The a-periodic correlation of "a" with "a" is defined as the sum of element-wise multiplications of "a" with a linearly shifted version of "a". Elements of both "a" and the shifted version of "a" that have no corresponding counterparts are dropped. If the length of "a" is N there are 2*N−1 meaningful shift distances.

The periodic correlation of "a" with "a" is defined as the sum of element-wise multiplications of "a" with a cyclic shifted version of "a". The cyclic shift means the elements shifted out at the end of the sequence are reentered at the start of the sequence. If the length of "a" is N there are N meaningful shift distances.

In what follows it will be assumed that from the first part of the preamble (SYNC), a first rough CFO estimate can be obtained, either by using method [3],[4] or [5]. The method from [3] has the least implementation complexity. Departing from an initial rough CFO estimate on the first part of the preamble, the IQ imbalance ratios for both or either transmitter and receiver are estimated on the channel estimation sequence (CES) embedded in the preamble.

The second part of the preamble (FIG. 1), channel estimation (CE), is build with a polyphase Golay complementary pair (PGCP) (a,b). (a is different from the "a" sequence from the first part of the preamble.) Both a and b are preceded and succeeded by respectively a cyclic prefix and cyclic postfix. Successively, the residual uncompensated CFO, the channel and the energy of the noise on the signal can be estimated. If desired, the estimate of the noise energy can be used together with the channel estimate in an equalizer (e.g. a MMSE equalizer).

Part A describes a compensation scheme for frequency independent transmitter and receiver IQ imbalance that can be used for SC systems as well as for OFDM systems together with a CFO compensation and a channel equalization (taking noise into account). To make the estimations, properties of the channel estimation sequence according to set 1 are being exploited.

Part B describes more specific a compensation scheme for frequency independent receiver IQ imbalance only, together with a CFO compensation and a channel equalization. To make the estimations, properties of the channel estimation sequence according to set 1 are being exploited.

Part C describes an alternative compensation scheme for frequency independent receiver IQ imbalance, together with a CFO compensation and a channel equalization (taking noise into account). To make the estimations, properties of the channel estimation sequence according to set 1 are being exploited.

Part D describes a compensation scheme for frequency independent receiver IQ imbalance that can be used for SC systems as well as for OFDM systems together with a CFO compensation and a channel equalization. To make the estimations, properties of the channel estimation sequence according to set 2 and 3 are being exploited.

Part A

1. Transmit-Receive Model

Figure 3:
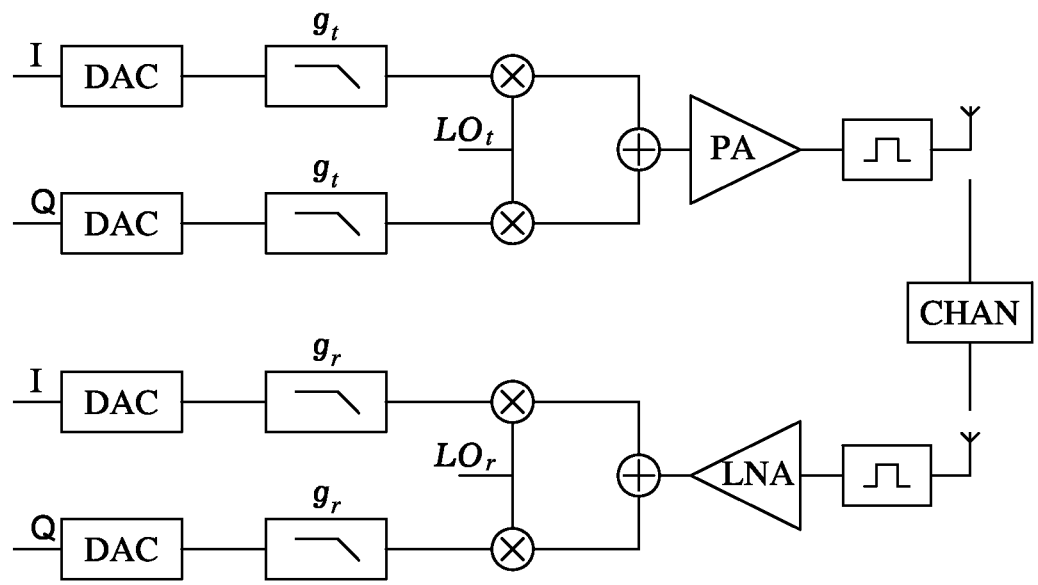
FIG. 3 shows schematically a transmit-receive chain of one embodiment.
Figure 4:
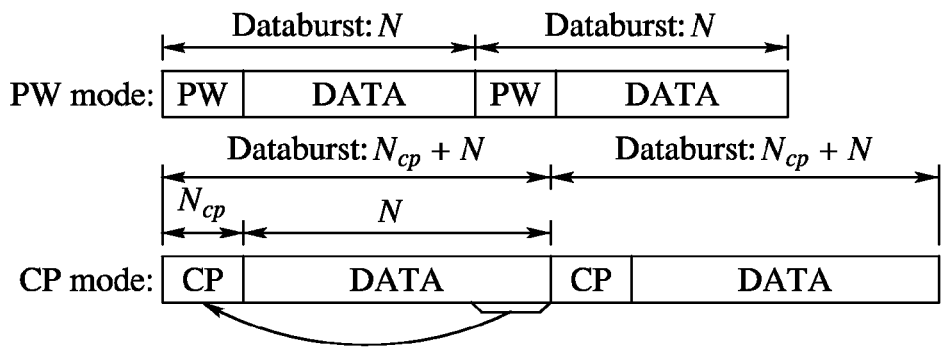
FIG. 4 show possible data burst modes of one embodiment.

FIG. 3 shows the different blocks in the transmit-receive chain, starting with the digital to analog (DAC) converters at the transmitter end ending with the analog to digital (ADC) converters at the receiver. Because we consider only frequency independent transmit and receive IQ imbalance, possible differences between the low pass filters in the I and Q branches are neglected and $g_t$ and $g_r$ are assumed the same in both branches. The payload data of a 802.15.3c frame is divided into data bursts. Two modes exist: pilot word (PW) mode or cyclic prefix (CP) mode (see FIG. 4).

In CP mode each data burst is preceded by its cyclic prefix. In PW mode the payload data is surrounded at the start and at the end by the same known pilot word. The data burst is defined as the concatenation of the payload data with a pilot word. In both cases, PW mode or CP mode, the prefix makes the data burst cyclic. This means that the effect of filters and the channel on the data can be described as a cyclic convolution. In the standard the length of the PW and CP is N/4 which means only channels with length up to N/4 can be equalized without inter symbol interference. An equivalent discrete base band model can be constructed as follows: The complex vector $\underline{d}$ represents a discrete modulated data burst of length N at the input of the transmitter DACs. The output of the DACs is convolved with the low pass filters $\underline{g}_t$. The multiplication with the local oscillator (LO) carrier signal and its 90° shifted version will introduce transmit IQ imbalance. The equivalent complex discrete base band representation at the input of the power amplifier (PWA) the signal is:

$$\underline{s}_t = \alpha_t(\underline{g}_t \otimes \underline{d}) + \beta_t(\underline{g}_t \otimes \underline{\tilde{d}}) = \underline{g}_t \otimes (\alpha_t \underline{d} + \beta_t \underline{\tilde{d}}) \quad (6)$$

where $\alpha_t \equiv \cos\phi_t + \emptyset\epsilon_t \sin\phi_t$, $\beta_t \equiv \epsilon_t \cos\phi_t - \emptyset\sin\phi_t$ are the complex transmit IQ imbalance parameters with $\epsilon_t$ the amplitude mismatch and $\phi_t$ the phase mismatch. $\underline{g}_t$ is the impulse response of the low pass filter and $\underline{gt} = \underline{\tilde{g}}_t$ because the filter taps are real. $\otimes$ is the cyclic convolution operator. At the output of the low noise amplifier (LNA):

$$\underline{s}_l = \underline{g}_c \otimes \underline{g}_t \otimes (\alpha_t \underline{d} + \beta_t \underline{\tilde{d}}) \quad (7)$$

with $\underline{g}_c$ the combined impulse response of the PWA, the transmit band pass filter, the channel, the receive band-bass filter and the LNA. In the receiver the incoming RF signal is mixed with the local oscillator of the receiver. This will cause CFO and IQ imbalance. The effect of the CFO can be modeled by a multiplication with $\phi C \cdot \phi = e^{j(2\pi f_{cfo} \Delta T + \chi)}$ is the average angle rotation on the data burst caused by the CFO over a time $\Delta T$ from the start of the frame and $\chi$ an unknown phase. $\overline{C}$ represents the difference in angle rotation caused by the CFO on the individual symbols of the data burst. $\overline{C}$ is a diagonal matrix of size N, with diagonal element k:

$$e^{j2\pi \frac{f_{cfo}}{f_s}(k-\frac{N}{2})},$$

($f_s$ is the sample frequency and $f_{cfo}$ is the CFO frequency.). The receive IQ imbalance is modeled by the complex parameters $\alpha_r \equiv \cos\phi_r + \emptyset\epsilon_r \sin\phi_r$ and $\beta_r \equiv \epsilon_r \cos\phi_r - \emptyset\sin\phi_r$ with $\epsilon_r$ the amplitude mismatch and $\phi_r$ the phase mismatch. At the output of the mixers the equivalent complex baseband signal becomes:

$$\underline{s}_m = \alpha_r \phi C \underline{s}_l + \beta_r (\phi C \underline{s}_l) = \alpha_r \phi C \underline{s}_l + \beta_r \tilde{\phi} (C \underline{\tilde{s}}_l) \quad (8)$$

After convolution with the receiver low pass filters $\underline{g}_r$ we get:

$$\underline{s}_r = \alpha_r \phi \underline{g}_r \otimes (C \underline{s}_l) + \beta_r \tilde{\phi} \underline{g}_r \otimes (\tilde{C} \underline{\tilde{s}}_l) = \alpha_r \phi C \underline{g}_r \otimes \underline{s}_l + \beta_r \tilde{\phi} C \underline{\tilde{g}}_r \otimes \underline{\tilde{s}}_l \quad (9)$$

with $$\underline{g}_r[k] \equiv \underline{g}_r[k] e^{-j2\pi \frac{f_{cfo}}{f_s} k}$$

for $k \in 0 \ldots N-1$. (9) can be derived by developing the convolution and because the taps of $\underline{g}_r$ are real. Inserting (7) in (9) yields:

$$\underline{s}_r = \alpha_r \phi C \underline{g}_r \otimes \underline{g}_c \otimes \underline{g}_t \otimes (\alpha_t \underline{d} + \beta_t \underline{\tilde{d}}) \alpha \beta_r \tilde{\phi} C \underline{\tilde{g}}_r \otimes \underline{\tilde{g}}_c \otimes \underline{\tilde{g}}_t \otimes (\alpha_t \underline{d} + \beta_t \underline{\tilde{d}})$$

$$\underline{s}_r = \alpha_r \phi C \underline{h} \otimes (\alpha_t \underline{d} + \beta_t \underline{\tilde{d}}) + \beta_r \tilde{\phi} C \underline{\tilde{h}} \otimes (\alpha_t \underline{d} + \beta_t \underline{\tilde{d}}) \quad (10)$$

with $\underline{h} \equiv \underline{g}_r \otimes \underline{g}_c \otimes \underline{g}_t$.

In the above derivations the noise has not been considered. The bulk of the noise comes from the noise contribution of the LNA. In the model of FIG. 3 this noise contribution n is added after the LNA. $\underline{n}$ is a complex vector; the noise is assumed to be white Gaussian noise with a variance $\sigma_n^2$. With a similar derivation that led to (9) one can write:

$$\underline{n}_{s_r} = \alpha_r \phi C \underline{g}_r \otimes \underline{n} + \beta_r \tilde{\phi} C \underline{\tilde{g}}_r \otimes \underline{\tilde{n}} \quad (11)$$

$\underline{n}_{s_r}$ is the discrete complex base band representation of the noise at the output of the ADCs.

2. Compensation of IQ Imbalance CFO and Channel

In what follows it will be assumed that a series of parameters necessary for the compensations are known. These parameters will be estimated later. First process is the compensation of the receiver IQ imbalance. For this compensation the receiver IQ imbalance ratio $$r_r \equiv \frac{\beta r}{\tilde{\alpha} r}$$

is needed. On the received signal $\underline{s}_r$ the following operation is applied:

$$\underline{s}_r - r_r \tilde{\underline{s}}_r = \frac{|\alpha_r|^2 - |\beta_r|^2}{\tilde{\alpha}_r} \phi C \underline{h} \otimes (\alpha_t \underline{d} + \beta_t \underline{\tilde{d}}) \quad (12)$$

The second process is the compensation of the CFO. In (12) a term $\phi \overline{C}$ remains, of which $\overline{C}$ can be compensated by multiplication with $\tilde{C}$. At this stage the average rotation caused by the CFO, $\phi$ will only be partially compensated. A compensation of $\theta = e^{-j(2\pi f_{cfo}(\Delta T - \Delta T_c))}$ will be applied. $\Delta T_c$ is the time between the start of the frame and the moment of the channel estimation. $\Delta_T - \Delta T_c$ is the time elapsed between the middle of the data block on which the channel is estimated and the middle of the data burst under compensation. $\theta$ compensates the incremental rotation caused by the CFO during this time lapse. In order to perform this compensation $f_{cfo}$ has to be known to construct $\tilde{C}$ and $\theta$. We also need to keep track of the elapsed time $\Delta T - \Delta T_c$. In practice the above described compensations will be done by successively multiplying each received symbol with $$e^{-j2\pi \frac{f_{cfo}}{f_s}}$$

starting from the time of the channel estimation. The result after CFO compensation:

$$\underline{s}_c \equiv \vartheta \tilde{\underline{C}}[\underline{s}_r - r_r \tilde{\underline{s}}_r] = \frac{|\alpha_r|^2 - |\beta_r|^2}{\tilde{\alpha}_r} \vartheta \phi \underline{h} \otimes (\alpha_t \underline{d} + \beta_t \underline{\tilde{d}}) \quad (13)$$

-continued $$s_c \equiv \gamma \underline{h} \otimes (\alpha_t \underline{d} + \beta_t \underline{\tilde{d}}), \quad \gamma \equiv \frac{|\alpha_r|^2 - |\beta_r|^2}{\tilde{\alpha}_r} e^{j(2\pi f_{cfo} \Delta T_c + \chi)}$$

The third process is the channel equalization. It will be shown later that an estimation of the channel can be made which results in:

$$\underline{g} = \gamma \alpha_t \underline{h} \quad (14)$$

With g a frequency domain equalization is possible, either a Zero Forcing (ZF) or an MMSE detector can be used. If the channel is quasi line of sight, g can be replaced by its largest tap $g_m$ and an approximate time domain equalization can be done by multiplying with the scalar $1/g_m$. Frequency domain equalization will be assumed with a diagonal matrix $\underline{E}$:

$$\underline{E} \equiv \underline{G}^{-1} \text{ for } ZF \quad (15)$$

$$\underline{E} \equiv \left[\underline{G}^H \underline{G} + \frac{\sigma_{n_{s_c}}^2}{\sigma_s^2} \underline{I}\right]^{-1} \underline{G}^H \text{ for } MMSE \quad (16)$$

with G a diagonal matrix with on its diagonal the discrete Fourier transform (DFT) of $\underline{g}$, with I an identity matrix of size N, with $$\sigma_{n_{s_c}}^2$$

the variance of the noise on $s_c$ and with $\sigma_s^2$ the average energy of the symbol constellation.

$$\sigma_{n_{s_c}}^2$$

is a parameter which must be estimated and $\sigma_s^2$ is known. Applying the equalization results in:

$$\underline{s}_e \equiv \underline{F}^H \underline{E} \underline{F} \vartheta \underline{\tilde{C}} [\underline{s}_r - r_r \underline{\tilde{s}}_r] = \underline{d} + \frac{\beta_t}{\alpha_t} \underline{\tilde{d}} \quad (17)$$

with F is the normalized DFT matrix. The fourth an final process is the compensation of the transmitter IQ imbalance. Assuming that the transmitter IQ imbalance ratio $$r_t \equiv \frac{\beta_t}{\alpha_t}$$

is known, we can write:

$$\underline{d} = \frac{\underline{s}_e - r_t \underline{\tilde{s}}_e}{1 - |r_t|^2} \quad (18)$$

Figure 5:
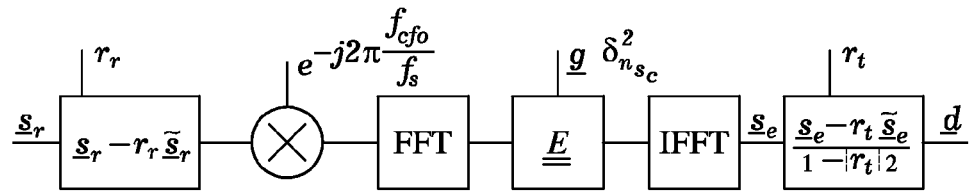
FIG. 5 shows a compensation scheme of one embodiment.

An overview of the successive compensation is shown in FIG. 5. For a SC signal we are interested in d as recovered in (18). In case of OFDM we are interested in the DFT of d:D. In order to avoid the inverse DFT after equalization, it is better to stay in the frequency domain with $\underline{S}_e$ which is the DFT of $\underline{s}_e$ in (17) and make the compensation for the transmitter IQ imbalance in the frequency domain. Taking the DFT of (18) yields:

$$\underline{D} = \frac{\underline{S}_e - r_t \underline{\tilde{S}}_e^P}{1 - |r_t|^2} \quad (19)$$

taking into account that the DFT of $\underline{\tilde{s}}_e$ is:

$$F\underline{\tilde{s}}_e = \underline{F}[\underline{F}^H \underline{S}_e]^* = \underline{FF}^T \underline{\tilde{S}}_e = \underline{P}\underline{\tilde{S}}_e = \underline{\tilde{S}}_e^P \quad (20)$$

$\underline{P} = \underline{FF}^T$ is a permutation matrix and the superscript $^P$ is the corresponding permutation operator.

To get insight into the effect of the compensation on the noise, we start with $\underline{n}_{s_r}$ as derived in (11). After receiver IQ imbalance compensation:

$$\underline{n}_{\{s_r - r_r \tilde{s}_r\}} = \frac{|\alpha_r|^2 - |\beta_r|^2}{\tilde{\alpha}_r} \phi \underline{Cg}_r \otimes \underline{n} \quad (21)$$

After CFO compensation:

$$\underline{n}_{s_c} = \gamma \underline{g}_r \otimes \underline{n} \quad (22)$$

After equalization:

$$\underline{n}_{s_e} = \frac{1}{\alpha_t} \underline{n}_a \text{ with for} \quad (23)$$

$$ZF: \underline{n}_a \equiv \underline{F}^H \underline{G}_c^{-1} \underline{G}_t^{-1} \underline{F} \underline{n}$$

$$MMSE: \underline{n}_a \equiv \underline{F}^H \left[\underline{G}_t^H \underline{G}_t \underline{G}_c^H \underline{G}_c + \frac{\sigma_n^2}{|\alpha_t|^2 \sigma_s^2} \underline{I}\right]^{-1} \underline{G}_t^H \underline{G}_c^H \underline{F} \underline{n}$$

where $G_c, G_t$ are both diagonal matrices, with on their respective diagonal the DFT of $\underline{g}_c$ and $\underline{g}_r$. We see that after equalization the effect on the noise of the receiver IQ imbalance, as well as the effect on the noise of the receiver low pass filter have been eliminated. This is to be expected, because the receiver IQ imbalance and receiver low pass filter are applied after noise addition. The equalization of filters and channel amplifies the noise, resulting in a new noise vector $\underline{n}_a$. The term $$\frac{1}{\alpha_t}$$

relates to the transmitter IQ imbalance and can best be interpreted after the last compensation process. After transmitter IQ imbalance compensation we get a noise $\underline{n}_d$:

$$\underline{n}_d = \frac{1}{\alpha_t} \left[\frac{1}{1 - |r_t|^2}\right] \left[\underline{n}_a - \frac{\beta_t}{\tilde{\alpha}_t} \underline{\tilde{n}}_a\right] \quad (24)$$

The first 2 scalar terms in (24) are in absolute value >1 and will lead to a noise amplification. The last term, $$\underline{n}_a - \frac{\beta_t}{\tilde{\alpha}_t} \underline{\tilde{n}}_a$$

is complex Gaussian noise but the variance of the noise in the real (I) part and the complex (Q) part are different:

$$\sigma_I^2 = \left[1 - 2\Re\left(\frac{\beta_t}{\tilde{\alpha}_t}\right) + \left|\frac{\beta_t}{\tilde{\alpha}_t}\right|^2\right]\frac{\sigma_{n_a}^2}{2} \quad (25)$$

$$\sigma_Q^2 = \left[1 + 2\Re\left(\frac{\beta_t}{\tilde{\alpha}_t}\right) + \left|\frac{\beta_t}{\tilde{\alpha}_t}\right|^2\right]\frac{\sigma_{n_a}^2}{2} \quad (26)$$

with $\sigma_{n_a}^2$ the variance of the noise $\underline{n}_a$. Either $\sigma_I^2$ will increase and $\sigma_Q^2$ will decrease or vice versa depending on the sign of $$\Re\left(\frac{\beta_t}{\tilde{\alpha}_t}\right).$$

This will always lead to an increase in bit error rate (BER). This effect can also be understood as follows: the transmitter IQ imbalance distorts the constellation, bringing some constellation points closer while increasing the distance between others. The distance between the transmitted constellation points is not optimal anymore, leading to an increase in BER which can not be undone at the receiver.

3. Estimation of the IQ Imbalance Ratios on the Received CES

It will be convenient and useful to be able to express the cyclic correlation as a product of matrices. Let for example $\underline{X}(\tilde{a},y)$ be the cyclic correlation of $\tilde{a}$ with $y$. We define $A$ as the DFT of $a$. Similarly to (20), the DFT of $\tilde{a}$ is $\tilde{A}^P$. The cyclic correlation is the transpose of the cyclic convolution:

$$\underline{X}(\tilde{a},\underline{y})=[F^H\tilde{A}^PF]^T\underline{y}=F^H\tilde{A}F\underline{y} \quad (27)$$

With $\tilde{A}^P$, $\tilde{A}$ the diagonal matrices formed from respectively vectors $\tilde{A}^P$ and $\tilde{A}$. Also $\tilde{A}^P=P\tilde{A}P$.

With (27) the following interesting property can be derived:

$$\underline{X}(\tilde{a},\underline{h}\otimes\underline{y})=F^H\tilde{A}HF\underline{y}=(F^H HF)(F^H\tilde{A}F)\underline{y}=\underline{h}\otimes\underline{X}(\tilde{a},\underline{y}) \quad (28)$$

Figure 6:
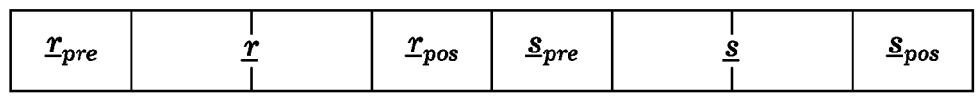
FIG. 6 shows a received CES sequence of one embodiment.

At the receiver, after time synchronization on the first part of the preamble, it is possible to isolate the received version of the CES (see FIG. 6).

Due to the presence of cyclic prefixes, $\underline{a},\underline{b}$ can be treated similarly to a data burst and (10) can be applied:

$$\underline{r}=\alpha_r\phi_a\underline{Ch}\otimes(\alpha_t\underline{a}+\beta_t\underline{\tilde{a}})+\beta_r\tilde{\phi}_a\underline{C\tilde{h}}\otimes(\alpha_t\underline{a}+\beta_t\underline{\tilde{a}}) \quad (29)$$

$$\underline{s}=\alpha_r\phi_b\underline{Ch}\otimes(\alpha_t\underline{b}+\beta_t\underline{\tilde{b}})+\beta_r\tilde{\phi}_b\underline{C\tilde{h}}\otimes(\alpha_t\underline{b}+\beta_t\underline{\tilde{b}}) \quad (30)$$

with $$\phi_a = e^{j(2\pi f_{cfo}\Delta T_c+\chi)} \text{ and}$$

$$\phi_b = \phi_a e^{j2\pi f_{cfo}\frac{2N}{f_s}} \equiv \phi_a\psi.$$

$\psi$ is the extra rotation caused by the CFO between a and b separated by 2N symbols. With a similar derivation that led to (12) we can write:

$$\underline{r}-r_t\underline{\tilde{r}}=\gamma\underline{Ch}\otimes(\alpha_t\underline{a}+\beta_t\underline{\tilde{a}}) \quad (31)$$

$$\underline{s}-r_t\underline{\tilde{s}}=\psi\gamma\underline{Ch}\otimes(\alpha_t\underline{b}+\beta_t\underline{\tilde{b}}) \quad (32)$$

with $\gamma$ as defined in (13). In (31) we would like to eliminate the dependence on $\underline{a}$ and $\underline{\tilde{a}}$. This can be done by a cyclic correlation with $\tilde{a}$ and using property (28). But before (28) can be used the CFO related term in C must be eliminated. At this stage of the estimation process only a rough CFO estimate is known. Define $f_r$ as the rough CFO estimate; define $\underline{\tilde{R}}$ as a diagonal matrix of size N, with diagonal element $$k: e^{j2\pi\frac{f_r}{f_s}(k-\frac{N}{2})}.$$

So after compensation with $\underline{\tilde{B}}$ and correlation with $\tilde{a}$ we get:

$$\underline{X}(\tilde{a},\underline{\tilde{R}}[\underline{r}-r_t\underline{\tilde{r}}])=\gamma\underline{X}(\tilde{a},\underline{\tilde{R}C h}\otimes[\alpha_t\underline{a}+\beta_t\underline{\tilde{a}}]) \quad (33)$$

In the right hand side of (33), provided that the rough CFO estimation is accurate enough, $\tilde{R}C$ will be close to the identity matrix and can be neglected. Using (28), this approximation leads to:

$$\gamma\underline{X}(\tilde{a},\underline{\tilde{R}C h}\otimes[\alpha_t\underline{a}+\beta_t\underline{\tilde{a}}])\approx\gamma\alpha_t\underline{h}\otimes\underline{X}(\tilde{a},\underline{a})+\gamma\beta_t\underline{h}\otimes\underline{X}(\tilde{a},\underline{\tilde{a}}) \quad (34)$$

For channels $h$ with a length up to $N/4$, using properties (4), (5) yields $\forall k\in\{0:N/4-1\}$:

$$[\gamma\alpha_t\underline{h}\otimes\underline{X}(\tilde{a},\underline{a})+\gamma\beta_t\underline{h}\otimes\underline{X}(\tilde{a},\underline{\tilde{a}})]_k=\gamma\alpha_t h_k N \quad (35)$$

The left hand side of (33) can be developed as follows:

$$\underline{X}(\tilde{a},\underline{\tilde{R}}[\underline{r}-r_t\underline{\tilde{r}}])=\underline{X}(\tilde{a},\underline{Rr})-r_t\underline{\tilde{X}}(a,Rr)=\underline{X}(\tilde{a},\underline{\tilde{R}r})+r_t+\underline{\tilde{X}}(\tilde{b},Rr) \quad (36)$$

The second process in (36) is a consequence of property (3). Combining (33), (34), (35), (36) yields $\forall k\in\{0:N/4-1\}$:

$$X_k(\tilde{a},\underline{\tilde{R}r})+r_t\tilde{X}_k(\tilde{b},Rr)\approx\gamma\alpha_t h_k N \quad (37)$$

By correlating (31) with $\tilde{b}$ instead of $\tilde{a}$ and by processing in a similar way as above, we get $\forall k\in\{0:N/4-1\}$:

$$X_k(\tilde{b},\underline{\tilde{R}r})+r_t\tilde{X}_k(\tilde{a},Rr)\approx-\gamma\beta_t h_k N \quad (38)$$

The same processing is also done on $\underline{s}$ starting from (32). A CFO compensation of $\tilde{\rho}\tilde{R}$ with $$\rho = e^{2\pi f_r\frac{2N}{f_s}}$$

is used. $\tilde{\rho}$ compensates the extra rotation caused by the CFO over the elapsed time between $\underline{r}$ and $\underline{s}$. This yields $\forall k\in\{0:N/4-1\}$:

$$X_k(\tilde{a},\tilde{\rho}\underline{\tilde{R}s})+r_t\tilde{X}_k(\tilde{b},\rho\underline{Rs})\approx-\tilde{\rho}\psi\gamma\beta_t h_k N \quad (39)$$

$$X_k(\tilde{b},\tilde{\rho}\underline{\tilde{R}s})+r_t\tilde{X}_k(\tilde{a},\rho\underline{Rs})\approx-\tilde{\rho}\psi\gamma\alpha_t h_k N \quad (40)$$

In approximation, equations (37) and (38) only differ by a factor of $-r_t$ and so do (40) and (39). This yields $\forall k\in\{0:N/4-1\}$:

$$X_k(\tilde{b},\underline{\tilde{R}r})+r_t\tilde{X}_k(\tilde{a},\underline{Rr})\approx-r_t[X_k(\tilde{a},\underline{\tilde{R}r})+r_t\tilde{X}_k(\tilde{b},\underline{Rr})] \quad (41)$$

$$X_k(\tilde{a},\tilde{\rho}\underline{\tilde{R}r})+r_t\tilde{X}_k(\tilde{b},\rho\underline{Rr})\approx-r_t[X_k(\tilde{b},\tilde{\rho}\underline{\tilde{R}r})+r_t\tilde{X}_k(\tilde{a},\rho\underline{Rr})] \quad (42)$$

Figure 7:
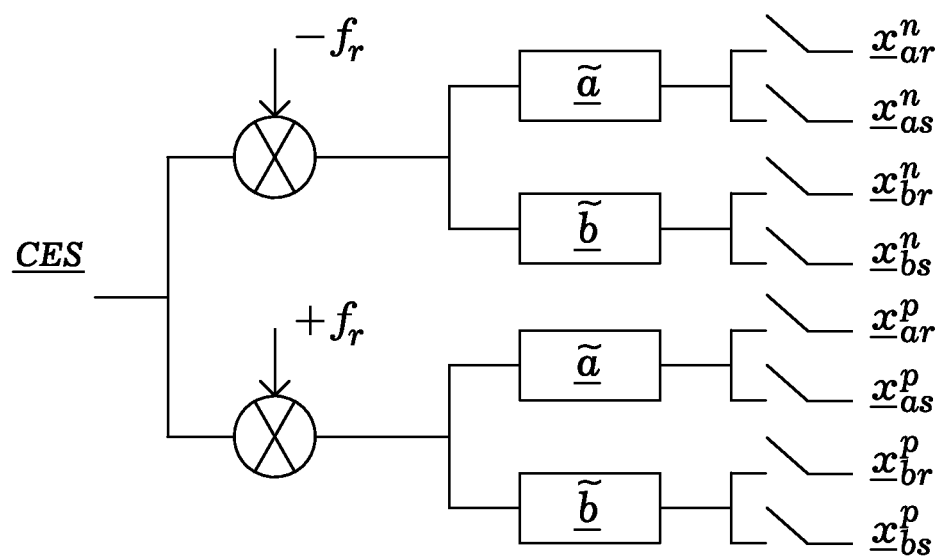
FIG. 7 shows CFO compensation and correlation scheme of one embodiment.

The correlation terms in (41), (42) can be obtained as shown in FIG. 7. The CES is compensated with a negative rough CFO and also with a positive rough CFO. The correlations with a and b are done in hardware by means of convolutions with equivalent matched filters based on a and b. Due to the presence of a cyclic prefix and postfix of length $N/2$ in the CES sequence, a cyclic correlation can be obtained by passing the entire CES sequence through the matched filter corresponding with the correlation sequence. Remark that some of the first elements of the received CES, may be impacted by inter symbol interference but these will not be used. In (41), (42) only N/4 correlation elements are used. To obtain these elements, CES samples $$\frac{N}{2} \ldots \frac{N}{2} + \frac{5N}{4} - 1$$

are used for correlations with $\underline{r}$ and CES samples $$\frac{N}{2} + 2N \ldots \frac{N}{2} + 2N + \frac{5N}{4} - 1$$

are used for correlations with s. Because both a and b have elements with values $\in \{1, -1, j, -j\}$, the matched filter operation implies only a series of sign inversions and additions resulting in a low complexity hardware implementation. To simplify the notation we define a new set of column vectors with length N/4:

$$\underline{x}_{ar}^n \equiv \underline{X}_{[0 \ldots \frac{N}{4}-1]}(\tilde{a}, \tilde{R}\underline{r}), \quad \underline{x}_{ar}^p \equiv \underline{X}_{[0 \ldots \frac{N}{4}-1]}(\tilde{a}, \underline{R}\underline{r}),$$

$$\underline{x}_{as}^n \equiv \underline{X}_{[0 \ldots \frac{N}{4}-1]}(\tilde{a}, \tilde{\rho}\underline{R}\underline{s}), \quad \underline{x}_{as}^p \equiv \underline{X}_{[0 \ldots \frac{N}{4}-1]}(\tilde{a}, \rho\underline{R}\underline{s}),$$

$$\underline{x}_{br}^n \equiv \underline{X}_{[0 \ldots \frac{N}{4}-1]}(\tilde{b}, \tilde{R}\underline{r}), \quad \underline{x}_{br}^p \equiv \underline{X}_{[0 \ldots \frac{N}{4}-1]}(\tilde{b}, \underline{R}\underline{r}),$$

$$\underline{x}_{bs}^n \equiv \underline{X}_{[0 \ldots \frac{N}{4}-1]}(\tilde{b}, \tilde{\rho}\underline{R}\underline{s}), \quad \underline{x}_{bs}^p \equiv \underline{X}_{[0 \ldots \frac{N}{4}-1]}(\tilde{b}, \rho\underline{R}\underline{s}).$$

With these new definitions, (41) and (42) can be rewritten to:

$$\underline{x}_{br}^n + \tilde{\underline{x}}_{ar}^p r_r + \underline{x}_{ar}^n r_t + \tilde{\underline{x}}_{br}^p r_r r_t \approx 0 \qquad (43)$$

$$\underline{x}_{as}^n + \tilde{\underline{x}}_{bs}^p r_r + \underline{x}_{bs}^n r_t + \tilde{\underline{x}}_{as}^p r_r r_t \approx 0 \qquad (44)$$

(43) together with (44) make a set of N/2 non-linear equations in the 2 variables $r_r$, $r_t$. Estimating $r_r$ and $r_t$ on the basis of (43) and (44) can be considered as a non-linear least squares estimation problem. Because the equations are non-linear a closed form solution for the least squares estimator (LSE) does not exist but the problem can be solved as follows: due to the nature of the IQ imbalance $|r_r|$ and $|r_t|$ are much smaller than 1. The product $|r_r r_t|$ will be even an order of magnitude smaller. So in a first approximation the term in $r_r r_t$ in (43), (44) can be neglected with respect to the other terms which makes the equations linear and for these linear equations the LSE can be derived. We define:

$$\underline{M} \equiv \begin{pmatrix} \tilde{\underline{x}}_{ar}^p & \underline{x}_{ar}^n \\ \tilde{\underline{x}}_{bs}^p & \underline{x}_{bs}^n \end{pmatrix}, \quad \underline{K}_1 \equiv \begin{pmatrix} -\underline{x}_{br}^n \\ -\underline{x}_{as}^n \end{pmatrix}.$$

The size of $\underline{M}$ is $$\frac{N}{2} \times 2$$

and the size of $\underline{Q}_1$ $$\frac{N}{2} \times 1.$$

The LSE becomes:

$$\begin{pmatrix} r_{r_1} \\ r_{t_1} \end{pmatrix} = (\underline{M}^H \underline{M})^{-1} \underline{M}^H \underline{K}_1 \qquad (45)$$

$r_{r_1}, r_{t_1}$ is a first approximation of $r_r, r_t$. With $r_{r_1}, r_{t_1}$, the non-linear terms in (43), (44) proportional with $r_r, r_t$ are approximated and a second LSE is derived:

$$\underline{K}_2 = \underline{K}_1 - r_{r_1} r_{t_1} \begin{pmatrix} \tilde{\underline{x}}_{br}^p \\ \tilde{\underline{x}}_{as}^p \end{pmatrix} \qquad (46)$$

$$\begin{pmatrix} r_{r_2} \\ r_{t_2} \end{pmatrix} = (\underline{M}^H \underline{M})^{-1} \underline{M}^H \underline{K}_2 \qquad (47)$$

$r_{r_2}, r_{t_2}$ is a second approximation of $r_r, r_t$. With $r_{r_2}, r_{t_2}$ the process above can be repeated to obtain a third approximation and so on. In practice, simulations did show that the first process (45) is enough and no iteration is needed, even for large IQ imbalance (amplitude mismatch of 10% and phase mismatch of 10°). It is interesting to observe that in (45), that the part which needs matrix inversion: $\underline{M}^H \underline{M}$ is a 2×2 matrix and can easily be inverted.

4. Residual CFO, Channel and Noise Power Estimation

With the estimation of $r_r$, an estimation of the non compensated residual CFO can be made. We define:

$$\underline{P} \equiv \underline{x}_{ar}^n + r_r \tilde{\underline{x}}_{br}^p \approx \gamma \alpha_r \underline{h} N \qquad (48)$$

$$\underline{Q} \equiv \underline{x}_{bs}^n + r_r \tilde{\underline{x}}_{as}^p \approx \tilde{\rho} \psi \gamma \alpha_r \underline{h} N \qquad (49)$$

The approximations in (48), (49) result from (37), (40). The following matrix product yields:

$$\underline{P}^H \underline{Q} \approx \tilde{\rho} \psi |\gamma|^2 |\alpha_r|^2 N^2 \sum_{k=0}^{\frac{N}{4}-1} |h_k|^2 \qquad (50)$$

$$\text{and } \tilde{\rho}\psi = e^{j2\pi(f_{cfo}-f_r)\frac{2N}{f_s}} \approx \frac{\underline{P}^H \underline{Q}}{|\underline{P}^H \underline{Q}|} \qquad (51)$$

$$f_f \equiv f_{cfo} - f_r \approx \frac{f_s}{4\pi N} \text{ angle } (\underline{P}^H \underline{Q}) \qquad (52)$$

in (52) $f_f$ is the residual (fine) CFO and the operator angle(•) takes the angle of a complex scalar.

At this stage it is interesting to calculate the noise on P and Q. To calculate the noise on P we start from (29) and with similar derivations that led to (22) we find that the noise on $\tilde{R}[\underline{r} - r_r \tilde{\underline{r}}]$ is:

$$\underline{n}\{\tilde{R}[\underline{r}-r_r\tilde{\underline{r}}]\} \approx \gamma \underline{g}_r \otimes \underline{n}_r \qquad (53)$$

with $n_r$ the noise on $\tilde{r}$ which is Gaussian with variance $\sigma_n^2$. With similar assumptions and derivations that led to (34) we find that the noise on $X(\tilde{a}, \tilde{R}[\underline{r}-r_r\tilde{\underline{r}}])$ (of which the first N/4 samples correspond to $\underline{P}$) is:

$$\underline{n}\{X(\tilde{a},\tilde{R}[\underline{r}-r_r\tilde{\underline{r}}])\} \approx \gamma \underline{g}_r \otimes \underline{X}(\tilde{a},\underline{n}_r) \qquad (54)$$

$X(\tilde{a},n_r)$ is a sum of independent Gaussian noise samples multiplied with factors which have an absolute value of 1. The result is again Gaussian noise with mean 0 but with variance $N\sigma_n^2$. We take the first N/4 samples of (54) and define the noise on $\underline{P}$ as:

$$n_P \approx \gamma(g_r \otimes X(\tilde{a}, n_r))|_{[0... \frac{N}{4}-1]} \quad (55)$$

In a similar way starting from $\underline{s}$ in (30), the noise on $\underline{Q}$ can be derived:

$$n_Q \approx \tilde{\rho}\tilde{\psi}\gamma(g_r \otimes X(\tilde{b}, n_s))|_{[0... \frac{N}{4}-1]} \quad (56)$$

with $n_s$ the noise on s. $X(\tilde{b},n_s)$ also has a variance of $N\sigma_n^2$. Because $n_r$ and $n_s$ are uncorrelated, $n_P$ and $n_Q$ are also uncorrelated.

In (48), (49) both $\underline{P}$ and $\underline{Q}$ are proportional with $\gamma\alpha_t \underline{h} = \underline{g}$, and differ only by a scalar factor $\tilde{\rho}\tilde{\psi}$ estimated in (51). So an estimate of $\underline{g}$ is:

$$\frac{1}{2N}(\underline{P} + \tilde{\rho}\tilde{\psi}\underline{Q}) \approx \gamma\alpha_t\underline{h} = \underline{g} \quad (57)$$

The noise on $\underline{P}$ and $\underline{Q}$ is uncorrelated and will be averaged out by the sum in (57). $\underline{P}$ and $\underline{Q}$ differ only by a rotation of $\tilde{\rho}\tilde{\psi}$ and noise, so if we compensate for this rotation and subtract, only noise will remain:

$$\underline{P} - \tilde{\rho}\tilde{\psi}\underline{Q} \approx n_P - \tilde{\rho}\tilde{\psi}n_Q \quad (58)$$

$$\approx \gamma(g_r \otimes [X(\tilde{a}, n_r) - X(\tilde{b}, n_s)])|_{[0... \frac{N}{4}-1]} \quad (59)$$

$X(\tilde{a},n_r) - X(\tilde{b},n_s)$ is Gaussian noise with variance $2N\sigma_n^2$. (58) permits to estimate $$\sigma_{n_{s_c}}^2,$$

the noise variance used in the MMSE detector of (16). In (22), the noise $n_{s_c} = \gamma g_r \otimes n$ is similar to (59) except that the variance of the noise in (59) is 2N times higher than the variance of $n_{s_c}$. By calculating the total energy on the N/4 samples in (58) and scaling properly we get:

$$\sigma_{n_{s_c}}^2 \approx \frac{2}{N^2}|\underline{P} - \tilde{\rho}\tilde{\psi}\underline{Q}|^2 \quad (60)$$

5. The Estimation Methods Under Boundary Conditions

The above explained estimation sequence starts with and depends on the estimation of $r_r, r_t$ from the N/2 equations in (41), (42). Equations (41), (42), are not equalities but approximations. The approximation results from the imperfect CFO compensation with the rough CFO. A large rough CFO estimation error will mean a poor approximation and a bad estimation of $r_r$ and $r_t$. How much error on the rough CFO estimate is still acceptable will be examined by simulation.

Another potential problem occurs if the CFO is zero or close to zero. In this case and under the assumption of a perfectly estimated rough CFO compensation of $\rho=\psi=1$ and R=C=I, the correlations used in (41), (42) become, using (29), (30) and properties (3), (4), (5), $\forall k \in \{0:N/4-1\}$:

$$X_k(\tilde{a},\underline{r}) = \alpha_r h_k \alpha_t N + \beta_r \tilde{h}_k \tilde{\beta}_t N = =X_k(\tilde{b},\underline{s}) \quad (61)$$

$$X_k(\tilde{b},\underline{r}) = \alpha_r h_k \beta_t N - \beta_r \tilde{h}_k \tilde{\alpha}_t N = =X_k(\tilde{a},\underline{s}) \quad (62)$$

The equalities between the correlations in (61), (62) make the set of equations in (41) apart from the noise, equal to the set of equations in (42). This does not pose a problem; the LSE uses all equations and will tend to average out the noise between equations (41) and there equivalents in (42).

Still under condition of a zero CFO, we see from (61), (62) that the correlations depend on $h_k, \tilde{h}_k$. If $h_k$=0, the correlations reduce to noise only. This means that $\forall k$ with $h_k$=0 the corresponding equations in (41), (42) become meaningless and will only burden the LSE with extra noise. In the extreme case where the CFO is zero and h is a line of sight channel with a single tap, there will be only one independent equation left to resolve the 2 unknowns $r_r$ and $r_t$ which is impossible. For a single tap channel with zero CFO the problem cannot be solved with the LSE. In practice this extreme condition will not occur because h is the concatenation of the channel with a set of filters, filters which do have multiple taps. Nevertheless, the performance of the estimators will be checked under zero CFO condition for a line of sight (LOS) channel.

6. Results

All simulations are for a single carrier with a $\pi/2$-16QAM modulation. The symbol length is N=256 with a cyclic prefix of 64 yielding an uncoded bit-rate of 5530 Mbps. An MMSE equalizer is used for symbol recovery. The parameters for the receiver IQ mismatch are 5% for the amplitude imbalance and 5° for the phase imbalance. For the transmitter IQ mismatch the amplitude imbalance is 5% and the phase imbalance is −5°. Together with the IQ imbalance CFO is applied. If not specifically mentioned the amount of CFO is always 40 ppm.

Figure 8:
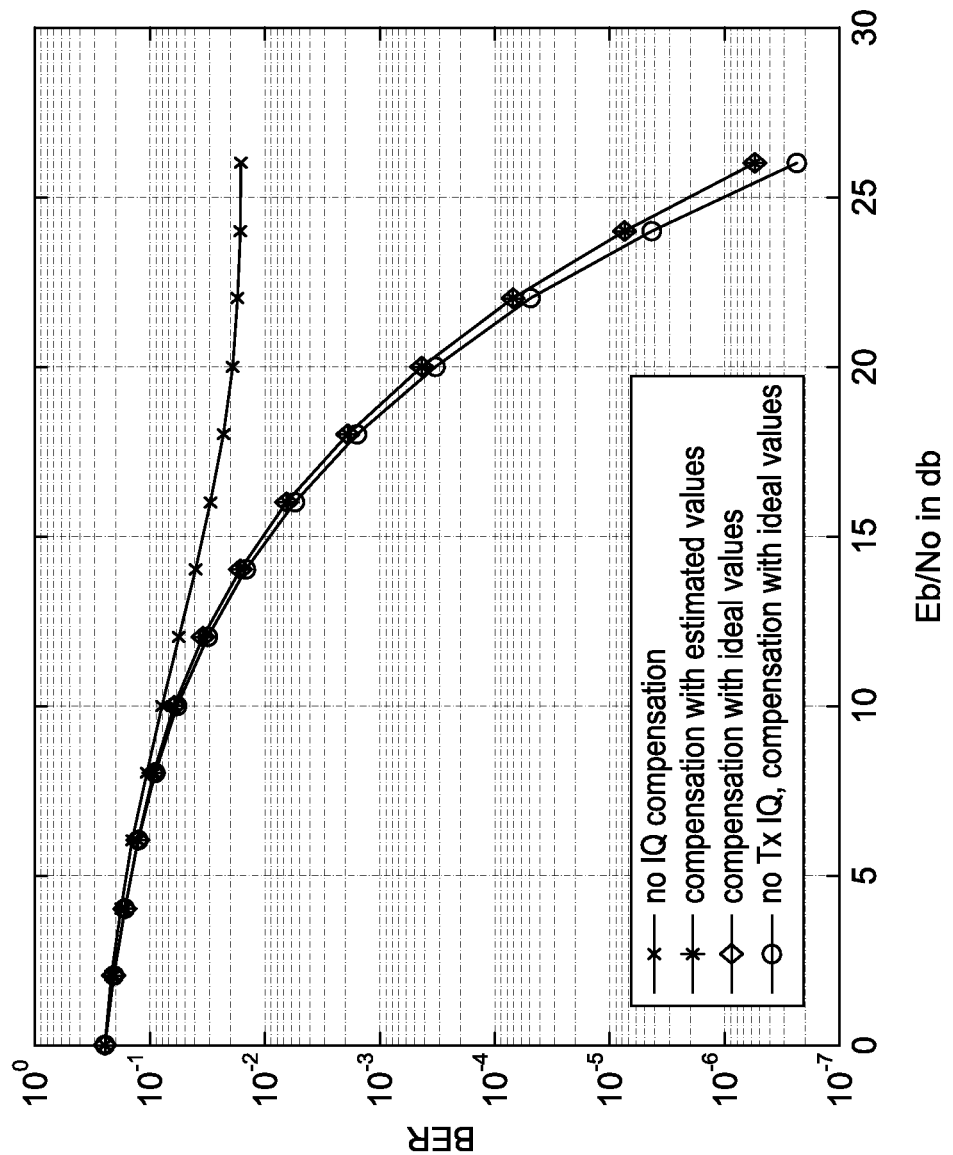
FIG. 8. plots the BER versus Eb/No for 16QAM of one embodiment.

A first set of simulations is made to examine the impact on the BER. A set of 200 multi-path channels of type CM15 as defined by the IEEE TG3c Channel Modeling Sub-committee [6], is used. The results are shown in FIG. 8. The first curve shows a system with CFO compensation but without IQ imbalance compensation. Not compensating the IQ imbalance results in a flooring above a BER of $10^{-2}$. The second curve shows a system with compensated CFO and IQ imbalance. The parameters used in the compensation are values estimated with the algorithms described above. The third curve is generated under the same conditions as the second except that the compensation parameters are the ideal values. There is almost no difference between the 2 curves, proving that the estimation of the parameters is accurate. At a BER of $10^{-4}$ there is only a degradation of 0.05 db. The fourth curve is a simulation with CFO and receiver IQ imbalance but without transmitter IQ imbalance, the compensation parameters are ideal. The difference between curves three and four, 0.4 db at a BER of $10^{-4}$, illustrates the loss in performance due to the constellation deformation caused by the transmitter IQ imbalance. The loss in BER cannot be recovered at the receiver even with perfect knowledge of the compensation parameters.

Figure 9:
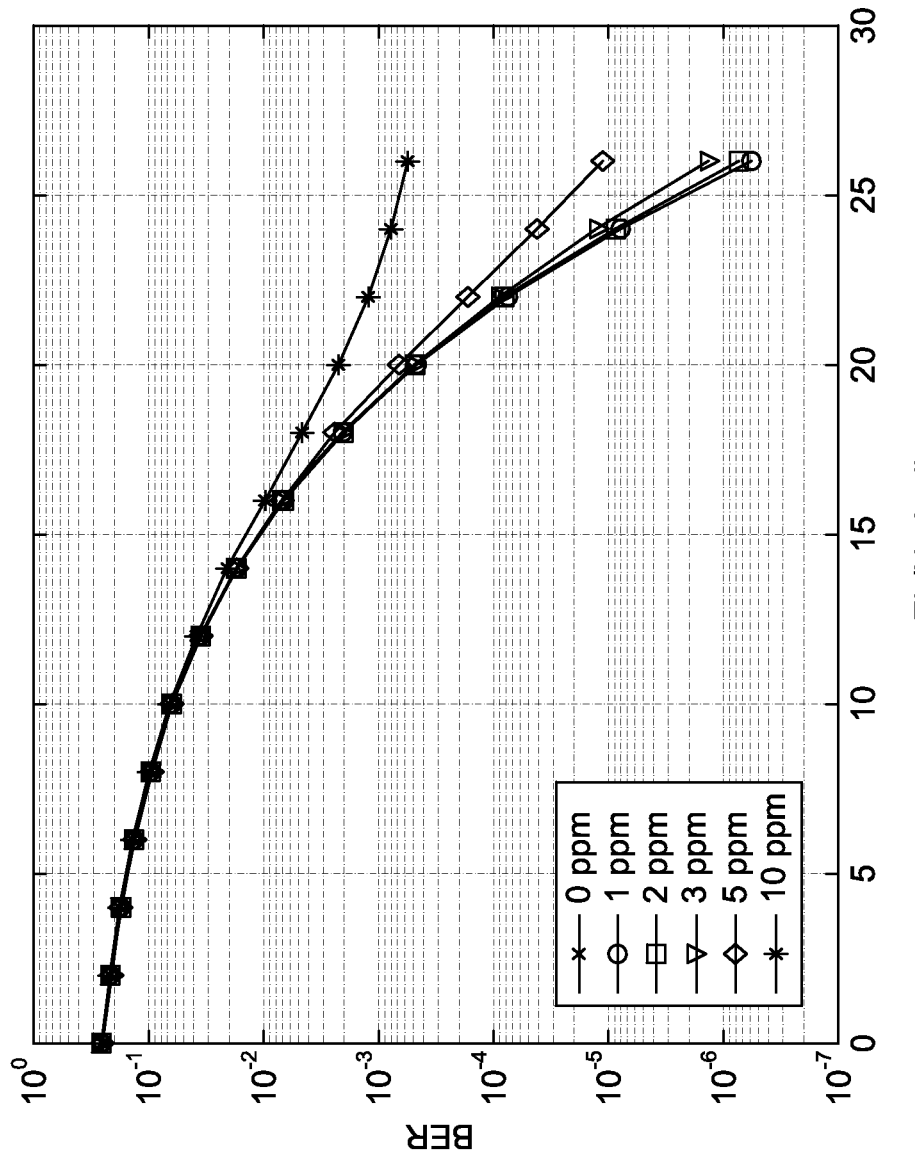
FIG. 9. plots the BER for different rough CFO estimation errors of one embodiment.

A second set of simulations was made to examine the sensitivity of the algorithms to errors on the rough CFO estimation. For this purpose the error on the rough CFO estimate was fixed. The same CM15 set of 200 channels was used. Rough CFO errors from 0 ppm till 10 ppm were applied. The results are shown in FIG. 9. The performance degradation is acceptable up to a rough CFO error of 3 ppm (degradation of 0.15 db at a BER of $10^{-4}$). The condition of 3 ppm accuracy is easily met by the rough CFO estimator on the first part of the preamble.

Figure 10:
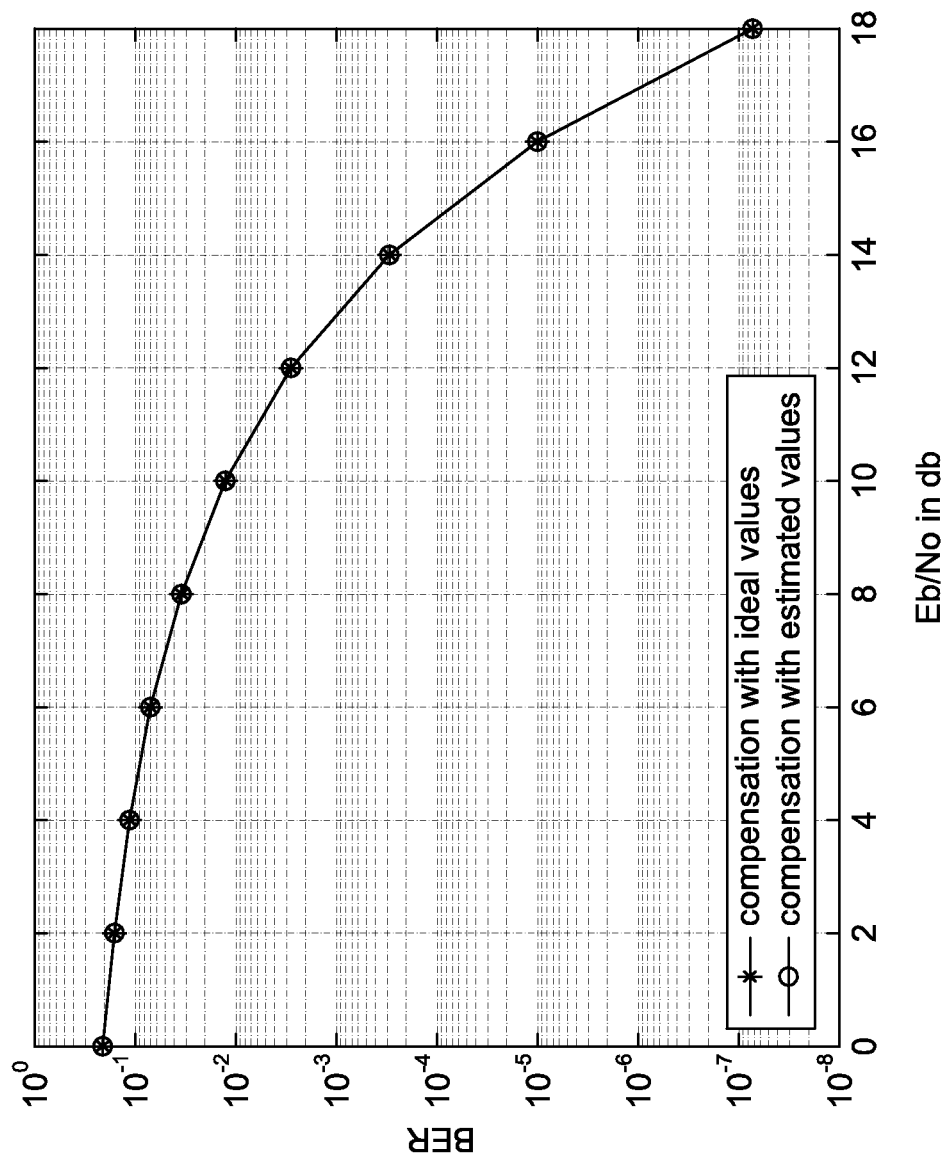
FIG. 10 plots the BER for LOS channel of one embodiment.

A third set of simulations was made to see if there is a performance degradation when getting close to the boundary condition of a zero CFO combined with a LOS channel. For the simulations the CM15 channel set was replaced with a LOS channel. So the resulting channel becomes the concatenation of the filters in the transmitter and the receiver. The compensation was done with estimated parameters and with ideal parameters. The result is shown in FIG. 10. No significant difference can be observed between the ideal and the estimated curve, proving the estimation is not degraded.

Part B

Figure 11:
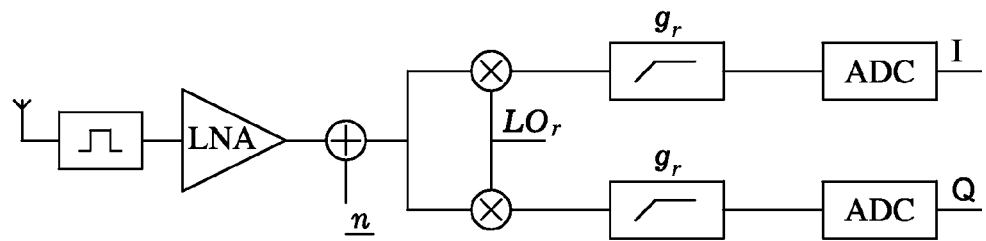
FIG. 11 shows schematically a receive chain of one embodiment.
Figure 12:
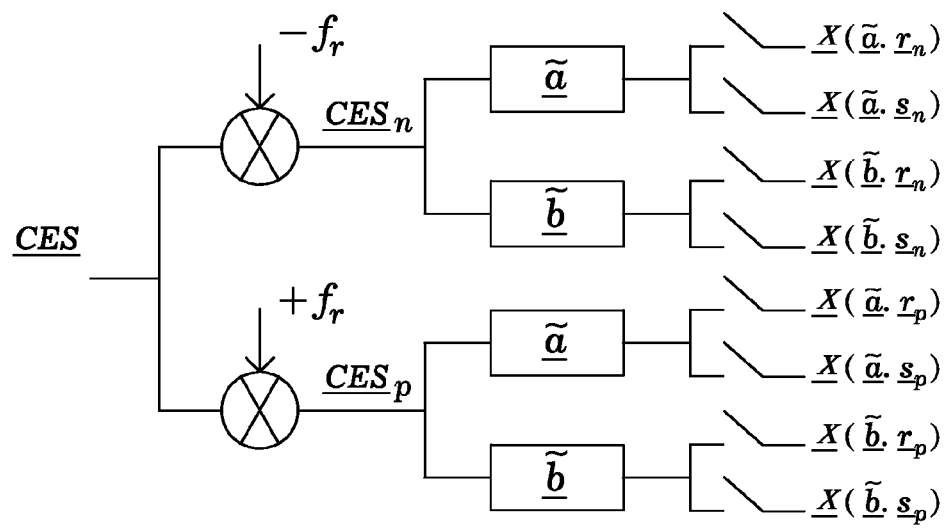
FIG. 12 shows CFO compensation and correlation scheme of one embodiment.

Part B describes more specific a compensation scheme for frequency independent receiver IQ imbalance only. The receive chain is represented in FIG. 11.

1. Transmit-Receive Model for the CES Part of the Preamble

At the receiver, after time synchronization on the first part of the preamble, it is possible to isolate the received version of the CES (see FIG. 6).

Because of the cyclic prefix, the effect of the channel on the PGCP (a,b) embedded in the CES, can be described as a cyclic convolution. After the receiver band pass filter:

$$\underline{v} = \underline{h} \otimes \underline{a} = F^H H F \underline{a} \text{ and } \underline{w} = \underline{h} \otimes \underline{b} = F^H H F \underline{b} \quad (63)$$

With h the combined response of the transmit pulse shape filter, the channel and the receive band pass filter, $\otimes$ is the cyclic convolution, H is a diagonal matrix with on the diagonal the DFT of h. After amplification and down-conversion CFO, IQ-imbalance and noise are introduced:

$$\underline{r} = \alpha \underline{C} \underline{v} + \beta \underline{\tilde{C}} \underline{\tilde{v}} + \underline{n}_r \quad (64)$$

$$\underline{s} = \alpha \phi \underline{C} \underline{w} + \beta \phi \underline{\tilde{C}} \underline{\tilde{w}} + \underline{n}_s \text{ with } \phi \equiv e^{j 2\pi f_{cfo} \frac{2N}{f_s}} \quad (65)$$

in equations (64), (65) $\alpha \equiv \cos \phi + \emptyset \epsilon \sin \phi$, $\beta \equiv \cos \phi - \emptyset \sin \phi$ are the complex IQ imbalance parameters with $\epsilon$ the amplitude imbalance and $\phi$ the phase imbalance. The impact of the CFO is represented by C which is a diagonal matrix of size N, with diagonal element $$k : e^{j 2 \pi \frac{f_{cfo}}{f_s} k},$$

($f_{cfo}$ is the CFO frequency and $f_s$ is the sample frequency); $\phi$ is a scalar representing the impact of the phase rotation caused by the CFO over the time between the symbols a and b. This time is equal to $$2N \frac{1}{f_s}.$$

$n_r$ and $n_s$ are vectors representing the noise on r and s. The noise is assumed to be Gaussian with a variance of $\sigma_n^2$.

2. CFO Compensation on the Received Signal

As was explained in the introduction, the CFO can be roughly estimated on the first part of the preamble using the method in [3] which has the least implementation complexity. With this rough CFO estimate, compensations will be made on r and s embedded in the received CES sequence (see FIG. 7). Define $f_r$ as the rough CFO estimate; define R as a diagonal matrix of size N, with diagonal element $$C_k = e^{j 2\pi \frac{f_r}{f_s} k};$$

define $$\rho \equiv e^{j 2\pi f_r \frac{2N}{f_s}}.$$

Traditionally to compensate for the impact of the rough CFO one multiplies $\underline{r}$ with $\tilde{R}$ and $\underline{s}$ with $\rho \tilde{R}$ yielding:

$$\underline{r}_n = \tilde{R}\underline{r} = \alpha \Psi \underline{v} + \beta \tilde{\Gamma} \underline{\tilde{v}} + \tilde{R}\underline{n}_r \quad (66)$$

$$\underline{s}_n = \rho \tilde{R}\underline{s} = \alpha \omega \Psi \underline{w} + \beta \tilde{\gamma} \tilde{\Gamma} \underline{\tilde{w}} + \rho \tilde{R}\underline{n}_s \quad (67).$$

with $\psi \equiv \tilde{\rho} R \phi$, $\Psi \equiv \tilde{R}C$, $\gamma \equiv \rho \phi$, $\Gamma \equiv RC$.

It is also useful, as will be shown later, to compensate with a positive rough CFO:

$$\underline{r}_p = R\underline{r} = \alpha \Gamma \underline{v} + \beta \tilde{\Psi} \underline{\tilde{v}} + R\underline{n}_r \quad (68)$$

$$\underline{s}_p = \rho R\underline{s} = \alpha \gamma \Gamma \underline{w} + \beta \tilde{\psi} \tilde{\Psi} \underline{\tilde{w}} + \rho R\underline{n}_s \quad (69)$$

Now the negatively compensated couple $r_n$, $s_n$ and the positively compensated couple $r_p$, $s_p$, I will be both correlated with $\tilde{a}$ and $\tilde{b}$. Hardware wise these cyclic correlations can be implemented through convolution with equivalent matched filters: due to the presence of a cyclic prefix and postfix of length N/2 in the CES sequence, a cyclic correlation can be obtained by passing the entire CES sequence through the matched filter corresponding with the correlation sequence (remark that some of the first elements of the correlation may be impacted by inter symbol interference but these will not be used in the estimators). The negatively and positively compensated CES are passed both through a matched filter based on $\tilde{a}$ and both through a matched filter based on $\tilde{b}$ (see FIG. 7). At the output of the filters the proper samples are selected to obtain 8 distinct cyclic correlations:

$$\underline{X}(\tilde{a},\underline{r}_n) = \alpha \underline{X}(\tilde{a},\Psi \underline{v}) + \beta \underline{X}(\tilde{a},\tilde{\Gamma} \underline{\tilde{v}}) + \underline{X}(\tilde{a},\tilde{R}\underline{n}_r) \quad (70)$$

$$\underline{X}(\tilde{a},\underline{s}_n) = \alpha \psi \underline{X}(\tilde{a},\Psi \underline{w}) + \beta \gamma \underline{X}(\tilde{a},\tilde{\Gamma} \underline{\tilde{w}}) + \tilde{\rho} \underline{X}(\tilde{a},\tilde{R}\underline{n}_s) \quad (71)$$

$$\underline{X}(\tilde{a},\underline{r}_p) = \alpha \underline{X}(\tilde{a},\Gamma \underline{v}) + \beta \underline{X}(\tilde{a},\tilde{\Psi} \underline{\tilde{v}}) + \underline{X}(\tilde{a},R\underline{n}_r) \quad (72)$$

$$\underline{X}(\tilde{a},\underline{s}_p) = \alpha \gamma \underline{X}(\tilde{a},\Gamma \underline{w}) + \beta \tilde{\psi} \underline{X}(\tilde{a},\tilde{\Psi} \underline{\tilde{w}}) + \rho \underline{X}(\tilde{a},R\underline{n}_s) \quad (73)$$

$$\underline{X}(\tilde{b},\underline{r}_n) = \alpha \underline{X}(\tilde{b},\Psi \underline{v}) + \beta \underline{X}(\tilde{b},\tilde{\Gamma} \underline{\tilde{v}}) + \underline{X}(\tilde{b},\tilde{R}\underline{n}_r) \quad (74)$$

$$\underline{X}(\tilde{b},\underline{r}_n) = \alpha \psi \underline{X}(\tilde{b},\Psi \underline{w}) + \beta \gamma \underline{X}(\tilde{b},\tilde{\Gamma} \underline{\tilde{w}}) + \tilde{\rho} \underline{X}(\tilde{b},\tilde{R}\underline{n}_s) \quad (75)$$

$$\underline{X}(\tilde{b},\underline{r}_p) = \alpha \underline{X}(\tilde{b},\Gamma \underline{v}) + \beta \underline{X}(\tilde{b},\tilde{\Psi} \underline{\tilde{v}}) + \underline{X}(\tilde{b},R\underline{n}_r) \quad (76)$$

$$\underline{X}(\tilde{b},\underline{s}_p) = \alpha \gamma \underline{X}(\tilde{b},\Gamma \underline{w}) + \beta \gamma \tilde{\psi} \underline{X}(\tilde{b},\tilde{\Psi} \underline{\tilde{w}}) + \rho \underline{X}(\tilde{b},R\underline{n}_s) \quad (77)$$

3. Estimation of the IQ-Imbalance Ratio $\beta/\tilde{\alpha}$

Using the property (3) on (74) and taking the conjugate of (72) yields:

$$-\underline{X}(\tilde{b},\underline{r}_n) = \beta \underline{X}(a,\tilde{\Gamma} \tilde{v}) + \alpha \underline{X}(a,\Psi v) + \underline{X}(a,\tilde{R}\underline{n}_r) \quad (78)$$

$$\tilde{\underline{X}}(\tilde{a},\underline{r}_p) = \tilde{\alpha} \underline{X}(a,\tilde{\Gamma} \tilde{v}) + \tilde{\beta} \underline{X}(a,\Psi v) + \underline{X}(a,\tilde{R}\underline{n}_r) \quad (79)$$

In (78) the term $\underline{X}(a,\tilde{\Gamma}\tilde{v})$ is proportional to $\beta$ and in (79) it is proportional to $\tilde{\alpha}$. Provided that $X(a,\tilde{\Gamma}\tilde{v})$ is much larger than the other terms in (78) and (79), an estimation of $\beta/\tilde{a}$ can be made by making an element wise division of (78) by (79) and averaging the resulting vector. In (78) and (79) the terms $\underline{X}(a, \tilde{R}\underline{n}_r)$ and $\underline{X}(a,\tilde{R}\tilde{n}_r)$ are noise terms. Their distribution is also Gaussian with a variance of $N\sigma_{n_2}$ where $\sigma_n^2$ is the variance of the noise on the received signal.

The term $X(a,\Psi v)$ which appears both in (78) and (79) can be developed by applying (63) and $$X(\underline{a},\underline{y})=[F^H\underline{AF}]^T\underline{y}=F^H\underline{A}^PF\underline{y} \tag{80}$$

$$X(\underline{a},\Psi v)=F^H\underline{A}^PF\Psi F^H\underline{HA} \tag{81}$$

If the rough CFO estimation is close to the real CFO, $R \approx C$ and $F\Psi F^H$ will be close to the identity matrix. Applying this approximation on (81) yields:

$$X(\underline{a},\Psi v) \approx F^H\underline{A}^P\underline{HA}=F^H\underline{HFF^H}\underline{A}^P A=\underline{h} \otimes \underline{X}(\underline{a},\underline{a}) \tag{82}$$

If the channel length is $$\leq \frac{N}{4},$$

due the property in (5) $[\underline{h} \otimes \underline{X}(\underline{a},\underline{a})]_k$ will be zero for $$k=0:\frac{N}{4}-1.$$

So for the first N/4 elements $X(a,\Psi v)$ will be small with respect to h. $X(a,\Psi v)$ will be an error term in the $\beta/\alpha$ estimator of which the error depends on the accuracy of the rough CFO estimate. To keep it small, the estimator will only use the first N/4 elements of (78), (79). Restricting the channel length to N/4 is not a limitation because the standard foresees only for channels with a length up to N/4 (the cyclic prefix for the data symbols is limited to N/4).

To interpret $X(a,\tilde{\Gamma}\tilde{v})$ in (78) and (79) it is best to look at its complex conjugate which can be developed using (63) and (27):

$$\tilde{X}(\underline{a},\tilde{\Gamma}\tilde{v})=X(\underline{\tilde{a}},\Gamma v)=F^G\underline{\tilde{A}}FTF^H\underline{AH} \tag{83}$$

If there were no CFO and no rough CFO compensation, the matrix product $F\Gamma F^H$ would be equal to the identity matrix and $$X(\underline{\tilde{a}},\Gamma v)=F^H\underline{\tilde{A}AH}=\underline{h} \otimes \underline{X}(\underline{\tilde{a}},\underline{a}). \tag{84}$$

Due to the property (4) this will produce Nh on the first N/4 elements of $X(\tilde{a},\Gamma v)$. These elements have a total energy of $$N^2 \sum_{k=0}^{\frac{N}{4}-1} |h_k|^2.$$

In the presence of CFO, the correlation with $\tilde{a}$ will not exactly reproduce Nh on the first N/4 positions. Some of the channel energy will leak to other positions leading to an energy loss for the estimation. The impact of this effect will be calculated later.
of the CFO R was put equal to C.
Also the b sequence can be used for the estimation. Using property (3) on (71) and taking the conjugate of (77) yields:

$$-X(\underline{\tilde{a}},\underline{s}_n)=\beta\tilde{\gamma}\underline{X}(\underline{b},\underline{\tilde{\Gamma}w})+\alpha\psi\underline{X}(\underline{b}\Psi w)+\tilde{\rho}\underline{X}(\underline{b},\underline{\tilde{R}n}_s) \tag{85}$$

$$\tilde{X}(\underline{\tilde{b}},\underline{s}_p)=\tilde{\alpha}\tilde{\gamma}\underline{X}(\underline{b},\underline{\tilde{\Gamma}w})+\tilde{\beta}\psi\underline{X}(\underline{b}\Psi w)+\tilde{\rho}\underline{X}(\underline{b},\underline{\tilde{R}n}_s) \tag{86}$$

Similarly to (82) $X(b,\Psi w) \approx \underline{h} \otimes \underline{X}(b,b)$ is small and similarly to (83), (84) in the absence of CFO and compensation, $\tilde{X}(b,\tilde{\Gamma}\tilde{w})=\underline{h} \otimes \underline{X}(\tilde{b},b)$, reproducing Nh. The terms $\tilde{\rho}X(b,\tilde{R}n_s)$ and $\tilde{\rho}X(b,\tilde{R}\tilde{n}_s)$ are Gaussian noise terms with a variance of $N\sigma_n^2$. The noise in (78), (79) is uncorrelated with the noise in (85), (86), so a better estimate of $\beta/\alpha$ can be obtained by averaging out the noise between (78), (85) and between (79), (86). (85) and (86) are multiplied first with $\rho^2$ to compensate for the factor $\tilde{\gamma}=\rho\phi$. This aligns $\tilde{\gamma}X(b,\tilde{\Gamma}\tilde{w})$ as good as possible with $X(a,\tilde{\Gamma}\tilde{v})$, maximizing the useful energy. The addition of (78), (79) with the corrected (85), (86) yields:

$$V_k=-X_k(\underline{\tilde{b}},\underline{r}_n)-\rho^2 X_k(\underline{\tilde{a}},\underline{s}_n) \tag{87}$$

$$W_k=\tilde{X}_k(\underline{\tilde{a}},\underline{r}_p)-\rho^2 \tilde{X}_k(\underline{\tilde{b}},\underline{s}_p) \tag{88}$$

A first estimator for $\beta/\alpha$ is:

$$\frac{\hat{\beta}}{\hat{\alpha}}=\frac{4}{N}\sum_{k=0}^{\frac{N}{4}-1}\frac{V_k}{W_k}=\frac{4}{N}\sum_{k=0}^{\frac{N}{4}-1}\frac{V_k W_k}{|W_k|^2} \tag{89}$$

Using (78), (79), (85), (86), (87) and (88), $V_k/W_k$ can be reformulated to:

$$\frac{V_k}{W_k}=\frac{\beta d_k+\alpha e_k+n_k}{\tilde{\alpha}d_k+\tilde{\beta}e_k+m_k} \text{ with} \tag{90}$$

$$d_k \equiv X_k(\underline{a},\underline{\tilde{\Gamma}}\,\underline{\tilde{v}})+\tilde{\psi}X_k(\underline{b},\underline{\tilde{\Gamma}}\,\underline{\tilde{w}}) \tag{91}$$

$$e_k \equiv X_k(\underline{a},\underline{\Psi v})+\gamma X_k(\underline{b},\underline{\Psi w}) \tag{92}$$

$$n_k \equiv X_k(\underline{a},\underline{\tilde{R}n}_r)+\rho X_k(\underline{b},\underline{\tilde{R}n}_s) \tag{93}$$

$$m_k \equiv X_k(\underline{a},\underline{\tilde{R}\tilde{n}}_r)+\rho X_k(\underline{b},\underline{\tilde{R}\tilde{n}}_s) \tag{94}$$

We now examine the susceptibility of (90) with respect to the noise and the error term $e_k$. Assuming that $e_k$, $n_k$, $m_k$ are small, a first order Taylor series approximation in function of these variables is applied.

$$\frac{\beta d_k+\alpha e_k+n_k}{\tilde{\alpha}d_k+\tilde{\beta}e_k+m_k} \approx \frac{\beta}{\tilde{\alpha}}+\frac{1}{\tilde{\alpha}d_k}\left(n_k-\frac{\beta}{\tilde{\alpha}}m_k\right)+\frac{1}{\tilde{\alpha}d_k}\frac{|\alpha|^2-|\beta|^2}{\tilde{\alpha}}e_k \tag{95}$$

$n_k$ and $m_k$ have a Gaussian distribution with a variance of $2N\sigma_n^2$. Hence the variance of the noise part of (95) is:

$$\sigma^2=\frac{1}{|\alpha|^2|d_k|^2}\left(1+\frac{|\beta|^2}{|\alpha|^2}\right)2N\sigma_n^2 \tag{96}$$

The energy of the error term in (95) is $$E_e=\frac{1}{|\alpha|^2|d_k|^2}\frac{[|\alpha|^2-|\beta|^2]}{|\alpha|^2}|e_k|^2 \tag{97}$$

Both $\sigma^2$ and $E_e$ are inversely proportional to $|\alpha|^2|d_k|^2$. This means an improved estimator can be constructed by weighting the elements of the sum in (29) proportionally with $|\alpha k|^2|d_k|^2$ or in approximation with $|W_k|^2$. The improved estimator becomes:

$$\frac{\hat{\beta}}{\tilde{\alpha}} = \frac{\sum_{k=0}^{\frac{N}{4}-1} \frac{V_k}{W_k} |W_k|^2}{\sum_{k=0}^{\frac{N}{4}-1} |W_k|^2} = \frac{\sum_{k=0}^{\frac{N}{4}-1} V_k W_k}{\sum_{k=0}^{\frac{N}{4}-1} |W_k|^2} \quad (98)$$

Note that (98) requires only one division while (29) requires N/4 divisions. Using (91), (92), (93) and (94) equation (98) can be reformulated to:

$$\frac{\hat{\beta}}{\tilde{\alpha}} = \frac{\sum_{k=0}^{\frac{N}{4}-1} (\beta d_k + \alpha e_k + n_k)(\alpha \tilde{d}_k + \beta \tilde{e}_k + \beta \tilde{m}_k)}{\sum_{k=0}^{\frac{N}{4}-1} (\tilde{\alpha} d_k + \tilde{\alpha} e_k + m_k)(\alpha \tilde{d}_k + \beta \tilde{e}_k + \tilde{m}_k)} \quad (99)$$

To examine the susceptibility of (99) with respect to the noise and the error term $e_k$, a first order Taylor series approximation in function of $e_k, \tilde{e}_k, n_k, m_k$ is applied $\forall k$:

$$\frac{\hat{\beta}}{\tilde{\alpha}} \approx \frac{\beta}{\tilde{\alpha}} + \frac{\sum_{k=0}^{\frac{N}{4}-1} \left( \alpha \tilde{d}_k n_k - \beta d_k \tilde{m}_k - \frac{\beta}{\tilde{\alpha}}(m_k + \tilde{m}_k) \right)}{|\alpha|^2 \sum_{k=0}^{\frac{N}{4}-1} |d_k|^2} + \left[ 1 - \frac{|\beta|^2}{|\alpha|^2} \right] \frac{\alpha^2 \sum_{k=0}^{\frac{N}{4}-1} \tilde{d}_k e_k}{|\alpha|^2 \sum_{k=0}^{\frac{N}{4}-1} |d_k|^2} \quad (100)$$

(The partial derivative of (99) to $\tilde{e}_k$ is zero.) The combined variance of the noise terms in (100) is:

$$\sigma_e^2 = \frac{|\alpha|^2 + |\beta|^2 2N\sigma_n^2}{|\alpha|^4 \sum_{k=0}^{\frac{N}{4}-1} |d_k|^2} + \frac{|\beta|^2 N^2 \sigma_n^2}{|\alpha|^6 2 \left[ \sum_{k=0}^{\frac{N}{4}-1} |d_k|^2 \right]^2} \sum_{k=0}^{\frac{N}{4}-1} |d_k|^2 \quad (101)$$

is the useful energy of the estimator. Define $\Lambda$ such that:

$$\sum_{k=0}^{\frac{N}{4}-1} |d_k|^2 = 4N^2 \Lambda E_c \text{ with } E_c \equiv \sum_{k=0}^{\frac{N}{4}-1} |h_k|^2 \quad (102)$$

Figure 13:
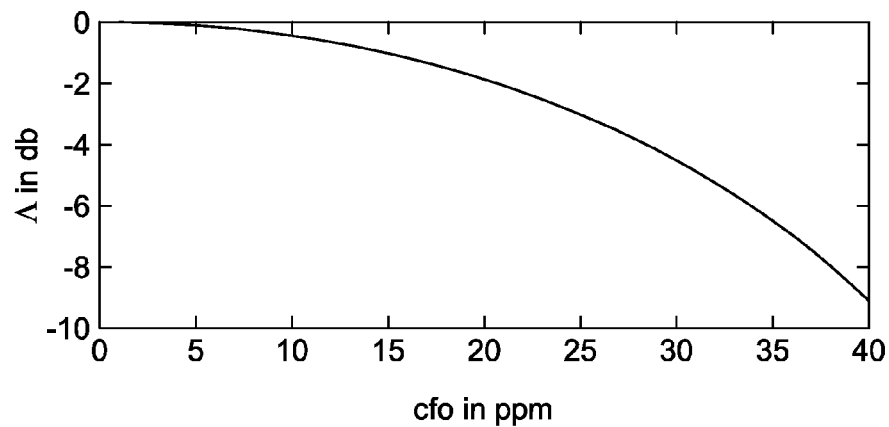
FIG. 13 plots the useful estimation energy in function of the CFO of one embodiment.

$E_c$ is the channel energy. $\Lambda$ is a function of the CFO. For a CFO of 0, $\Lambda=1$ and it decreases with increasing CFO. Under the assumption that R=C and with channels of length N/4 with on average equally powered taps, the expected value of $\Lambda$ can be calculated using (91). FIG. 13 shows a plot of $\Lambda$ in db. At a CFO of 40 ppm there is a loss of 9 db. Inserting (102) into (101) yields:

$$\sigma_e^2 = \frac{|\alpha|^2 + |\beta|^2}{|\alpha|^4} \frac{1}{2N\Lambda} \frac{\sigma_n^2}{E_c} + \frac{|\beta|^2}{|\alpha|^6} \frac{1}{32N^2\Lambda^2} \frac{\sigma_n^2}{E_c^2} \quad (103)$$

The second term in (103) is orders of magnitude smaller than the first and can be neglected. In the first term, $2N\Lambda$ can be seen as a processing gain boosting the SNR of $$\frac{E_c}{\sigma_n^2}.$$

Figure 14:
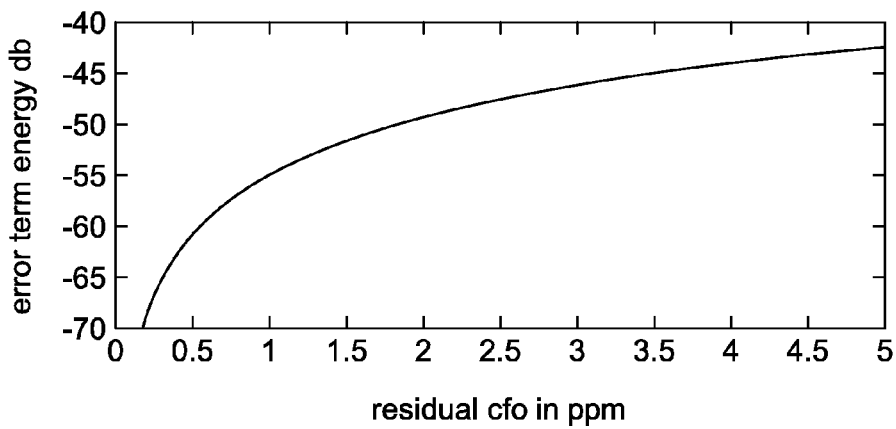
FIG. 14 plots the error term energy in function of the residual CFO of one embodiment.

For a CFO of 0 ppm this gain is 27 db and for a CFO of 40 ppm it drops to 27−9=18 db, which is still a satisfactory gain despite the 9 db loss in useful estimation energy. The second error term in (100) (which is a function of $e_k$) depends on the CFO and on the rough CFO estimate error. A calculation of its expected energy is made, assuming a CFO of 40 ppm (worst case) and a channel length of N/4 with on average equally powered taps for a rough CFO estimate error range from 0 ppm till 5 ppm. The result is plotted in FIG. 14. The energy remains below −42 db which makes it lower than the noise for SNRs up to 42−18=24 db at a CFO of 40 ppm.

4. Residual CFO Estimation

By means of the estimation of $\beta/\tilde{\alpha}$, an estimation of the non compensated residual CFO can be made. Assuming that $$\frac{\hat{\beta}}{\tilde{\alpha}} = \frac{\beta}{\alpha}$$

and using (70), (76) and (75), (73) and applying the property in (3) yields:

$$\underline{P} \equiv \underline{X}(\tilde{a}, r_n) + \frac{\beta}{\tilde{\alpha}} \underline{\tilde{X}}(\tilde{b}, r_p) \quad (104)$$

$$= \frac{|\alpha|^2 - |\beta|^2}{\tilde{\alpha}} \underline{X}(\tilde{a}, \underline{\Psi v}) + \underline{X}\left(\tilde{a}, \underline{\tilde{R}}\left(n_r - \frac{\beta}{\tilde{\alpha}} \tilde{n}_r\right)\right)$$

$$\underline{Q} \equiv \underline{X}(\tilde{b}, s_n) + \frac{\beta}{\tilde{\alpha}} \underline{\tilde{X}}(\tilde{a}, s_p) \quad (105)$$

$$= \frac{|\alpha|^2 - |\beta|^2}{\tilde{\alpha}} \psi \underline{X}(\tilde{b}, \underline{\Psi w}) + \underline{X}\left(\tilde{b}, \tilde{\rho} \underline{\tilde{R}}\left(n_s - \frac{\beta}{\tilde{\alpha}} \tilde{n}_s\right)\right)$$

If $\Psi$ is close to the identity matrix then using (27) and due to property (4)

$$\forall k \in \left\{0 : \frac{N}{4} - 1\right\}:$$

$$X_k(\tilde{a}\Psi v) \approx [F^H \tilde{\underline{A}} AH]_k = [\underline{h} \otimes \underline{X}(\tilde{a},a)]_k = Nh_k \quad (106)$$

$$X_k(\tilde{b}\Psi w) \approx [F^H \tilde{\underline{B}} BH]_k = [\underline{h} \otimes \underline{X}(\tilde{b},b)]_k = Nh_k \quad (107)$$

So by approximation, on the first N/4 elements the non noise terms of (104) and (105) differ by a factor of $\psi$ and are proportional with the channel taps.

$$\psi = \tilde{\rho}\phi = e^{j2\pi(f_{cfo}-f_r)\frac{2N}{f_s}}$$

is a rotation vector proportional with $f_{cfo}-f_r\equiv f_{re}$ which is the residual CFO. So by multiplying (104) element wise with the conjugate of (105) one obtains elements proportional with $\psi |h_k|^2$. After summing these elements and taking the angle, the Maximum Likelihood estimator for the residual CFO is obtained:

$$f_{re} = \frac{f_s}{4\pi N} \text{angle}\left(\sum_{k=0}^{\frac{N}{4}-1} Q_k \tilde{P}_k\right) \quad (108)$$

Figure 15:
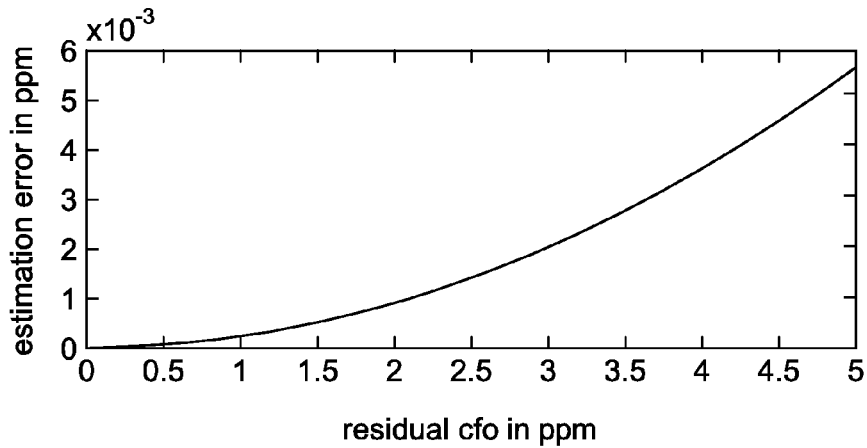
FIG. 15 plots the error on the residual CFO estimation in the absence of noise of one embodiment.

To examine the error caused by the approximation of assuming $\Psi$ equal to the identity matrix, the residual CFO estimation error is calculated in noise free circumstances for a channel of length N/4 with equally powered taps. The result is shown in FIG. 15. It can be seen that in absence of noise the error on the estimation is an order of 1000 times smaller than the actual residual CFO, so the effect of $\underline{\Psi}$ may be neglected.

5. Estimation of the Channel

As was deduced from (106) and (107) $\underline{X}(\tilde{a}, \underline{\Psi}v)$ and $\underline{X}(\tilde{b}, \underline{\Psi}\,\underline{w})$ reproduce by approximation the channel taps on their first N/4 elements. This means (104) and (105) can be used for channel estimation. (105) is multiplied with $\tilde{\psi}$ to compensate for the rotation caused by the residual CFO and subsequently added to (104) to average the noise. An estimation of $\tilde{\psi}$ is obtained together with the residual CFO estimate by normalizing the sum term in (108) and taking its conjugate (see also FIG. 16). The channel estimate becomes due to property (2):

$$\underline{P} + \tilde{\psi}\underline{Q} = \frac{|\alpha|^2 - |\beta|^2}{\tilde{\alpha}} 2N\underline{h} + \underline{q} \text{ with} \quad (109)$$

$$\underline{q} + \underline{X}\left(\tilde{a}, \underline{\tilde{R}}\left(\underline{n}_r - \frac{\beta}{\tilde{\alpha}}\underline{\tilde{n}}_r\right)\right) + \underline{X}\left(\tilde{b}, \tilde{\phi}\underline{\tilde{R}}\left(\underline{n}_s - \frac{\beta}{\tilde{\alpha}}\underline{\tilde{n}}_s\right)\right) \quad (110)$$

In the absence of noise, taking the DFT of (109) and dividing by 2N will result in $$\frac{|\alpha|^2 - |\beta|^2}{\tilde{\alpha}} \underline{H}.$$

This is exactly the equalizer needed for frequency domain equalization after CFO and IQ imbalance compensation in the time domain. Let d be a transmitted data vector, t the receive vector and S the matrix with combined rough and residual CFO compensation. S is a diagonal matrix of size N, with diagonal element $$k : e^{-j2\pi \frac{f_r + f_{re}}{f_s} k}.$$

We have:

$$\underline{t} = \alpha \underline{C}\,\underline{F}^H \underline{H}\,\underline{F}\,\underline{d} + \beta \underline{\tilde{C}}\,\underline{\tilde{F}}\,\underline{\tilde{H}}\,\underline{F}^T \underline{\tilde{d}} \quad (111)$$

$$\underline{S}\left[\underline{t} - \frac{\beta}{\tilde{\alpha}}\underline{\tilde{t}}\right] \approx \underline{F}^H \left(\frac{|\alpha|^2 - |\beta|^2}{\tilde{\alpha}} \underline{H}\right)\underline{F}\,\underline{d} \quad (112)$$

The approximation would be an equality if $\underline{S} = \underline{\tilde{C}}$. The complex constant $$\frac{|\alpha|^2 - |\beta|^2}{\tilde{\alpha}}$$

can be seen as becoming part of the channel and is compensated together with the channel by the equalizer.

Figure 16:
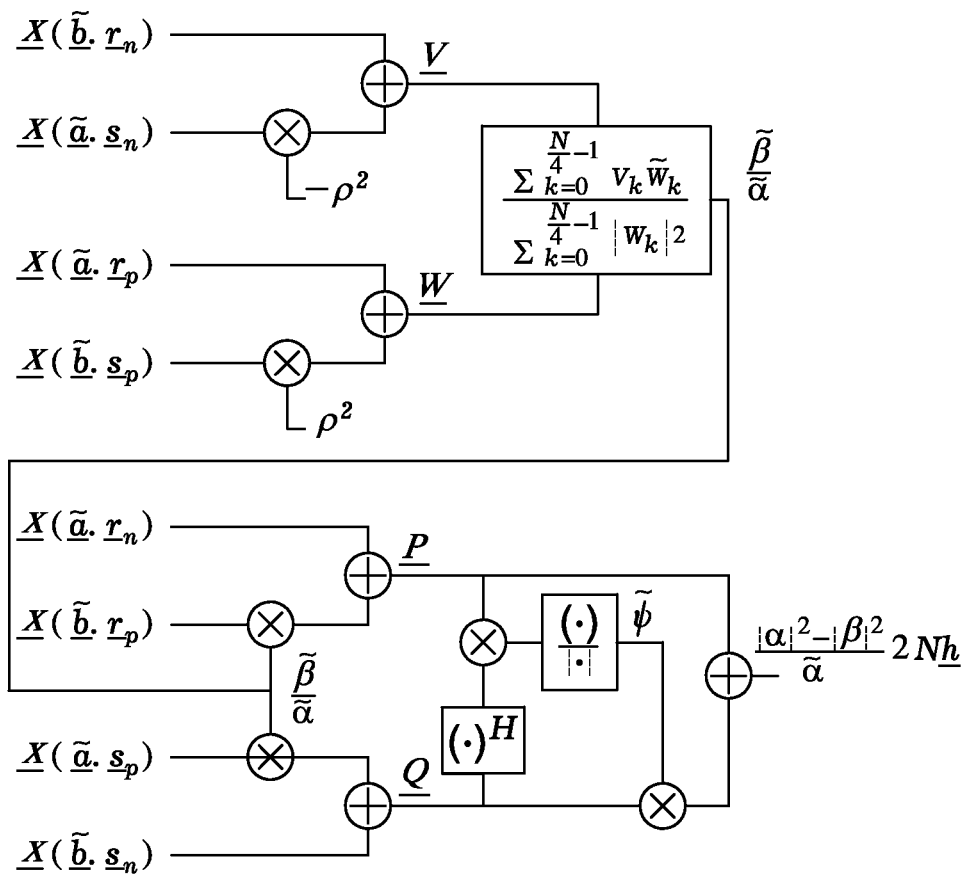
FIG. 16 shows schematically a construction of possible estimators of one embodiment.

To summarize, an overview of the construction of the estimators, departing from the 8 correlations, is shown in FIG. 16.

6. Results

Figure 17:
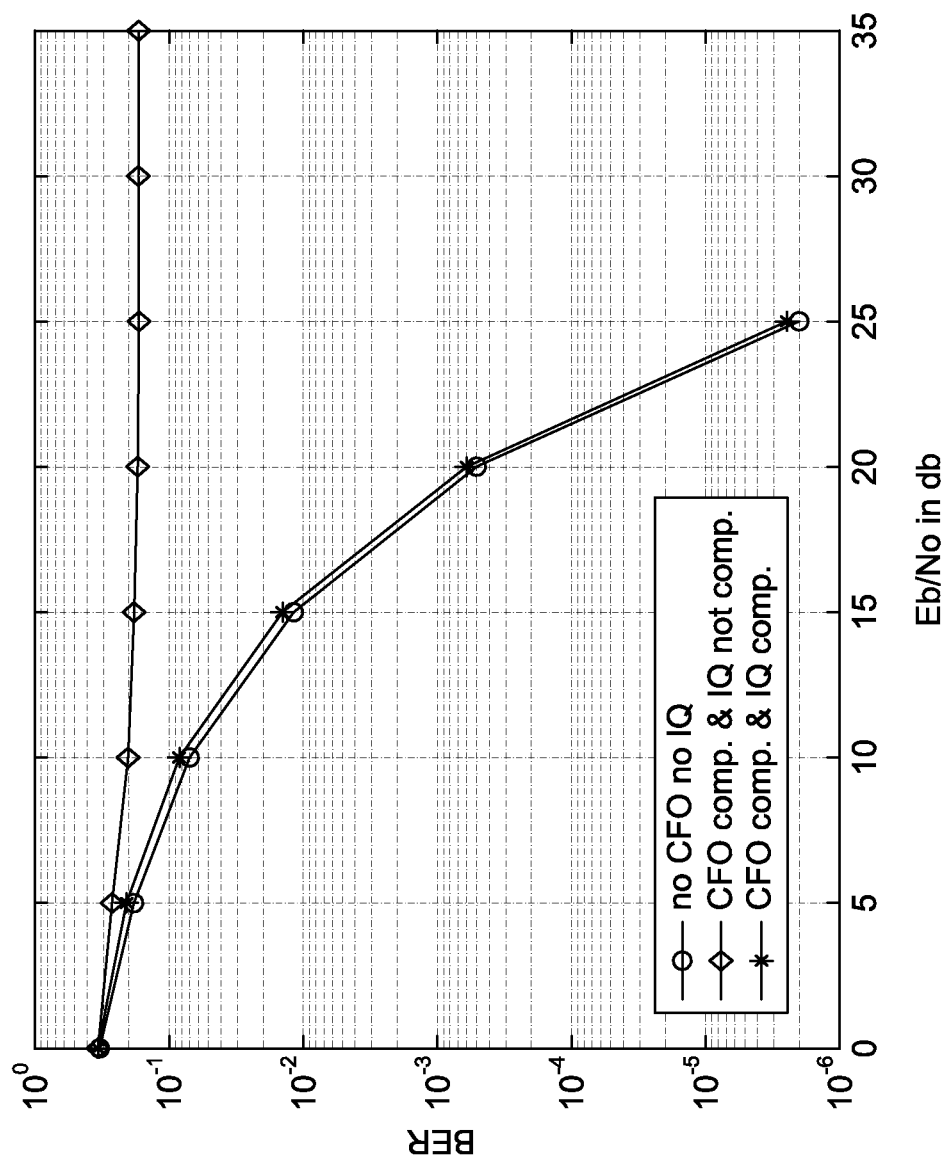
FIG. 17 plots the BER versus Eb/No for 16 QAM of one embodiment.

Simulations where made for a set of 200 multi-path channels of type CM15 as defined by the IEEE TG3c Channel Modeling Sub-committee [6]. The transmission mode is single carrier with a π/2-16QAM modulation. The symbol length is N=256 with a cyclic prefix of 64 yielding an uncoded bit-rate of 5530 Mbps. An MMSE equalizer is used for symbol recovery. Three series of simulations where made: 1) Without CFO and IQ imbalance for reference. 2) With CFO estimation/compensation but without estimation/compensation of the IQ imbalance. 3) With both CFO and IQ imbalance estimation/compensation. A CFO of 40 ppm is applied together with an amplitude imbalance of 10% and a phase imbalance of 15°. The uncoded bit error rate (BER) is shown in FIG. 17. The simulation without IQ imbalance compensation floors above a BER of $10^{-1}$. The simulation with IQ imbalance compensation shows at a BER of $10^{-3}$ a degradation of −0.3 db. This shows that both CFO and IQ imbalance are adequately compensated for.

Part C

1. Transmit-Receive Model

Part C describes an alternative compensation scheme for frequency independent receiver IQ imbalance, whereby the IQ imbalance ratio is determined via a LSE method together with a CFO compensation and a channel equalization (taking noise into account).

Because we consider only frequency independent receive IQ imbalance, possible differences between the low pass filters in the I and Q branches are neglected and $g_r$ is assumed the same in both branches. An equivalent discrete baseband model can be constructed as follows: the complex vector d represents a discrete modulated data burst of length N at the input of the transmitter. At the output of the low noise amplifier (LNA):

$$\underline{s}_l = \underline{g}_c \otimes \underline{d} \quad (113)$$

with $\underline{g}_c$ the combined impulse response of the filters in the transmitter, the channel, the receive band-bass filter and the LNA. In the receiver, the incoming RF signal is mixed with the local oscillator of the receiver. This will cause CFO and IQ imbalance. The effect of the CFO can be modeled by a multiplication with $\phi\underline{C}$. $\phi = e^{j(\chi + 2\pi f_{cfo}\Delta T)}$ is the average angle rotation on the data burst caused by the CFO over a time $\Delta T$ from the start of the frame until the start of the data burst and $\chi$ is an unknown phase. C represents the difference in angle rotation caused by the CFO on the individual symbols of the data burst. $\underline{C}$ is a diagonal matrix of size N, with diagonal element $$k : e^{j2\pi \frac{f_{cfo}}{f_s}(k-1)},$$

($f_s$ is the sample frequency and $f_{cfo}$ is the CFO frequency.). The receive IQ imbalance is modeled by the complex parameters $\alpha \equiv \cos \phi + \jmath \epsilon \sin \phi$ and $\beta \equiv \jmath \epsilon \cos \phi - \sin \phi$ with $\epsilon$ the amplitude mismatch and $\phi$ the phase mismatch. The equivalent discrete complex baseband signal at the output of the ADCs becomes:

$$\underline{s}_r = \alpha \underline{g}_r \otimes (\phi \underline{C}\underline{g}_c \otimes \underline{d}) + \beta \underline{g}_r \otimes (\tilde{\phi}\underline{\tilde{C}}\underline{\tilde{g}}_c \otimes \underline{\tilde{d}}) = \alpha \phi \underline{C}\underline{g}_r \otimes \underline{g}_c \otimes \underline{d} + \beta \tilde{\phi}\underline{\tilde{C}}\underline{\tilde{g}}_r \otimes \underline{\tilde{g}}_c \otimes \underline{\tilde{d}} \quad (114)$$

with $$\underline{g}_r[k] \equiv \underline{g}_r[k] e^{-j2\pi \frac{f_{cfo}}{f_s} k}$$

for k∈0 ... N−1. (114) can be derived by developing the convolution with $\underline{g}_r$, knowing that the taps of $\underline{g}_r$ are real. With the definition of $\underline{h} \equiv \underline{g}_r \otimes \underline{g}_c$, (114) is rewritten to:

$$\underline{s}_r = \alpha \phi \underline{C} \underline{h} \otimes \underline{d} + \beta \tilde{\phi} \underline{C} \underline{\tilde{h}} \otimes \underline{\tilde{d}} \tag{115}$$

In the above derivations the noise has not been considered. The bulk of the noise comes from the noise contribution of the LNA. In the model of FIG. 11 the noise contribution n is added after the LNA. n is a complex vector; the noise is assumed to be white Gaussian noise with a variance $\sigma_n^2$. With a similar derivation that led to (15), one can write:

$$\underline{n}_{s_r} = \alpha \phi \underline{C} \underline{g}_r \otimes \underline{n} + \beta \tilde{\phi} \underline{C} \underline{\tilde{g}}_r \otimes \underline{\tilde{n}} \tag{116}$$

$\underline{n}_{s_r}$ is the discrete complex base band representation of the noise at the output of the ADCs.

2. Compensation of IQ Imbalance CFO and Channel

A well known compensation scheme for a SC system is shown in FIG. 5 (in the case of an OFDM system the inverse discrete Fourier transform (IDFT) at the end must simply be dropped). The scheme in FIG. 5 uses a series of parameters that will be estimated later. First process is the compensation of the receiver IQ imbalance. For this compensation the receiver IQ imbalance ratio $$r_{iq} \equiv \frac{\beta}{\tilde{\alpha}}$$

is needed. The following operation is applied on the received signal $\underline{s}_r$:

$$\underline{s}_r - r_{iq} \underline{\tilde{s}}_r = \frac{|\alpha|^2 - |\beta|^2}{\tilde{\alpha}} \phi \underline{C} \underline{h} \otimes \underline{d} \tag{117}$$

The second process is the compensation of the CFO. This is done by multiplying each sample of the received frame with $e^{-j2\pi f_{cfo} t}$ where the time t is counted from the start of the sequence in the preamble on which the channel estimation is made. The start of the channel estimation sequence will be provided by the frame synchronization algorithm which is not the topic of this paper but we assume that the start of the channel estimation sequence is set to a time $\Delta T_c$ after the start of the frame. The multiplication with $e^{-j2\pi f_{cfo} t}$ will compensate for the term $\phi C$ with the exception of a constant term $e^{j(\chi + 2\pi f_{cfo} \Delta T_c)}$ that will be compensated during the channel equalization. The result after CFO compensation is:

$$\underline{s}_c = \gamma \underline{h} \otimes \underline{d}, \text{ with } \gamma \equiv \frac{|\alpha|^2 - |\beta|^2}{\tilde{\alpha}} e^{j(\chi + 2\pi f_{cfo} \Delta T_c)} \tag{118}$$

The third process is the channel equalization. It will be shown later that an estimation of the channel can be made which results in:

$$\underline{g} = \gamma \underline{h} \tag{119}$$

With g, a frequency domain equalization is possible; either a Zero Forcing (ZF) or an MMSE detector can be used. If the channel is quasi line of sight, $\underline{g}$ can be replaced by its largest tap $g_m$ and an approximate time domain equalization can be done by multiplying with the scalar $1/g_m$. In the case of a MMSE frequency domain equalization:

$$\underline{E} \equiv \left[ \underline{G}^H \underline{G} + \frac{\sigma_{n_{s_c}}^2}{\sigma_s^2} \underline{I} \right]^{-1} \underline{G}^H \text{ for } MMSE \tag{120}$$

with G a diagonal matrix with on its diagonal the discrete Fourier transform (DFT) of g, with I an identity matrix of size N, with $$\sigma_{n_{s_c}}^2$$

the variance of the noise $s_c$ and with $\sigma_s^2$ the average energy of the symbol constellation.

$$\sigma_{n_{s_c}}^2$$

is a parameter which must be estimated and $\sigma_s^2$ is known.
As the, the noise variance $$\sigma_{n_{s_c}}^2$$

of the noise on $s_c$: $n_{s_c}$ will be estimated later. To prepare this estimation, a model of $n_{s_c}$ is derived here. Starting from $n_{s_r}$ as derived in (116), we get after receiver IQ imbalance compensation:

$$n_{\{\underline{s}_r - r_{iq} \underline{\tilde{s}}_r\}} = \frac{|\alpha|^2 - |\beta|^2}{\tilde{\alpha}} \phi \underline{C} \underline{g}_r \otimes \underline{n} \tag{121}$$

After CFO compensation:

$$\underline{n}_{s_c} = \gamma \underline{g}_r \otimes \underline{n} \tag{122}$$

3. Estimation of the IQ Imbalance Ratios on the Received CES

At the receiver, after time synchronization on the first part of the preamble, it is possible to isolate the received version of the CES (see FIG. 6). Due to the presence of cyclic prefixes, a, b can be treated similarly to a data burst and (115) can be applied:

$$\underline{r} = \alpha \phi_a \underline{C} \underline{h} \otimes \underline{a} + \beta \tilde{\phi}_a \underline{C} \underline{\tilde{h}} \otimes \underline{\tilde{a}} \tag{123}$$

$$\underline{s} = \alpha \phi_b \underline{C} \underline{h} \otimes \underline{b} + \beta \tilde{\phi}_b \underline{C} \underline{\tilde{h}} \otimes \underline{\tilde{b}} \tag{124}$$

$\phi_a$ is the rotation caused by the CFO from the start of the frame till the start of the sequence on which the channel will be estimated and a $\phi_a = e^{j(\chi + 2\pi f_{cfo} \Delta T_c)}$, $$\phi_b = \phi_a e^{j2\pi f_{cfo} \frac{2N}{f_s}} \text{ equiv} \phi_a \psi.$$

ψ is the extra rotation caused by the CFO between a and b separated by 2N symbols. With a similar derivation that led to (117) we can write:

$$\underline{r} - r_{iq}\underline{\tilde{r}} = \gamma \underline{Ch} \otimes \underline{a} \quad (125)$$

$$\underline{s} - r_{iq}\underline{\tilde{s}} = \psi\gamma \underline{Ch} \otimes \underline{a} \quad (126)$$

with γ as defined in (118). In (125) we would like to eliminate the dependence on a. This can be done by a cyclic correlation with ã and using property and saying that the cyclic correlation defined in (1) has also the following property: $X(\tilde{a}, h \otimes y) = h \otimes X(\tilde{a}, y)$. But before this equation can be used the CFO related term in C must be eliminated. At this stage of the estimation process, only a rough CFO estimate is known. Define $f_r$ as this rough CFO estimate; define R as a diagonal matrix of size N, with diagonal element $$k : e^{j2\pi \frac{f_r}{f_s}(k-1)}.$$

So after compensation with $\tilde{R}$ and correlation with ã we get:

$$\underline{X}(\tilde{a}, \tilde{R}[\underline{r} - r_{iq}\tilde{r}]) = \gamma \underline{X}(\tilde{a}, \tilde{R} \underline{Ch} \otimes \underline{a}) \quad (127)$$

In the right hand side of (127), provided that the rough CFO estimation is accurate enough, $\tilde{R}C$ will be close to the identity matrix and can be neglected. Using $\underline{X}(\tilde{a}, h \otimes y) = h \otimes \underline{X}(\tilde{a}, y)$, this approximation leads to:

$$\gamma \underline{X}(\tilde{a}, \tilde{R}\underline{Ch} \otimes \underline{a}) \approx \gamma \underline{h} \otimes \underline{X}(\tilde{a} a) \quad (128)$$

For channels h with a length up to N/4, using property (4) yields $\forall k \in \{0: N/4-1\}$:

$$[\gamma \underline{h} \otimes \underline{X}(\tilde{a}, \underline{a})]_k = \gamma h_k N \quad (129)$$

The left hand side of (127) can be developed as follows:

$$\underline{X}(\tilde{a}, \tilde{R}[\underline{r} - r_{iq}\tilde{r}]) = \underline{X}(\tilde{a}, \tilde{R}\underline{r}) - r_{iq}\tilde{X}(\underline{a}, R\underline{r}) = \underline{X}(\tilde{a}, \tilde{R}\underline{r}) + r_{iq}\tilde{X}(\tilde{b}, R\underline{r}) \quad (130)$$

The second process in (130) is a consequence of property (3). Combining (127), (128), (129), (130) yields $\forall k \in \{0: N/-1\}$:

$$X_k(\tilde{a}, \tilde{R}\underline{r}) + r_{iq}\tilde{X}_k(\tilde{b}, R\underline{r}) \approx \gamma h_k N \quad (131)$$

By correlating (125) with $\tilde{b}$ instead of ã and by processing in a similar way as above, we get $\forall k \in \{0: N-4-1\}$ due to property (5):

$$X_k(\tilde{b}, \tilde{R}\underline{r}) + r_{iq}\tilde{X}_k(\tilde{a}, R\underline{r}) \approx 0 \quad (132)$$

The same processing is also done on s starting from (126). A CFO compensation of $\tilde{\rho}\tilde{R}$ with $$\rho = e^{2\pi j f_r \frac{2N}{f_s}}$$

is used. $\tilde{\rho}$ compensates the extra rotation caused by the CFO over the elapsed time between r and s. This yields $\forall k \in \{0: N/4-1\}$:

$$X_k(\tilde{a}, \tilde{\rho}\tilde{R}\underline{r}) + r_{iq}\tilde{X}_k(\tilde{b}, \rho R\underline{s}) \approx 0 \quad (133)$$

$$X_k(\tilde{b}, \tilde{\rho}\tilde{R}\underline{r}) + r_{iq}\tilde{X}_k(\tilde{a}, \rho R\underline{s}) \approx \tilde{\rho}\psi\gamma h_k N \quad (134)$$

The correlation terms in (131), (132), (133) and (134) can be obtained as shown in FIG. 7. The CES is compensated with a negative rough CFO and also with a positive rough CFO. The correlations with a and b are done in hardware by means of convolutions with equivalent matched filters based on a and b. Due to the presence of a cyclic prefix and postfix of length N/2 in the CES sequence, a cyclic correlation can be obtained by passing the entire CES sequence through the matched filter corresponding with the correlation sequence. Remark that some of the first elements of the received CES may be impacted by inter-symbol interference but these will not be used. In (131), (132), (133), (134) only N/4 correlation elements are used. To obtain these elements, CES samples $$\frac{N}{2} \ldots \frac{N}{2} + \frac{5N}{4} - 1$$

are used for correlations with r and CES samples $$\frac{N}{2} + 2N \ldots \frac{N}{2} + 2N + \frac{5N}{4} - 1$$

are used for correlations with s. Because both a and b have elements with values $\in \{1, -1, j, -j\}$, the matched filter operation implies only a series of sign inversions and additions resulting in a low complexity hardware implementation. To simplify the notation we define a new set of column vectors with length N/4.

$$x_{ar}^n \equiv \underline{X}_{[0 \ldots \frac{N}{4}-1]}(\tilde{a}, \tilde{R}\underline{r}), \quad x_{ar}^p \equiv \underline{X}_{[0 \ldots \frac{N}{4}-1]}(\tilde{a}, R\underline{r}),$$

$$x_{as}^n \equiv \underline{X}_{[0 \ldots \frac{N}{4}-1]}(\tilde{a}, \tilde{\rho}\tilde{R}\underline{s}), \quad x_{as}^p \equiv \underline{X}_{[0 \ldots \frac{N}{4}-1]}(\tilde{a}, \rho R\underline{s}),$$

$$x_{br}^n \equiv \underline{X}_{[0 \ldots \frac{N}{4}-1]}(\tilde{b}, \tilde{R}\underline{r}), \quad x_{br}^p \equiv \underline{X}_{[0 \ldots \frac{N}{4}-1]}(\tilde{b}, R\underline{r}),$$

$$x_{bs}^n \equiv \underline{X}_{[0 \ldots \frac{N}{4}-1]}(\tilde{b}, \tilde{\rho}\tilde{R}\underline{s}), \quad x_{bs}^p \equiv \underline{X}_{[0 \ldots \frac{N}{4}-1]}(\tilde{b}, \rho R\underline{s}).$$

With these new definitions, (132) and (133) can be rewritten to:

$$\underline{x}_{br}^n + \tilde{\underline{x}}_{ar}^p r_{iq} \approx 0 \quad (135)$$

$$\underline{x}_{as}^n + \tilde{\underline{x}}_{bs}^p r_{iq} \approx 0 \quad (136)$$

(135) together with (136) make a set of N/2 linear equations in the variable $r_{iq}$. Estimating $r_{iq}$ on the basis of (135) and (136) can be considered as a linear least squares estimation problem. To derive the least squares estimator (LSE) we define:

$$\underline{M} \equiv \begin{pmatrix} \tilde{x}_{ar}^p \\ x_{bs}^p \end{pmatrix}, \quad \underline{K} \equiv \begin{pmatrix} -\tilde{x}_{br}^n \\ -x_{as}^n \end{pmatrix}.$$

The sizes of M and K are both $$\frac{N}{2} \times 1.$$

The LSE becomes:

$$r_{iq} = (\underline{M}^H \underline{M})^{-1} \underline{M}^H \underline{K} \quad (137)$$

In (137) $M^H M$ and $M^H K$ are scalars, which means the matrix inversion in (137) is a simple division. Equations (135) and (136), are not equalities but approximations. The approximation results from the imperfect CFO compensation with the rough CFO. A large rough CFO estimation error will mean a poor approximation and a bad estimation of $r_{iq}$. How much error on the rough CFO estimate is still acceptable will be examined by simulation.

4. Residual CFO, Channel and Noise Power Estimation

With the estimation of $r_{iq}$, an estimation of the non-compensated residual CFO can be made. We define:

$$\underline{P} \equiv \underline{x}_{ar}^n + r_{iq} \underline{\tilde{x}}_{br}^P \approx \gamma \underline{h} N \qquad (138)$$

$$\underline{Q} \equiv \underline{x}_{bs}^n + r_{iq} \underline{\tilde{x}}_{as}^P \approx \tilde{\rho} \psi \gamma \underline{h} N \qquad (139)$$

The approximations in (138) and (139) result from (131) and (134). The following matrix product yields:

$$\underline{P}^H \underline{Q} \approx \tilde{\rho} \psi |\gamma|^2 N^2 \sum_{k=0}^{\frac{N}{4}-1} |h_k|^2 \qquad (140)$$

$$\text{and } \tilde{\rho}\psi = e^{j2\pi(f_{cfo}-f_r)\frac{2N}{f_s}} \approx \frac{\underline{P}^H \underline{Q}}{|\underline{P}^H \underline{Q}|} \qquad (141)$$

$$f_f \equiv f_{cfo} - f_r \approx \frac{f_s}{4\pi N} \text{ angle } (\underline{P}^H \underline{Q}) \qquad (142)$$

In (142), $f_f$ is the residual (fine) CFO and the operator angle(•) takes the angle of a complex scalar.

At this stage it is interesting to calculate the noise on P and Q. To calculate the noise on P we start from (123) and with similar derivations that led to (122) we find that the noise on $\tilde{R}[\underline{r}-r_r\tilde{r}]$ is:

$$\underline{n}_{\{\tilde{R}[\underline{r}-r_r\tilde{r}]\}} \approx \gamma \underline{g}_r \otimes \underline{n}_r \qquad (143)$$

with $\underline{n}_r$ the noise on r which is Gaussian with variance $\sigma_n^2$. With similar assumptions and derivations that led to (128) we find that the noise on $X(\tilde{a},\tilde{R}[\underline{r}-r_r\tilde{r}])$ (of which the first N/4 samples correspond to $\underline{P}$) is:

$$\underline{n}_{\{X(\tilde{a},\tilde{R}[\underline{r}-r_r\tilde{r}])\}} \approx \gamma \underline{g}_r \otimes X(\tilde{a},\underline{n}_r) \qquad (144)$$

$X(\tilde{a},\underline{n}_r)$ is a sum of independent Gaussian noise samples multiplied with factors which have an absolute value of 1. The result is again Gaussian noise with mean 0 but with variance $N\sigma_n^2$. We take the first N/4 samples of (144) and define the noise on $\underline{P}$ as:

$$\underline{n}_P \approx \gamma \left(\underline{g}_r \otimes X(\tilde{a},\underline{n}_r)\right)_{[0 \ldots \frac{N}{4}-1]} \qquad (145)$$

In a similar way starting from s in (124), the noise on $\underline{Q}$ can be derived:

$$\underline{n}_Q \approx \tilde{\rho}\psi\gamma \left(\underline{g}_r \otimes X(\tilde{b},\underline{n}_s)\right)_{[0 \ldots \frac{N}{4}-1]} \qquad (146)$$

with $\underline{n}_s$ the noise on s. $X(\tilde{b},\underline{n}_s)$ also has a variance of $N\sigma_n^2$. Because $\underline{n}_r$ and $\underline{n}_s$ are uncorrelated, $\underline{n}_P$ and $\underline{n}_Q$ are also uncorrelated.

In (138) and (139) both P and Q are proportional to $\gamma h = \underline{g}$, and differ only by a scalar factor $\tilde{\rho}\psi$ estimated in (141). So an estimate of $\underline{g}$ is:

$$\frac{1}{2N}(\underline{P} + \tilde{\rho}\tilde{\psi}\underline{Q}) \approx \gamma \underline{h} = \underline{g} \qquad (147)$$

The noise on P and Q is uncorrelated and will be averaged out by the sum in (147).

The approximations in (138) and (139) show that $\underline{P}$ and $\underline{Q}$ differ only by a rotation of $\tilde{\rho}\psi$ and noise, so if we compensate for this rotation and subtract, only the noise on $\underline{P}$ and $\underline{Q}$, as derived in (145) and (146) will remain:

$$\underline{P} - \tilde{\rho}\tilde{\psi}\underline{Q} \approx \underline{n}_P - \tilde{\rho}\tilde{\psi}\underline{n}_Q \qquad (148)$$

$$\approx \gamma\left(\underline{g}_r \otimes [X(\tilde{a},\underline{n}_r) - X(\tilde{b},\underline{n}_s)]\right)_{[0 \ldots \frac{N}{4}-1]} \qquad (149)$$

$X(\tilde{a},\underline{n}_r) - X(\tilde{b},\underline{n}_s)$ is Gaussian with variance $2N\sigma_n^2$. (148) permits to estimate $$\sigma_{n_{s_c}}^2,$$

the noise variance used in the MMSE detector of (120). In (122), the noise $\underline{n}_{s_c} = \gamma \underline{g}_r \otimes \underline{n}$ is similar to (149) except that the variance of the noise in (149) is 2N times higher than the variance of $\underline{n}_{s_c}$. By calculating the total energy on the N/4 samples in (148) and scaling properly we get:

$$\sigma_{n_{s_c}}^2 \approx \frac{2}{N^2}|\underline{P} - \tilde{\rho}\tilde{\psi}\underline{Q}|^2 \qquad (150)$$

Figure 18:
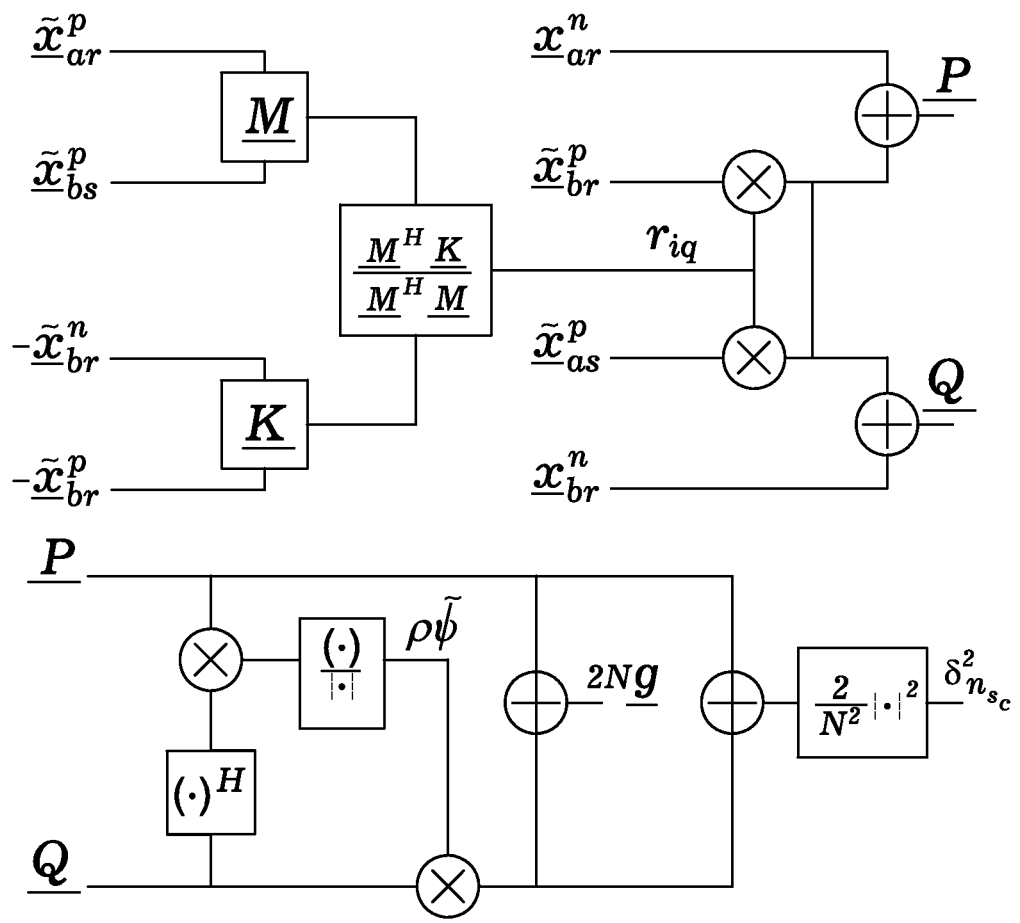
FIG. 18 gives a schematic overview of the construction of several estimators of one embodiment.

A schematic overview of the construction of all the estimators developed in part C is shown in FIG. 18.

5. Results

Figure 19:
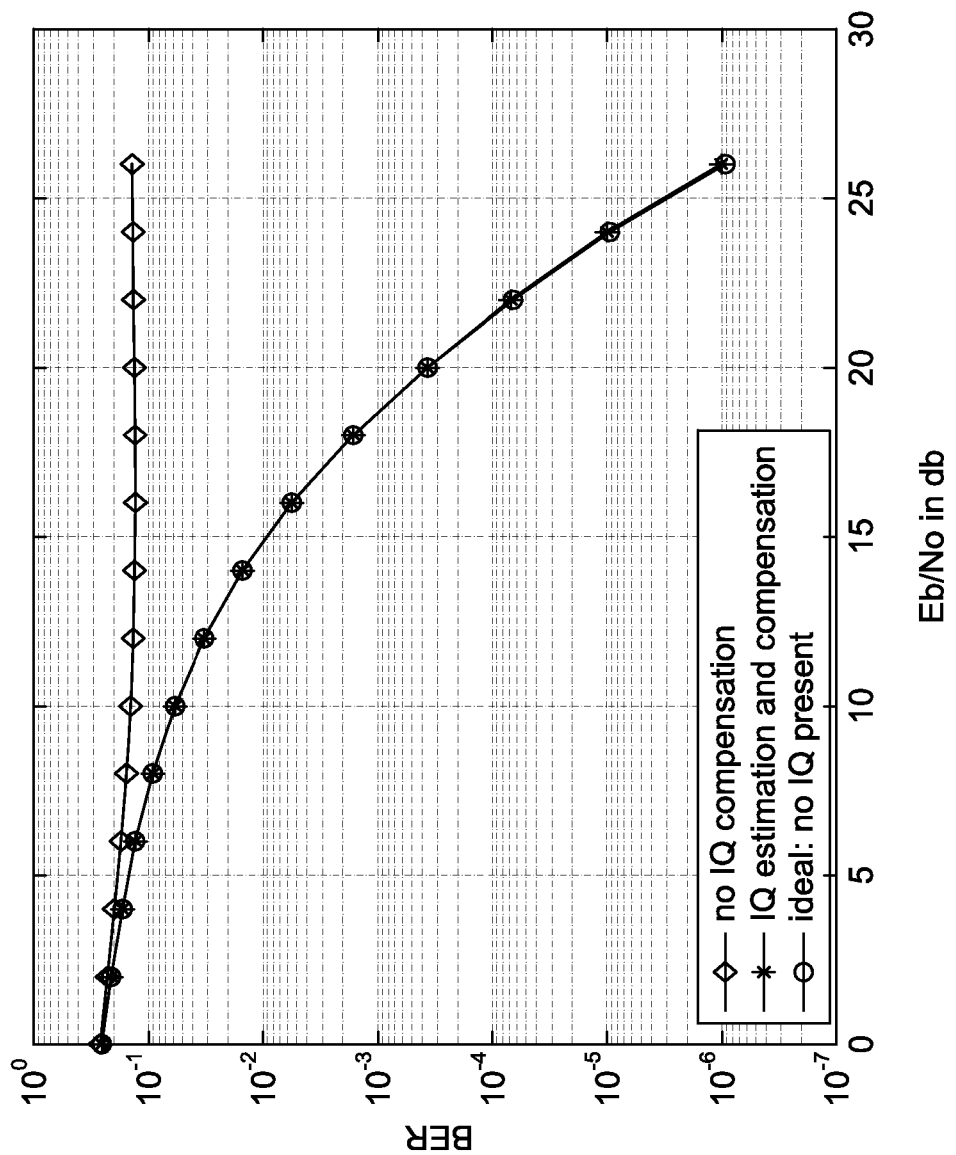
FIG. 19 plots the BER versus Eb/No for 16QAM of one embodiment.

A first set of simulations is made to examine the impact on the BER for a system. The modulation is $\pi/2$-16QAM. The symbol length is N=256 with a cyclic prefix of 64 yielding an uncoded bit-rate of 5530 Mbps. A MMSE equalizer is used for symbol recovery. The parameters for the IQ mismatch are 10% for the amplitude imbalance and 15° for the phase imbalance. Also CFO is applied, the amount of CFO is 40 ppm. A set of 200 multi-path channels of type CM15 as defined by the IEEE TG3c Channel Modeling Sub-committee [6], is used. The results are shown in FIG. 19. The first curve, labeled "no IQ compensation" shows a system with perfect CFO compensation, based on ideal knowledge of the CFO, but without IQ imbalance compensation. Not compensating the IQ imbalance results in a flooring above a BER of $10^{-1}$. The second curve labeled "IQ estimation and compensation" shows a system with compensated CFO and IQ imbalance. The parameters used in the compensation are values estimated with the algorithms described above. The rough CFO is estimated on the SYNC part of the preamble with the algorithm in [3], the IQ imbalance ratio is estimated with (137), the residual CFO with (142), the channel with (147) and the noise power with (150). The third curve labeled "ideal: no IQ present" shows the BER performance of a system where no IQ imbalance is applied and with perfectly compensated CFO, based on ideal CFO knowledge. Curves 2 and 3 almost coincide, proving that the estimations and compensations are adequate. At a BER of $10^{-4}$ there is a negligible degradation of 0.01 db.

Figure 20:
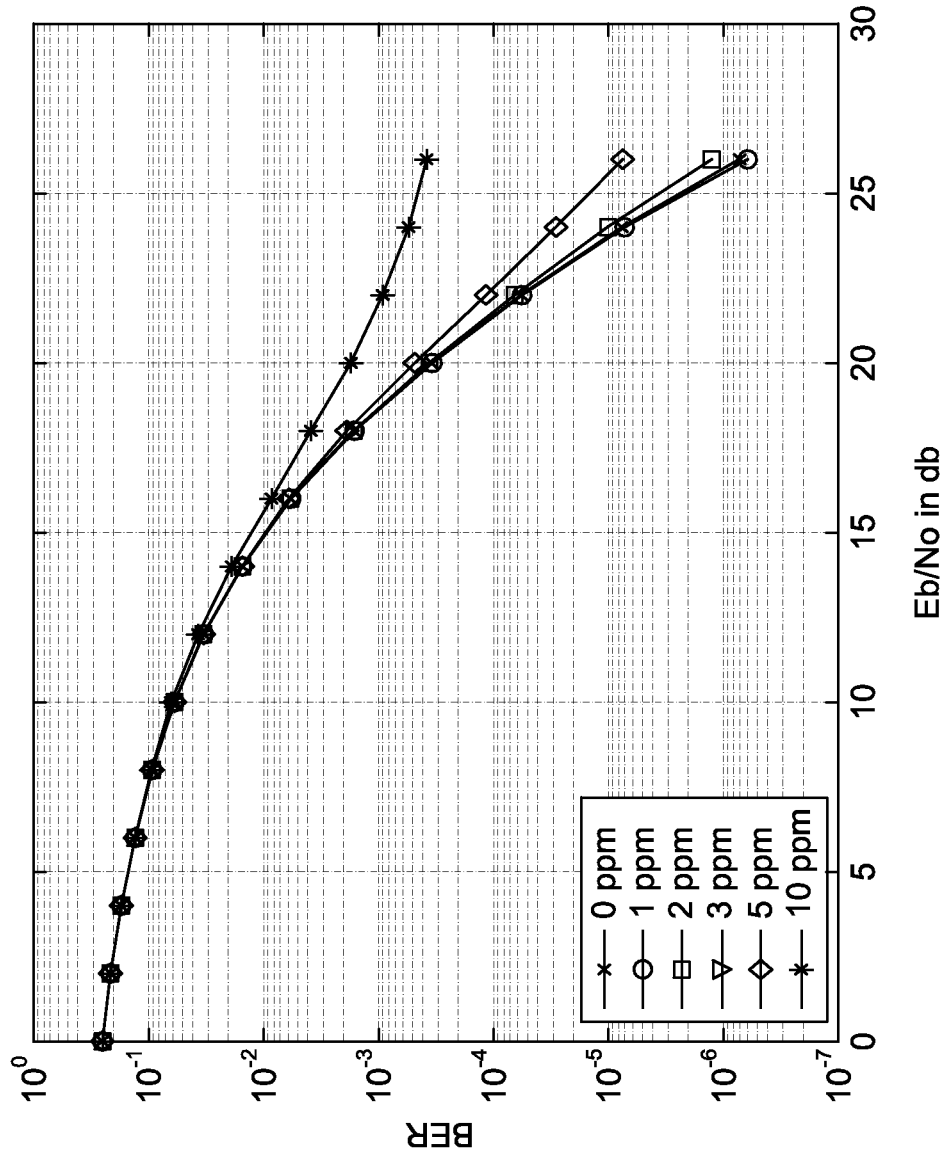
FIG. 20 plots the BER for different rough CFO estimation errors of one embodiment.

A second set of simulations is made to examine the sensitivity of the algorithms to errors on the rough CFO estimation. The same SC system is used as above with the same set of 200 CM15 channels. Again the IQ imbalance ratio is estimated with (137), the residual CFO with (142), the channel with (147) and the noise power with (150), but now the rough CFO is not estimated but set to a chosen value with a known imposed error. Rough CFO errors from 0 ppm till 10 ppm are applied. The results are shown in FIG. 20. The performance degradation is acceptable up to a rough CFO error of 3 ppm (degradation of 0.2 db at a BER of $10^{-4}$). The condition of 3 ppm accuracy can easily be met by the rough CFO estimator in [3].

Part D

Part D describes a compensation scheme for frequency independent transmitter and receiver IQ imbalance that can be used for SC systems as well as for OFDM systems together with a CFO compensation and a channel equalization. To make the estimations, properties of the channel estimation sequence according to set 2 and 3 are being exploited.

First, the polyphase Golay complementary pairs are being constructed. The second part of the TG3c preamble is build with a PGCP (a,b) of length $N=2^M$. Both $a^b$ and $b^b$ are preceded and succeeded by respectively a cyclic prefix and cyclic postfix. In the standard N=128 or N=256. The PGCP (a,b) used in the standard is derived from a general binary Golay complementary pair (BGCP) $(a^b,b^b)$ also of length N. The superscript b indicates this is a BGCP containing only elements $a^b(k), b^b(k) \in \{1,-1\}$ $\forall k=0:N-1$. Polynomials can be associated with both $a^b$ and $b^b$:

$$a^b(x) = \sum_{k=0}^{N-1} a^b(k)x^k; \quad b^b(x) = \sum_{k=0}^{N-1} b^b(k)x^k \quad (151)$$

The standard describes a recursive algorithm to generate BGCPs based on the Golay-Rudin-Shapiro recursion. Expressed with polynomials this algorithm can be written as:

$$a_0^b(x)=1; \quad b_0^b(x)=1 \quad (152)$$

$$a_n^b(x)=W_n a_{n-1}^b(x)+x^{d_n} b_{n-1}^b(x) \quad (153)$$

$$b_n^b(x)=W_n a_{n-1}^b(x)+x^{d_n} b_{n-1}^b(x) \quad (154)$$

where n is the n-th iteration n=1 ... N, $W_n \in \{1,-1\}$ and $D=[d_1, d_2, \ldots, d_M]$ is a permutation of $\{2^0, 2^1, \ldots, 2^{M-1}\}$ For a given length $N=2^M$ there are a total of $2^M!$ possible BGCPs $(a^b,b^b)$. The PGCP (a,b) is generated by modulating $a^b$ and $b^b$ with an incremental rotation of $\pi/2$ in the constellation plane. This comes down to multiplying each of the sequences element wise with the complex vector $[j^0, j^1, \ldots, j^N]^T$. The polynomials associated with (a,b) are derived from $a^b(x), b^b(x)$ by substituting x with jz:

$$a^b(jz) = \sum_{k=0}^{N-1} a^b(k)(jz)^k = \sum_{k=0}^{N-1} (a^b(k)j^k)z^k = a(z) \quad (155)$$

Also:

$$a(z^{-1}) = \sum_{k=0}^{N-1} \frac{a(k)}{z^k} = \sum_{k=0}^{N-1} a^b(k)\frac{j^k}{z^k} = a^b(y) \text{ with } y = \frac{j}{z} \quad (156)$$

Both $(a^b,b^b)$ and (a,b) satisfy the Golay complementary pair a-periodic correlation property:

$$a^b(x)a^b(x^{-1})+b^b(x)b^b(x^{-1})=2N \forall x \in Z^2 \quad (157)$$

$$a(z)\tilde{a}(z^{-1})+b(z)\tilde{b}(z^{-1})=2N \forall z \in Z^2 \quad (158)$$

The accent denotes the complex conjugate which must be seen to act only on the coefficients of the polynomial. (158) can be derived from (157) by substituting x with jz. Also from (155) and (156):

$$a(z)a(z^{-1})+b(z)b(z^{-1}) \equiv a^b(x)a^b(y)+b^b(x)b^b(y) \quad (159)$$

Set 2 and 3 follow additional properties:

$$a(z)a(z^{-1})+b(z)b(z^{-1})=0 \forall z \in Z^2 \quad (160)$$

$$a(z)a(z^{-1})+b(z)b(z^{-1})=0 \forall z \in \{z^N-1\}. \quad (161)$$

Property (160) is more restrictive then (161). It will be shown that (160) is equivalent to the requirement that the a-periodic auto-correlations summed over the pair are 0, while (161) is a requirement that of periodic auto-correlations summed over the pair are 0.

Starting with (160): Define $\rho_a^k$ and $\rho_b^k$ as the a-periodic correlation of a and b with themselves shifted over k positions.

$$\rho_a^k = \sum_{n=0}^{N-1-k} a(n+k)a(n) = \sum_{n=k}^{N-1} a(n)a(n-k) \quad (162)$$

and a similar expression for $\rho_b^k$. The left hand side of (160) can be expanded to:

$$a(z)a(z^{-1}) + b(z)b(z^{-1}) = \rho_a^0 + \rho_b^0 + \sum_{k=1}^{N-1} (\rho_a^k + \rho_b^k)\left(z^k + \frac{1}{z_k}\right) \quad (163)$$

This can only be $0 \forall z \in Z^2$ if $\rho_a^k + \rho_b^k = 0 \forall k=0:N-1$, which is the requirement that the a-periodic auto-correlations summed over the pair are 0.

In order to show the relationship between (161) and the periodic correlation, the periodic correlation is first expressed as a polynomial product. Define $X_a^k$ as the periodic correlation of a with a cyclic shifted version of itself over k positions.

$$X_a^k = \sum_{n=0}^{N-1-k} a(n+k)a(n) = \sum_{n=N-k}^{N-1} a(n)a(n-(N-k)) \quad (164)$$

Note that the first sum term in (164) is $=\rho_a^k$. From the second part of (162), it can be deduced that:

$$\rho_a^{N-k} = \sum_{k=1}^{N-1} a(n)a(n-(N-k)) \quad (165)$$

So in (164) $X_a^k = \rho hd\ a^k + \rho_a^{N-k}$ and $X_a^0 = \rho_a^0$. In the product of the polynomials $$a(z)a(z^{-1}) = \rho_a^0 + \sum_{k=1}^{N-1} \rho_a^k z^k + \sum_{k=1}^{N-1} \rho_a^k \frac{1}{z^k} \quad (166)$$

the second sum term can be reordered by substituting k with N−k $$a(z)a(z^{-1}) = \rho_a^0 + \sum_{k=1}^{N-1} \left[ \rho_a^k z^k + \rho_a^{N-k} + \frac{1}{z^{N-k}} \right] \quad (167)$$

If z is limited to the N roots of $$z^N = 1 \left( z = e^{-j2\pi \frac{l}{N}} \right.$$

with l=0, 1, . . . N−1) then $$\frac{1}{z^{N-k}} = z^k.$$

This allows rewriting $$a(z)a(z^{-1}) = \rho_a^0 + \sum_{k=1}^{N-1} [\rho_a^k + \rho_a^{N-k}]z^k = \sum_{k=0}^{N-1} X_a^k z^k \quad (168)$$

Now it can be shown that (161) is equivalent with $$X_a^k + X_b^k = 0 \ \forall k=0,\ldots N-1. \quad (169)$$

From (168) it is obvious that if (169) holds, (161) will be satisfied too. If on the other hand (161) holds, knowing that the roots of $z^N=1$ are $$z = e^{-j2\pi \frac{l}{N}}$$

with l=0, 1, . . . N−1 and using (168) one can write:

$$\sum_{k=0}^{N-1} [X_a^k + X_b^k] e^{-j2\pi \frac{lk}{N}} = 0 \ \forall \ l. \quad (170)$$

Remark that this is the discrete Fourier transform at position l of the vector $\underline{X}_a + \underline{X}_b = [X_a^0 + X_b^0, \ldots X_a^{N-1} + X_b^{N-1}]^T$. Defining $\underline{O}$ as a vector of N 0 elements and F as the discrete Fourier transform matrix, one can write:

$$\underline{O} = F[\underline{X}_a + \underline{X}_b] \quad (171)$$

Because F is non-singular, this implies that $\underline{X}_a + \underline{X}_b = \underline{O}$ which is condition (1169).

This specific group of PGCP can be found. Let $(a_n^b(x), b_n^b(x))$ be the output of the Golay-Rudin-Shapiro recursion at stage n as defined in (153, 154). Now it is examined how the condition $a_n^b(x)a_n^b(y) + b_n^b(x)b_n^b(y) = 0$ propagates through the recursion. Using (152, 153, 154), $a_n^b(x)a_n(y) + b_n^b(x)b_n(y)$ can be expressed with terms of stage n−1:

$$a_n^b(x)a_n^b(y) + b_n^b(x)b_n^b(y) = 2[a_{n-1}^b(x)a_{n-1}^b(y) + (-1)^{d_n}b_{n-1}^b(x)b_{n-1}^b(y)] \quad (172)$$

$d_n$ is always even except for $d_n = 2^0 = 1$. For $d_n \neq 1$ (172) becomes:

$$a_n^b(x)a_n^b(y) + b_n^b(x)b_n^b(y) = 2[a_{n-1}^b(x)a_{n-1}^b(y) + b_{n-1}^b(x)b_{n-1}^b(y)] \quad (173)$$

From (173) one can see that as long as $d_n \neq 1$ the condition an $a_n^b(x)a_n^b(y) + b_n^b(x)b_n^b(y) = 0$ will propagate upward and downward through the recursion.

If $d_n = 1$ at stage n then $$a_n^b(x)a_n^b(y) + b_n^b(x)b_n^b(y) = 2[a_{n-1}^b(x)a_{n-1}^b(y) + b_{n-1}^b(x)b_{n-1}^b(y)] \quad (174)$$

At stage n−1 this leads to:

$$a_n^b(x)a_n^b(y) + b_n^b(x)b_{n-1}^b(y) = 2W_{n-1}[x^{d_{n-1}}b_{n-2}^b(x)a_{n-2}^b(y) + y^{d_{n-1}}a_{n-2}^b(x)b_{n-2}^b(y)] \quad (175)$$

At stage n−2 this leads to:

$$x^{d_{n-1}}b_{n-2}^b(x)a_{n-2}^b(y) - y^{d_{n-1}}a_{n-2}^b(x)b_{n-2}^b(y) = [x^{d_{n-1}} + y^{d_{n-1}}][a_{n-3}^b(x)a_{n-3}^b(y) + b_{n-3}^b(x)b_{n-3}^b(y)] - W_{n-2}[x^{d_{n-1}} - y^{d_{n-1}}] * [x^{d_{n-2}}b_{n-3}^b(x)a_{n-3}^b(y) - y^{d_{n-2}}a_{n-3}^b(x)b_{n-3}^b(y)] \quad (176)$$

Now 2 subsets of PGCPs will be identified that satisfy some of the additional correlation properties. First choose $d_1 = 1$ at stage n=1 then from (174, 151):

$$a_1^b(x)a_1^b(y) + b_1^b(x)b_1^b(y) = 2[a_0^b(x)a_0^b(y) - b_0^b(x)b_0^b(y)] = 0 \quad (177)$$

From (173) one can see $a_1^b(x)a_1^b(y) + b_1^b(x)b_1^b(y) = 0$ will propagate upward through the recursion until stage N, where $a^b(x)a^b(y) + b^b(x)b^b(y) = 0$. So all BGCPs where $$D = [1, d_2, d_3, \ldots d_M], W_n \in \{1, -1\} \quad (178)$$

with $[d_2, d_3, \ldots d_M]$ a permutation of $\{2^1, 2^2, \ldots 2^{M-1}\}$ lead to a PGCP satisfying $a(z)a(z^1) + b(z)b(z^1) = 0$ independent of z; this is (160) and also implies (161). This first subset has $2^M(M-1)!$ members. Secondly choose $d_3 = 1$ at stage n=3 then from (174, 175, 176, 151):

$$a_3^b(x)a_3^b(y) + b_3^b(x)b_3^b(y) = -4W_2W_1[x^{d_2} - y^{d_2}][x^{d_1} - y^{d_1}] \quad (179)$$

$$= -4W_2W_1 j^{d_2}\left[z^{d_2} - \frac{1}{z^{d_2}}\right] j^{d_1}\left[z^{d_1} - \frac{1}{z^{d_1}}\right]$$

The requirement that $a_3^b(x)a_3^b(y) + b_3^b(x)b_3^b(y) = 0$ is equivalent to the requirement that $$\left[z^{d_2} - \frac{1}{z^{d_2}}\right]\left[z^{d_1} - \frac{1}{z^{d_1}}\right] = 0 \quad (180)$$

This can be satisfied by choosing either $d_1$ or $$d_2 = \frac{N}{2} = 2^{M-1}$$

because then in (180) there is a term $$\left[z^{\frac{N}{2}} - \frac{1}{z^{\frac{N}{2}}}\right] = \frac{1}{z^{\frac{N}{2}}}[z^N - 1] = 0 \,\forall\, z \in \{z^N = 1\} \quad (181)$$

From (173) one can see that $a_3^b(x)a_3^b(y)+b_3^b(x)b_3^b(y)=0$ will propagate upward through the recursion until stage N, where $a^b(x)a^b(y)+b^b(x)b^b(y)=0$. So all BGCPs where $$D = \left[d_1, \frac{N}{2}, 1, d_4, \ldots d_M\right], W_n \in \{1, -1\} \quad (182)$$

with $[d_1, d_4, \ldots d_M]$ a permutation of $\{2^1, 2^2, \ldots 2^{M-2}\}$ or $$D = \left[\frac{N}{2}, d_2, 1, d_4, \ldots d_M\right], W_n \in \{1, -1\} \quad (183)$$

with $[d_2, d_4, \ldots d_M]$ a permutation of $\{2^1, 2^2, \ldots 2^{M-2}\}$ lead to a PGCP satisfying $a(z)a(z^{-1})+b(z)b(z^{-1})=0$ for $z \in \{z^N=-1\}$ which is (161). This second subset has $2^{M+1}(M-2)!$ members.

From now on it is assumed that the PGCP (a,b) embedded in the second part of the preamble belongs to either of the above derived subsets.

1. Transmit-Receive Model

At the transmitter a PGCP (a,b) is embedded in the second part of the preamble. After time synchronization on the first part of the preamble, it is possible to isolate the received version of a,b. Because of the cyclic pre- and post fix, the effect of the channel can be described as a cyclic convolution. After the receiver band pass filter:

$$\underline{v}=F^H H F \underline{a}, \underline{w}=F^H H F \underline{b} \quad (184)$$

Here F is the normalized discrete Fourier transform matrix, H is a diagonal matrix with on the diagonal the FFT of the combined transmit pulse shape filter, the channel and the receive band pass filter. After down-conversion, carrier frequency offset (CFO) and IQ-imbalance are introduced.

$$\underline{r}=\alpha C \underline{v}+\beta \tilde{C} \underline{\tilde{v}}, \underline{s}=\alpha e^{j\phi} C \underline{w}+\beta e^{-j\phi} \tilde{C} \underline{\tilde{w}} \quad (185)$$

with $\alpha, \beta$ the complex receiver frequency independent IQ imbalance parameters; with C a diagonal matrix of size N, with diagonal element $$k: e^{j2\pi \frac{f_{cfo}}{f_s} k}$$

representing the impact of CFO ($f_{cfo}$ is the CFO frequency and $f_s$ is the sample frequency); with $\phi$ the angle of the phase rotation caused by the CFO over the time $\Delta_t$ between the symbols a and b, $\phi=2\pi f_{cfo}\Delta_t$. After substituting (184) in (185) and defining A, B as the FFT of a, b:

$$\underline{r}=\alpha C F^H H \underline{A}+\beta \tilde{C} F^T \tilde{H} \underline{\tilde{A}} \quad (186)$$

$$\underline{s}=\alpha e^{j\phi} C F^H H \underline{B}+\beta e^{-j\phi} \tilde{C} F^T \tilde{H} \underline{\tilde{B}} \quad (187)$$

In what follows it is the intention to apply periodic correlations on the received second part of the preamble. Because the received preamble is expressed in matrix form, it is convenient to express also the periodic correlation as a product of matrices. Let $X(\tilde{a}, \underline{r})$ be the periodic correlation of $\underline{\tilde{a}}$ with $\underline{r}$. First the FFT of $\underline{\tilde{a}}$ is calculated:

$$F \underline{\tilde{a}}=F[F^H \underline{A}]=FF^T \underline{\tilde{A}}=P\underline{\tilde{A}}=\underline{\tilde{A}}^P \quad (188)$$

where $P=FF^T$ is a permutation matrix and the superscript P is the corresponding permutation operator. The periodic correlation is the transpose of the periodic convolution:

$$X(\underline{\tilde{a}},\underline{r})=[F^H \tilde{A}^P F]^T \underline{r}=F^H \tilde{A} F \underline{r} \quad (189)$$

with $\tilde{A}^P$ the diagonal matrix formed from vector $\underline{\tilde{A}}^P$. Also $\tilde{A}^P=P\tilde{A}P$. With (189), the following correlation properties can be established:

$$F[X(\underline{\tilde{a}},\underline{a})+X(\underline{\tilde{b}},\underline{b})]=|\underline{A}|^2+|\underline{B}|^2=2 \quad (190)$$

$$F[X(\underline{\tilde{a}},\underline{\tilde{a}})+X(\underline{\tilde{b}},\underline{\tilde{b}})]=\tilde{A}\underline{\tilde{A}}^P+\tilde{B}\underline{\tilde{B}}^P=0 \quad (191)$$

(190) can be derived from (158) by substituting z with the roots from $z^N=1$; the term N in 2N from (158) drops because F is normalized. (191) is the FFT of the conjugate of the periodic auto-correlation of the PGCP. It is the frequency domain equivalent of (161) and is by consequence 0.

2. CFO Compensation on the Received Signal

As was explained before, the CFO can be roughly estimated on the first part of the preamble. With this rough estimate compensations are made on r and s. In what follows, the proposed estimators will be developed with an assumed perfect rough CFO estimate. It will be shown that with a perfect CFO estimate and in the absence of noise the proposed estimators return the ideal values. In a real system the presence of noise and the residual error after compensation with the initial rough CFO estimate will impact the precision of the proposed estimators. In practice, the precision of the initial rough CFO estimation that can be obtained on the first part of the preamble, is accurate enough to enable the use of the proposed estimators with sufficient precision, after CFO compensation with the rough CFO estimate.

Compensations on r and s are performed with both C and $\tilde{C}$ defined in (185):

$$\underline{r}_p=C\underline{r}=\alpha C^2 F^H H \underline{A}+\beta F^T \tilde{H} \underline{\tilde{A}} \quad (192)$$

$$\underline{r}_n=\tilde{C}\underline{r}=\alpha F^H H \underline{A}+\beta \tilde{C}^2 F^T \tilde{H} \underline{\tilde{A}} \quad (193)$$

$$\underline{s}_p=C\underline{s}=\alpha C^2 F^H H \underline{B} e^{j\phi}+\beta F^T \tilde{H} \underline{\tilde{B}} e^{-j\phi} \quad (194)$$

$$\underline{s}_n=\tilde{C}\underline{s}=\alpha F^H H \underline{B} e^{j\phi}+\beta \tilde{C}^2 F \tilde{H} \underline{\tilde{B}} e^{-j\phi} \quad (195)$$

This processing can be done either in the time domain or the frequency domain. In the time domain, applying (189) on (192) yields:

$$X(\underline{\tilde{a}}, \underline{r}_p) = \alpha \underline{F}^H \underline{\tilde{A}} \, F \, C^2 \, F^H \underline{A} \, H + \beta \underline{F}^H \underline{\tilde{A}} \, F \, F^T \tilde{H} \underline{\tilde{A}} \quad (196)$$

$$= \alpha \underline{F}^H \underline{\tilde{A}} \, Y \, H \, A + \beta \underline{F}^H \underline{\tilde{A}} \, P \, \tilde{H} \, \underline{\tilde{A}}$$

$$= \alpha \underline{F}^H \underline{\tilde{A}} \, Y \, A \, H + \beta \underline{F}^H \underline{\tilde{A}} \, P \, \underline{\tilde{A}} \, \tilde{H}$$

$$= \alpha \underline{F}^H \underline{\tilde{A}} \, Y \, A \, H + \beta \underline{F}^H \underline{\tilde{A}} \, \underline{\tilde{A}}^P \, \tilde{H}^P$$

with $\gamma=FC^2F^H$. Because H is diagonal, HA=AH. By applying (189) on (192-195), similar processing yields:

$$X(\underline{\tilde{a}},\underline{r}_n)=\alpha F^H |A|^2 H+\beta F^H \tilde{A}^P \gamma \tilde{A} \tilde{H} \quad (197)$$

$$X(\underline{\tilde{a}},\underline{\tilde{r}}_p)=\tilde{\alpha} F^H \tilde{A}^P \gamma \tilde{A} \tilde{H}+\tilde{\beta} F^H |A|^2 H \quad (198)$$

$$X(\underline{\tilde{a}},\underline{\tilde{r}}_n)=\tilde{\alpha} F^G \tilde{A} \tilde{A}^P \tilde{H}^P+\tilde{\beta} F^H \tilde{A} \gamma A H \quad (199)$$

$$\underline{X}(\underline{\tilde{b}},s_p) = \alpha \underline{F}^H \underline{\tilde{B}} \gamma \underline{B} H e^{j\phi} + \beta \underline{F}^H \underline{\tilde{B}} \underline{\tilde{B}}^P \underline{\tilde{H}}^P e^{-j\phi} \qquad (200)$$

$$\underline{X}(\underline{\tilde{b}},s_n) = \alpha \underline{F}^H |\underline{B}|^2 \underline{H} e^{j\phi} + \beta \underline{F}^G \underline{\tilde{B}} P \underline{\tilde{\gamma}} \underline{\tilde{B}} \underline{\tilde{H}} e^{-j\phi} \qquad (201)$$

$$\underline{X}(\underline{\tilde{b}},\tilde{s}_p) = \tilde{\alpha} \underline{F}^H \underline{\tilde{B}} P \underline{\tilde{\gamma}} \underline{\tilde{B}} \underline{\tilde{H}} e^{-j\phi} + \tilde{\beta} \underline{F}^H |\underline{B}|^2 \underline{H} e^{j\phi} \qquad (202)$$

$$\underline{X}(\underline{\tilde{b}},\tilde{s}_n) = \tilde{\alpha} \underline{F}^H \underline{\tilde{B}} \underline{\tilde{B}}^P \underline{\tilde{H}}^P e^{j\phi} + \tilde{\beta} \underline{F}^H \underline{\tilde{B}} \gamma \underline{B} H e^{j\phi} \qquad (203)$$

While time domain processing is less calculation intensive because the elements of $\tilde{a}, \tilde{b}$ are $\in \{1, -1, j, -j\}$, remark that the correlation can also be performed in the frequency domain. Taking the FFT of $r_p, r_n, s_p, s_n$ yields:

$$\underline{F r_p} = \underline{R_p} = \alpha \underline{\gamma} \underline{H} \underline{A} + \beta \underline{P} \underline{\tilde{H}} \underline{\tilde{A}} \qquad (204)$$

$$\underline{F r_n} = \underline{R n} = \alpha \underline{H} \underline{A} + \beta \underline{P} \underline{\tilde{\gamma}} \underline{\tilde{H}} \underline{\tilde{A}} \qquad (205)$$

$$\underline{F s_p} = \underline{S_p} = \alpha \underline{\gamma} \underline{H} \underline{B} e^{j\phi} + \beta \underline{P} \underline{\tilde{H}} \underline{\tilde{B}} e^{-j\phi} \qquad (206)$$

$$\underline{F s_n} = \underline{S_n} = \alpha \underline{H} \underline{B} e^{j\phi} + \beta \underline{P} \underline{\tilde{\gamma}} \underline{\tilde{H}} \underline{\tilde{B}} e^{-j\phi} \qquad (207)$$

With these FFTs the following products are calculated:

$$\underline{\tilde{A}} \underline{R_p} = \alpha \underline{\tilde{\lambda}} \gamma \underline{A} \underline{H} + \beta \underline{\tilde{\lambda}} \underline{\tilde{A}}^P \underline{\tilde{H}}^P = \underline{Y}(\tilde{a}, r_p) \qquad (208)$$

$$\underline{\tilde{A}} \underline{R_n} = \alpha |\underline{A}|^2 \underline{H} + \beta \underline{\tilde{\lambda}} \underline{P} \underline{\tilde{\gamma}} \underline{\tilde{A}} \underline{\tilde{H}} = \underline{Y}(\tilde{a}, r_n) \qquad (209)$$

$$\underline{\tilde{A}} \underline{\tilde{R}_p}^P = \tilde{\alpha} \underline{\tilde{A}} \underline{P} \underline{\tilde{\gamma}} \underline{\tilde{H}} + \tilde{\beta} |\underline{A}|^2 \underline{H} = \underline{Y}(\tilde{a}, \tilde{r}_p) \qquad (210)$$

$$\underline{\tilde{A}} \underline{\tilde{R}_n}^P = \tilde{\alpha} \underline{\tilde{\lambda}} \underline{\tilde{A}}^P \underline{\tilde{H}}^P + \tilde{\beta} \gamma \underline{A} \underline{H} = \underline{Y}(\tilde{a}, \tilde{r}_n) \qquad (211)$$

$$\underline{\tilde{B}} \underline{S_p} = \alpha \underline{\tilde{B}} \gamma \underline{B} \underline{H} e^{j\phi} + \beta \underline{\tilde{B}} \underline{\tilde{B}}^P \underline{\tilde{H}}^P e^{-j\phi} = \underline{Y}(\tilde{b}, s_p) \qquad (212)$$

$$\underline{\tilde{B}} \underline{S_n} = \alpha |\underline{B}|^2 \underline{H} e^{j\phi} + \beta \underline{\tilde{B}} \underline{P} \underline{\tilde{\gamma}} \underline{\tilde{B}} \underline{\tilde{H}} e^{-j\phi} = \underline{Y}(\tilde{b}, s_n) \qquad (213)$$

$$\underline{\tilde{B}} \underline{\tilde{S}_p}^P = \tilde{\alpha} \underline{\tilde{B}} \underline{P} \underline{\tilde{\gamma}} \underline{\tilde{B}} \underline{\tilde{H}} e^{-j\phi} + \tilde{\beta} |\underline{B}|^2 \underline{H} e^{j\phi} = \underline{Y}(\tilde{b}, \tilde{s}_p) \qquad (214)$$

$$\underline{\tilde{B}} \underline{\tilde{S}_n}^P = \tilde{\alpha} \underline{\tilde{B}} \underline{\tilde{B}}^P \underline{\tilde{H}}^P e^{j\phi} + \tilde{\beta} \gamma \underline{B} H e^{j\phi} = \underline{Y}(\tilde{b}, \tilde{s}_n) \qquad (215)$$

Note that (208-215) are the FFTs of the time domain correlations (196-203).

3. Estimation of the IQ-Imbalance Ratio

It is assumed that a rough CFO estimate has been made, allowing a compensation of the CFO as described above. The rough CFO estimation also yields an estimate of $e^{j\phi}$. Again it is assumed that the rough CFO estimation is ideal. The periodic correlations (196, 199, 200, 203) are combined to eliminate the term in $\underline{\tilde{H}}^P$:

$$\frac{\underline{X}(\tilde{a},\tilde{r}_n) + e^{j\phi} \underline{X}(\tilde{b},\tilde{s}_n)}{\underline{B} e^{j2\phi} \underline{JH}} = \tilde{\alpha} \underline{F}^H [\underline{\tilde{A}} \underline{\tilde{A}}^P + \underline{\tilde{B}} \underline{\tilde{B}}^P] \underline{\tilde{H}}^P + \beta \tilde{\beta} \underline{F}^H [\underline{\tilde{A}} \gamma \underline{A} + \underline{\tilde{B}} \gamma \underline{B} e^{j2\phi}] \underline{JH} \qquad (216)$$

$$\frac{\underline{X}(\tilde{a},r_p) + e^{j\phi} \underline{X}(\tilde{b},s_p) = \alpha \underline{F}^H [\underline{\tilde{A}} \gamma \underline{A} + \underline{\tilde{B}} \gamma \underline{B} e^{j2\phi}] \underline{H} + \beta \underline{F}^H [\underline{\tilde{A}} \underline{\tilde{A}}^P + \underline{\tilde{B}}}{\underline{\tilde{B}}^P] \underline{\tilde{H}}^P} \qquad (217)$$

Due to the periodic auto-correlation property (191), the sum $[\underline{\tilde{A}} \underline{\tilde{A}}^P + \underline{\tilde{B}} \underline{\tilde{B}}^P] = 0$ and the terms in $\underline{\tilde{H}}^P$ disappear. What is left is twice the same vector, once multiplied with $e\beta$ and once multiplied with $\alpha$. By dividing the vectors in (216) and (217) element wise and averaging the result, an estimate of the IQ-imbalance ratio is obtained:

$$\frac{\tilde{\beta}}{\tilde{\alpha}} = \text{mean} \left[ \frac{\underline{X}(\tilde{\alpha}, \tilde{r}_n) + e^{j\phi} \underline{X}(\tilde{b}, \tilde{s}_n)}{\underline{X}(\tilde{\alpha}, r_p) + e^{j\phi} \underline{X}(\tilde{b}, s_p)} \right] \qquad (218)$$

Note that processing can be done as well in time as in frequency domain.

It is assumed that a rough CFO compensation has been made and that an estimate of $\beta/\tilde{\alpha}$ is known. The periodic correlations (197, 198, 201, 202) are combined to eliminate the terms in $e^{-j\phi}$ and $\underline{\tilde{H}}$:

$$\underline{X}(\tilde{a}, r_n) - \frac{\beta}{\tilde{\alpha}} \underline{X}(\tilde{a}, \tilde{r}_p) = \left[ \alpha - \frac{|\beta|^2}{\tilde{\alpha}} \right] \underline{F}^H |\underline{A}|^2 \underline{H} \qquad (219)$$

$$\underline{X}(\tilde{b}, s_n) - \frac{\beta}{\tilde{\alpha}} \underline{X}(\tilde{b}, \tilde{s}_p) = \left[ \alpha - \frac{|\beta|^2}{\tilde{\alpha}} \right] \underline{F}^H |\underline{B}|^2 \underline{H} e^{j\phi} \qquad (220)$$

A matrix multiplication of the Hermitian transpose of (219) with (220) yields:

$$\left[ \underline{X}(\tilde{a}, r_n) - \frac{\beta}{\tilde{\alpha}} \underline{X}(\tilde{a}, \tilde{r}_p) \right]^H \left[ \underline{X}(\tilde{b}, s_n) - \frac{\beta}{\tilde{\alpha}} \underline{X}(\tilde{b}, \tilde{s}_p) \right] = \qquad (221)$$

$$e^{j\phi} \frac{[|\alpha|^2 - |\beta|^2]^2}{|\alpha|^2} \underline{\tilde{H}}^T |\underline{A}|^2 |\underline{B}|^2 \underline{H} =$$

$$e^{j\phi} \frac{[|\alpha|^2 - |\beta|^2]^2}{|\alpha|^2} \sum_{k=0}^{N-1} |H(k)|^2 |A(k)|^2 |B(k)|^2$$

Everything right of $e^{j\phi}$ in (221) is a real and positive number. So taking the angle of (221) will result in an estimate of $\phi$ and the CFO. The processing can also be done in the frequency domain with the FFTs of the correlations and will return exactly the same result.

4. Estimation of the Channel Direct Fine CFO Estimation and Direct Channel Equalization It is assumed that a rough CFO compensation has been made and that a fine CFO estimate $e^{j\phi}$ and an estimate of $\beta/\tilde{\alpha}$ are known. In (219, 220) the terms $\underline{\tilde{H}}$ have been eliminated. By adding (219, 220) while compensating for the difference in phase rotation one gets:

$$\left[ \underline{X}(\tilde{a}, r_n) - \frac{\beta}{\tilde{\alpha}} \underline{X}(\tilde{a}, \tilde{r}_p) \right] + e^{-j\phi} \left[ \underline{X}(\tilde{b}, s_n) - \frac{\beta}{\tilde{\alpha}} \underline{X}(\tilde{b}, \tilde{s}_p) \right] = \left[ \alpha - \frac{|\beta|^2}{\tilde{\alpha}} \right] \qquad (222)$$

$$\underline{F}^H [|\underline{A}|^2 + |\underline{B}|^2] \underline{H} = \left[ \alpha - \frac{|\beta|^2}{\tilde{\alpha}} \right] \underline{F}^H 2 \underline{H} = \left[ \alpha - \frac{|\beta|^2}{\tilde{\alpha}} \right] 2 \underline{h}$$

Property (190) was used to replace $|\underline{A}|^2 + |\underline{B}|^2$ by 2. $\underline{h}$ is a vector containing the time domain channel taps. Taking the FFT of (222) and dividing by 2 will result in $$\left[ \alpha - \frac{|\beta|^2}{\tilde{\alpha}} \right] \underline{H}.$$

This is exactly the equalizer needed for frequency domain equalization after CFO and IQ imbalance compensation in the time domain. Let d be a transmitted data vector, $\underline{C}$ from above, the matrix with the CFO impact and $\underline{t}$ the receive vector:

$$t = \alpha \underline{C} \, \underline{F}^H \, \underline{H} \, \underline{F} \, \underline{d} + \beta \underline{\tilde{C}} \, \underline{\tilde{F}} \, \underline{\tilde{H}} \, \underline{F}^T \, \underline{\tilde{d}} \qquad (223)$$

$$\left[\alpha - \frac{|\beta|^2}{\tilde{\alpha}}\right] \underline{F}^H \underline{H} \underline{F} \underline{d} = \underline{\tilde{C}}\left[t - \frac{\beta}{\tilde{\alpha}} \tilde{t}\right] \qquad (224)$$

The complex constant $$\left[\alpha - \frac{|\beta|^2}{\tilde{\alpha}}\right]$$

can be seen as becoming part of the channel and is compensated together with the channel by the equalizer. Remark that the above processing could also have been done directly in the frequency domain. An advantage of the time domain processing is that from the result h, the length of the channel is known.

Direct Fine CFO Estimation

The fine CFO estimation of section 10 needs an estimate of the IQ imbalance ratio. With the following estimator a fine CFO estimation is done without the need for an initial IQ imbalance ratio estimate, only a rough CFO compensation is necessary. The estimation works only in the frequency domain. The approach is to express $e^{j\phi}$ solely in function of the FFTs of the correlations: (208-215). The derivation of the $e^{j\phi}$ estimator is done as follows:

Process 1:

$$\underline{Y}(\tilde{a},r_p) + e^{j\phi} \underline{Y}(\tilde{b},s_p) = \alpha \underline{\Delta} \qquad (225)$$

$$\underline{Y}(\tilde{a},r_n) + e^{j\phi} \underline{Y}(\tilde{b},s_n) = \alpha \underline{\Delta} \qquad (226)$$

with $\underline{\Delta} = [\tilde{A}\gamma A + \tilde{B}\gamma B e^{j2\phi}]H \qquad (227)$ Process 2 using (225, 226):

$$[|B|^2 \underline{Y}(\tilde{a},r_n)]^H \alpha \underline{\Delta} - [|B|^2 \underline{Y}(\tilde{a},\tilde{r}_p)]^H \tilde{\beta} \underline{\Delta} = [|\alpha|^2 - |\beta|^2]H^H|$$
$$\underline{\tilde{A}}|^2|\underline{B}|^2\underline{\Delta} \qquad (228)$$

$$[|A|^2 \underline{Y}(\tilde{b},s_n)]^H \alpha \underline{\Delta} - [|A|^2 \underline{Y}(\tilde{b},\tilde{s}_p)]^H \tilde{\beta} \underline{\Delta} = [|\alpha|^2 - |\beta|^2]H^H|$$
$$\underline{\tilde{B}}|^2|\underline{A}|^2 \underline{\Delta} e^{-j\phi} \qquad (229)$$

Because in the product $|B|^2|A|^2$, both $|B|^2$ and $|A|^2$ are diagonal matrices, the product order can be inversed so (228) and (229) only differ by a factor $e^{j\phi}$. One can write:

$$e^{-j\phi}[[|B|^2 \underline{Y}(\tilde{a},r_n)]^H \alpha \underline{\Delta} - [|B|^2 \underline{Y}(\tilde{a},\tilde{r}_p)]^H \tilde{\beta} \underline{\Delta}] = [|A|^2 \underline{Y}(\tilde{b}, s_n)]^H \alpha \underline{\Delta} - [|A|^2 \underline{Y}(\tilde{b},\tilde{s}_p)]^H \tilde{\beta} \underline{\Delta} \qquad (230)$$

Process 3: in (230) $\alpha\Delta$ and $\tilde{\beta}\Delta$ are substituted by their left-hand side of (225, 226). Also in the substituted version of (230) the terms are grouped by powers of $e^{j\phi}$.

$$e^{j\phi}[Y^H(\tilde{b},s_n)|A|^2 Y(\tilde{b},s_p) - Y^H(\tilde{b},\tilde{s}_p)|A|^2 Y(\tilde{b},\tilde{s}_n)] - e^{-j\phi}Y^H(\tilde{a},r_n)|B|^2 = Y^H(\tilde{a},r_n)|B|^2 Y(\tilde{a},s_p) - Y^H(\tilde{a},\tilde{r}_p)|B|^2 Y(\tilde{b},\tilde{s}_n) - Y^H(\tilde{b},s_n)|A|^2 Y(\tilde{a},r_p) + Y^H(\tilde{b},\tilde{s}_p)|A|^2 Y(\tilde{a},\tilde{r}_n) \qquad (231)$$

By defining in (231) c as the coefficient of $e^{j\phi}$, d as the coefficient of $e^{-j\phi}$ and f as term on the right-hand side of the equal sign, (231) can be rewritten as:

$$ce^{j\phi} + de^{-j\phi} = f \qquad (232)$$

The matrix products in (231) result in simple complex numbers, so c, d, f are simple complex values.

Process 4: in this last process (232) is solved. Taking the complex conjugate of (232) and reordering the terms yields:

$$\tilde{d}e^{j\phi} + \tilde{c}e^{-j\phi} = \tilde{f} \qquad (233)$$

After multiplication of (232) with $\tilde{c}$ and subtraction of (233) multiplied with d one gets:

$$[|c|^2 - |d|^2]e^{j\phi} = \tilde{c}f - d\tilde{f} \qquad (234)$$

$$e^{j\phi} = \frac{\tilde{c}f - d\tilde{f}}{|c|^2 - |d|^2}$$

which is a direct expression of $e^{j\phi}$ in function of the FFT of the correlations and the FFT of a, b.

Direct Channel Equalization

In this section a channel equalizer is developed that jointly compensates the effects of the channel and IQ imbalance. A prior estimate of the CFO and a compensation of the CFO on the data are necessary. There is no need for a prior estimation of the IQ imbalance. A dual CFO compensation is applied on the receive vector t defined in (223), $\underline{D}$ is the FFT of $\underline{d}$:

$$\underline{t}_p = \underline{C}\underline{t} = \alpha \underline{C}^2 \underline{F}^H HD + \beta \underline{F}^T \tilde{H} \tilde{D} \qquad (235)$$

$$\underline{t}_n = \underline{\tilde{C}}\underline{t} = \alpha \underline{F}^2 H^H D + \beta \underline{\tilde{C}}^2 \underline{F}^T \tilde{H} \tilde{D} \qquad (236)$$

All further processing is done in the frequency domain:

$$\underline{T}_p = \underline{F}\underline{t}_p = \alpha \underline{\gamma} HD + \beta \underline{P} \underline{\tilde{H}} \underline{\tilde{D}} \qquad (237)$$

$$\underline{T}_n = \underline{F}\underline{t}_n = \alpha HD + \beta \underline{P} \underline{\tilde{\gamma}} \underline{\tilde{H}} \underline{\tilde{D}} \qquad (238)$$

$\underline{T}$ is permuted and conjugated:

$$\underline{\tilde{T}}_p^P = \underline{P}\underline{\tilde{T}}_p = \tilde{\alpha} \underline{P} \underline{\tilde{\gamma}} \underline{\tilde{H}} \underline{\tilde{D}} + \tilde{\beta} HD \qquad (239)$$

Remark that in (237) and (239) the terms in D and $\tilde{D}$ are equal with the exception of the IQ imbalance parameters $\alpha, \beta$. (237, 239) can be combined to eliminate the unwanted term $\tilde{D}$. To compensate for the difference caused by the IQ imbalance parameters, $\alpha\Delta$ and $\beta\Delta$ as defined in (225, 226), are used. Let $\underline{\Delta}$ be the diagonal matrix corresponding with vector $\underline{\Delta}$.

$$\tilde{\alpha}\underline{\tilde{\Delta}}_n - \beta\underline{\tilde{\Delta}}\underline{\tilde{T}}_p^P = [|\alpha|^2 - |\beta|^2] \underline{\tilde{\Delta}} HD \qquad (240)$$

In (240) the unwanted term in $\tilde{D}$ is eliminated. The diagonal matrix $[|\alpha|^2 - |\beta|^2]\tilde{\Delta}H$ can be derived from the PGCP in the second part of the preamble, using (209, 210, 213, 214):

$$\tilde{\alpha}\underline{\Delta}Y(\tilde{a},r_n) - \beta\underline{\tilde{\Delta}}Y(\tilde{a},\tilde{r}_p) = [|\alpha|^2 - |\beta|^2] \underline{\tilde{\Delta}}|A|^2 H \qquad (241)$$

$$\tilde{\alpha}\underline{\Delta}Y(\tilde{b},s_n) - \beta\underline{\tilde{\Delta}}Y(\tilde{a},\tilde{s}_p) = [|\alpha|^2 - |\beta|^2] \underline{\tilde{\Delta}}|A|^2 H e^{j\phi} \qquad (242)$$

Combining (241) and (242) while compensating for $e^{j\phi}$ yields:

$$\tilde{\alpha}\underline{\Delta}Y(\tilde{a},r_n) - \beta\underline{\tilde{\Delta}}Y(\tilde{a},\tilde{r}_p) + [\tilde{\alpha}\underline{\Delta}Y(\tilde{b}s_n) - \beta Ide \Delta Y(\tilde{b}, \tilde{s}_p)]e^{-j\phi} = [[|\alpha|^2 - |\beta|^2] \underline{\tilde{\Delta}}|A|^2 + |B|^2]H = 2[|\alpha|^2 - |\beta|^2]\underline{\tilde{\Delta}} H \qquad (243)$$

This is twice the vector needed for equalizing (240).

5. Compensation of Frequency Dependent Transmit and Receive IQ Imbalance

This method is only applicable for a system without CFO or with negligible CFO, or for a system where the CFO has been compensated, for example by tuning the receiver carrier frequency. The method is conceived for frequency dependent transmit and receive IQ imbalance, but does not lose its applicability if either or both transmit and receive IQ imbalance are frequency independent. The transmit IQ imbalance is characterized by two diagonal matrices $\alpha_t$ and $\beta_t$. A data vector d is transformed by the transmit IQ imbalance into:

$$\underline{p} = \underline{F}^H \alpha_t \underline{F} \underline{d} + \underline{F}^H \beta_t \underline{F} \tilde{d} = \underline{F}^H \alpha_t \underline{D} + \underline{F}^H \beta_t \underline{\tilde{D}}^P \qquad (244)$$

where $\underline{D}$ is the FFT of $\underline{d}$. After convolution with the channel:

$$\underline{q} = \underline{F}^H H \underline{F} \underline{p} = \underline{F}^H H \alpha_t \underline{D} + \underline{F}^H H \beta_t \underline{\tilde{D}}^P \qquad (245)$$

with H the diagonal channel matrix. The receive IQ imbalance is characterized by two diagonal matrices $\alpha_r$ and $\beta_r$. The received vector $\underline{q}$ is transformed by the receive IQ imbalance into:

$$\underline{t} = \underline{F}^H \alpha_r \underline{F} \underline{q} + \underline{F}^H \beta_r \underline{F} \underline{\tilde{q}} = \underline{F}^H \underline{L} \underline{D} + \underline{F}^H \underline{U} \underline{\tilde{D}}^P \quad (246)$$

with $$\underline{L} = \alpha_r \underline{H} \alpha_r + \beta_r \underline{\tilde{H}}^P \beta_r^P \quad (247)$$

$$\underline{U} = \alpha_r \underline{H} \beta_r + \beta_r \underline{\tilde{H}}^P \alpha_r^P \quad (248)$$

L and U are diagonal matrices. All processing is done in the frequency domain. The FFT $\underline{T}$ of $\underline{t}$ is taken and also its permuted conjugate:

$$\underline{T} = \underline{L}\underline{D} + \underline{U}\underline{\tilde{D}}^P \quad (249)$$

$$\underline{\tilde{T}}^P = \underline{\tilde{L}}^P \underline{\tilde{D}}^P + \underline{\tilde{U}}^P \underline{D} \quad (250)$$

The unwanted term $\underline{\tilde{D}}^P$ can be eliminated by combining (249) and (250).

$$\underline{\tilde{L}}^P \underline{T} = \underline{U}\underline{\tilde{T}}^P = [\underline{\tilde{L}}^P \underline{L} = \underline{U}\underline{\tilde{U}}^P]\underline{D} + [\underline{\tilde{L}}^P \underline{U} - \underline{U}\underline{\tilde{L}}^P]\underline{\tilde{D}}^P = [\underline{\tilde{L}}^P \underline{L} - \underline{U} \underline{\tilde{U}}^P]\underline{D} \quad (251)$$

The term in $\underline{\tilde{D}}^P$ is 0 because L and U are diagonal matrices. The PGCP on the second part of the preamble is used to estimate L and U. Let R and S be what is received after transmission of respectively $\underline{a}$ and $\underline{b}$. From (249):

$$\underline{R} = \underline{L}\underline{A} + \underline{U}\underline{\tilde{A}}^P = \underline{A}\underline{L} + \underline{\tilde{A}}^P \underline{U} \quad (252)$$

$$\underline{S} = \underline{L}\underline{B} + \underline{U}\underline{\tilde{B}}^P = \underline{B}\underline{L} + \underline{\tilde{B}}^P \underline{U} \quad (253)$$

By using (190, 191), $\underline{L}$ can be derived from:

$$\underline{\tilde{A}}\underline{R} + \underline{\tilde{B}}\underline{S} = [|A|^2 + |B|^2]\underline{L} + [\underline{\tilde{A}}\underline{\tilde{A}}^P + \underline{\tilde{B}}\underline{\tilde{B}}^P]\underline{U} = 2\underline{L} \quad (254)$$

Again by using (190, 191), $\underline{\tilde{U}}^P$ can be derived from:

$$\underline{\tilde{A}}\underline{\tilde{R}}^P + \underline{\tilde{B}}\underline{\tilde{S}}^P = [\underline{\tilde{A}}\underline{\tilde{A}}^P + \underline{\tilde{B}}\underline{\tilde{B}}^P]\underline{\tilde{L}}^P + [|A|^2|B|^2]\underline{\tilde{U}}^P = \underline{\tilde{U}}^P \quad (255)$$

With $\underline{L}$, $\underline{\tilde{U}}^P$ also $\underline{\tilde{L}}^P$, $\underline{U}$ are known and $\underline{\tilde{L}}^P \underline{L} - \underline{U}\underline{\tilde{U}}^P$ can be constructed which is needed for the equalization of (251) to recover D.

6. Complete Estimation and Compensation Schemes

Scheme 1: This scheme applies to systems with CFO and frequency independent receiver IQ imbalance.

1. Make a CFO estimation on the first part of the preamble using [3] or [4] or [5].
2. Do a CFO compensation on the second part of the preamble according to (192-195).
3. On the CFO compensated signals, make a time domain correlation according to (196-203).
4. With the time domain correlations, make an estimate of the IQ imbalance ratio according to (218).
5. Using the estimated IQ imbalance ratio, make a fine CFO estimation with (221).
6. Using the IQ imbalance ratio estimate and the fine CFO estimate, make a time domain estimate of the channel response using (222). Take the FFT of the time domain channel response.
7. Make a time domain compensation on the data according to (224) and after FFT use the obtained channel estimate from (222) to equalize the data.

Scheme 2: In scheme 1, all processing with the exception of the channel equalization is done in the time domain. In a variant of scheme 1 some of the processing can also be done in the frequency domain but this is computationally more intensive. This scheme applies to systems with CFO and frequency independent receiver IQ imbalance.

1. Make a CFO estimation on the first part of the preamble using [3] or [4] or [5].
2. Do a CFO compensation on the second part of the preamble according to (192-195).
3. On the CFO compensated signals, make a frequency domain correlation according to (208-215).
4. With the frequency domain correlations, make an estimate of the IQ imbalance ratio according to (218) while substituting in (218) the X terms with their corresponding Y terms.
5. Using the estimated IQ imbalance ratio, make a fine CFO estimation with (221) while substituting in (221) the X terms with their corresponding Y terms.
6. Using the IQ imbalance ratio estimate and the fine CFO estimate, make a frequency domain estimate of the channel response using (222) while substituting in (222) the X terms with their corresponding Y terms.
7. Make a time domain compensation on the data according to (224) and after FFT use the obtained frequency channel estimate to equalize the data.

Scheme 3: The estimation and compensations proposed in scheme 1 can be made more accurate by iterating on the CFO and IQ imbalance estimations: This scheme applies to systems with CFO and frequency independent receiver IQ imbalance.

1. Make a CFO estimation on the first part of the preamble using [3] or [4] or [5].
2. Do a CFO compensation on the second part of the preamble according to (192-195).
3. On the CFO compensated signals, make a time domain correlation according to (196-203).
4. With the time domain correlations make an estimate of the IQ imbalance ratio according to (218).
5. Using the estimated IQ imbalance ratio, make a fine CFO estimation with (221).
6. With the time domain correlations and the previous fine CFO estimation, make a new estimate of the IQ imbalance ratio according to (218).
7. With the new IQ imbalance ratio estimate, make a new fine CFO estimation with (221).
8. Using the last IQ imbalance ratio estimate and the last fine CFO estimate, make a time domain estimate of the channel response using (222). Take the FFT of the time domain channel response.
9. Make a time domain compensation on the data according to (224) and after FFT use the obtained channel estimate from (222) to equalize the data.

Scheme 4: This scheme applies to systems with CFO and frequency independent receiver IQ imbalance.

1. Make a CFO estimation on the first part of the preamble using [4] or [5] or [6].
2. Do a CFO compensation on the second part of the preamble according to (192-195).
3. On the CFO compensated signals, make a frequency domain correlation according to (208-215).
4. With the frequency domain correlations, make a direct fine CFO estimate according to (231, 232, 234).
5. Using the frequency domain correlations and the direct fine CFO estimate, calculate an equalizer according to (243).
6. On the data, make a CFO compensation with the fine CFO estimate according to (235, 236).
7. Take the FFTs of the CFO compensated data and apply (240). Equalize the result from (240) with the equalizer calculated in (243).

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

The following references are hereby incorporated in their entirety:

[1] M. J. E. Golay, Complementary sequences, *IEEE Transactions on Information Theory*, vol. 7, pp. 82-87, April 1961.

[2] Draft standard for Wireless Medium Access Control (MAC) and Physical layer (PHY) Specifications for High rate Wireless Personal Area Networks (WPANs), *IEEE P802.15.3c/DF*1, February 2008.

[3] T. M. Schmidl and P. Cox, "Robust frequency and timing synchronization for OFDM", *IEEE Transactions on Communications*, vol. 45, pp. 1613-1621, December 1997.

[4] Feng Yan et al., "Carrier Frequency Offset Estimation for OFDM Systems with I/Q Imbalance", *Proc. the 47$^{th}$ IEEE Int. Midwest Symposium On Circuits and Systems, MWSCAS '04*, Vol. 2, pp. 633-636, July 2004.

[5] De Rore S. et al., "Joint estimation of carrier frequency offset and IQ imbalance for 4G mobile wireless systems", *Communications, 2006 IEEE International Conference on*, vol. 5, pp. 2066-2071, June 2006.

[6] TG3c Channel Modeling Sub-committee Final Report, *Doc. IEEE 15-07-0584-01-003c*, 13 Mar. 2007.

What is claimed is:

1. A method of determining non-ideality characteristics introduced on a radio frequency (RF) modulated signal transmitted from a transmitter via a transmission channel to a receiver, the method comprising:
generating a preamble comprising multiple sets of known training sequences with a synchronization part for synchronization preceding an estimation part for estimating non-ideality characteristics, the training sequences in the estimation part comprising at least two sequences which are (i) complementary Golay sequence pairs and (ii) selected to satisfy a predetermined correlation relationship chosen for estimation of a plurality of non-ideality characteristics including estimating an IQ imbalance ratio of the transmitter and the receiver, wherein the predetermined correlation relationship comprises the following properties:
 i) a second sequence equals minus a complex conjugate of a first sequence;
 ii) a first selection of periodic correlations of the complex conjugate of a sequence with the sequence equals zero;
 iii) a zero shift correlation of the complex conjugate of a sequence with the sequence equals a length of the sequence N; and
 iv) a second selection of periodic correlations of a sequence with the sequence equals zero;
transmitting the preamble from the transmitter via the transmission channel to the receiver;
determining a first estimate of a first non-ideality characteristic based at least in part on the known training sequences of the synchronization part of the received preamble;
compensating the estimation part of the received preamble using the first estimate of the first non-ideality characteristic; and
determining an estimate of a second non-ideality characteristic different from the first non-ideality characteristic based at least in part on the compensated estimation part by exploiting the predetermined correlation relationship.

2. The method according to claim 1, wherein the transmitting of the preamble from the transmitter via the transmission channel to the receiver further comprises making time domain correlations of the first and second sequences with the compensated estimation part of the preamble.

3. The method according to claim 2, further comprises:
determining an estimator based on the time domain correlations and based on transmitter and receiver IQ imbalance equations, the equations being derived from the additional correlations properties; and
estimating the transmitter and receiver IQ imbalance ratio's.

4. The method according to claim 1, wherein the predetermined relationship is defined by a sum of the correlation of a first sequence with the first sequence and the correlation of a second sequence with the second sequence equals zero.

5. The method according to claim 4, wherein the correlation is a periodic correlation.

6. The method according to claim 4, wherein the correlation is an a-periodic correlation.

7. The method according to claim 1, wherein the plurality of non-ideality characteristics comprises at least the carrier frequency offset and IQ imbalance.

8. A method of determining non-ideality characteristics introduced on a radio frequency (RF) modulated signal transmitted from a transmitter via a transmission channel to a receiver, the method comprising:
generating a preamble comprising multiple sets of known training sequences with a synchronization part for synchronization preceding an estimation part for estimating non-ideality characteristics, the training sequences in the estimation part comprising at least two sequences which are (i) complementary Golay sequence pairs and (ii) selected to satisfy a predetermined correlation relationship chosen for estimation of a plurality of non-ideality characteristics;
transmitting the preamble from the transmitter via the transmission channel to the receiver;
determining a first estimate of a first non-ideality characteristic based at least in part on the known training sequences of the synchronization part of the received preamble;
compensating the estimation part of the received preamble using the first estimate of the first non-ideality characteristic;
determining an estimate of a second non-ideality characteristic different from the first non-ideality characteristic based at least in part on the compensated estimation part by exploiting the predetermined correlation relationship;
making time domain correlations of the first and second sequences with the compensated estimation part of the preamble;

determining an estimator based on the time domain correlations and based on transmitter and receiver IQ imbalance equations, the equations being derived from the additional correlations properties;

estimating the transmitter and receiver IQ imbalance ratios wherein estimating the transmitter and receiver IQ imbalance ratio's is determined by $$\begin{pmatrix} r_{r_1} \\ r_{t_1} \end{pmatrix} = (\underline{M}^H \underline{M})^{-1} \underline{M}^H \underline{K}_1$$

wherein $r_{t1}$ and $r_{r1}$ are the transmitter and receiver IQ imbalance ratio's and M and K are matrices built from the time domain correlations and by exploiting the additional correlations and the time domain correlations.

9. The method according to claim 8, wherein the estimator is a least squares estimator.

10. The method according to claim 8, further comprises determining fine carrier frequency offset characteristic by combining the time domain correlations with the estimated receiver IQ imbalance ratio and using the combinations to estimate the fine carrier frequency offset characteristics.

11. The method according to 10, wherein the fine carrier frequency offset characteristic is determined by $$f_f \equiv f_{cfo} - f_r \approx \frac{f_s}{4\pi N} \text{ angle } (\underline{P}^H \underline{Q})$$

wherein $f_f$ is the fine carrier frequency offset characteristic, $f_{cfo}$ is the real carrier frequency offset, $f_s$ is the sample frequency, P and Q are the combinations, and by combining the time domain correlations with the estimated receiver IQ imbalance ratio.

12. The method according to claim 10, further comprises estimating the noise variance on the received signal by the combinations and the fine carrier frequency offset characteristics.

13. The method according to claim 12, wherein the noise variance is estimated by $$\sigma_{n_{sc}}^2 \approx \frac{2}{N^2} |\underline{P} - \rho\tilde{\psi}\underline{Q}|^2$$

wherein $\sigma_{n_{sc}}^2$ is the noise variance and the combinations and the carrier frequency offset characteristics.

14. The method according to 8, further comprises estimating time domain channel response by combining the time domain correlations with the estimated receiver IQ imbalance ratio and using the combinations to estimate the time domain channel response.

15. The method according claim 14, wherein the time domain channel response is estimated by $$\frac{1}{2N}(\underline{P} + \rho\tilde{\psi}\underline{Q}) \approx \gamma\alpha_t\underline{h} = \underline{g}$$

wherein $\rho\tilde{\psi}$ is the angle difference between P and Q, and $$\tilde{\rho\psi} = e^{j2\pi(f_{cfo}-f_r)\frac{2N}{f_s}} \approx \frac{\underline{P}^H\underline{Q}}{|\underline{P}^H\underline{Q}|},$$

$\gamma$ is a scaling factor, $\alpha_t$ the complex transmit IQ imbalance parameter, $\underline{h}$ the time domain channel response and $\underline{g}$ the corrected time domain channel response needed for subsequent compensation.

16. A method for determining non-ideality characteristics introduced on a received radio frequency (RF) modulated signal received from a transmitter via a transmission channel, the method comprising:

receiving a preamble transmitted via a transmission channel, the preamble comprising multiple sets of known training sequences with a synchronization part for synchronization preceding an estimation part for estimating non-ideality characteristics, the training sequences in the estimation part comprising at least two sequences which are (i) complementary Golay sequence pairs and (ii) selected to satisfy a predetermined correlation relationship chosen for estimation of a plurality of non-ideality characteristics including estimating an IQ imbalance ratio of the transmitter and the receiver, wherein the predetermined correlation relationship comprises the following properties:

i) a second sequence equals minus a complex conjugate of a first sequence;

ii) a first selection of periodic correlations of the complex conjugate of a sequence with the sequence equals zero;

iii) a zero shift correlation of the complex conjugate of a sequence with the sequence equals a length of the sequence N; and iv) a second selection of periodic correlations of a sequence with the sequence equals zero;

determining a first estimate of a first non-ideality characteristic based at least in part on the known training sequences of the synchronization part of the received preamble;

compensating the estimation part of the received preamble using the first estimate of the first non-ideality characteristic; and determining an estimate of a second non-ideality characteristic different from the first non-ideality characteristic based at least in part on the compensated estimation part by exploiting the predetermined correlation relationship.

17. A device for determining non-ideality characteristics introduced on a received radio frequency (RF) modulated signal transmitted by a transmitter via a transmission channel, the device comprising:

a receiving unit for receiving a preamble transmitted via a transmission channel, the preamble comprising multiple sets of known training sequences with a synchronization part for synchronization preceding an estimation part for estimating non-ideality characteristics, the training sequences in the estimation part comprising at least two sequences which are (i) complementary Golay sequence pairs and (ii) selected to satisfy a predetermined correlation relationship chosen for estimation of a plurality of non-ideality characteristics including estimating an IQ imbalance ratio of the transmitter and the receiver, wherein the predetermined correlation relationship comprises the following properties:

i) a second sequence equals minus a complex conjugate of a first sequence;
ii) a first selection of periodic correlations of the complex conjugate of a sequence with the sequence equals zero;
iii) a zero shift correlation of the complex conjugate of a sequence with the sequence equals a length of the sequence N; and
iv) a second selection of periodic correlations of a sequence with the sequence equals zero;

a first determining unit for determining a first estimate of a first non-ideality characteristic based at least in part on the known training sequences of the synchronization part of the received preamble;

a compensating unit for compensating the estimation part of the received preamble using the first estimate of the first non-ideality characteristic; and a second determining unit for determining an estimate of a second non-ideality characteristic different from the first non-ideality characteristic based at least in part on the compensated estimation part by exploiting the predetermined correlation relationship.

18. A device for determining non-ideality characteristics introduced on a received radio frequency (RF) modulated signal transmitted by a transmitter via a transmission channel, the device comprising:

means for receiving a preamble transmitted via a transmission channel, the preamble comprising multiple sets of known training sequences with a synchronization part for synchronization preceding an estimation part for estimating non-ideality characteristics, the training sequences in the estimation part comprising at least two sequences which are (i) complementary Golay sequence pairs and (ii) selected to satisfy a predetermined correlation relationship chosen for estimation of a plurality of non-ideality characteristics including estimating an IQ imbalance ratio of the transmitter and the receiver, wherein the predetermined correlation relationship comprises the following properties:

i) a second sequence equals minus a complex conjugate of a first sequence;
ii) a first selection of periodic correlations of the complex conjugate of a sequence with the sequence equals zero;
iii) a zero shift correlation of the complex conjugate of a sequence with the sequence equals a length of the sequence N; and
iv) a second selection of periodic correlations of a sequence with the sequence equals zero;

means for determining a first estimate of a first non-ideality characteristic based at least in part on the known training sequences of the synchronization part of the received preamble;

means for compensating the estimation part of the received preamble using the first estimate of the first non-ideality characteristic; and means for determining an estimate of the second non-ideality characteristic different from the first non-ideality characteristic based at least in part on the compensated estimation part by exploiting the predetermined correlation relationship.

19. The device according to claim 18, wherein the plurality of non-ideality characteristics comprises at least the carrier frequency offset and IQ imbalance.

* * * * *